(12) United States Patent
Wang et al.

(10) Patent No.: US 12,368,551 B2
(45) Date of Patent: Jul. 22, 2025

(54) SOUNDING REFERENCE SIGNAL (SRS) ENHANCEMENTS

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US); Alexandros Manolakos, Escondido, CA (US); Weimin Duan, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/760,092

(22) PCT Filed: Feb. 4, 2021

(86) PCT No.: PCT/CN2021/075223
§ 371 (c)(1),
(2) Date: Aug. 3, 2022

(87) PCT Pub. No.: WO2021/155818
PCT Pub. Date: Aug. 12, 2021

(65) Prior Publication Data
US 2023/0050730 A1 Feb. 16, 2023

(30) Foreign Application Priority Data

Feb. 7, 2020 (WO) ................ PCT/CN2020/074521

(51) Int. Cl.
*H04L 5/00* (2006.01)

(52) U.S. Cl.
CPC .......... *H04L 5/0048* (2013.01); *H04L 5/0012* (2013.01); *H04L 5/0091* (2013.01)

(58) Field of Classification Search
None
See application file for complete search history.

(56) References Cited

U.S. PATENT DOCUMENTS

| | | |
|---|---|---|
| 2016/0219534 A1 | 7/2016 | Hao et al. |
| 2018/0279296 A1 | 9/2018 | Hosseini et al. |
| | (Continued) | |

FOREIGN PATENT DOCUMENTS

| | | |
|---|---|---|
| CN | 101978664 A | 2/2011 |
| CN | 108111279 A | 6/2018 |
| | (Continued) | |

OTHER PUBLICATIONS

Huawei, et al., "Introduction of Additional SRS Symbols in Normal UL Subframe", R1-1906069, 3GPP TSG RAN WG1 Meeting #97, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051727526, 7 Pages.

(Continued)

*Primary Examiner* — Walter J Divito
(74) *Attorney, Agent, or Firm* — Harrity & Harrity LLP

(57) ABSTRACT

This disclosure provides systems, methods and apparatus, including computer programs encoded on computer storage media, for transmitting sounding reference signal (SRS) resources with frequency hopping. In some implementations, a user equipment (UE) may use different SRS ports, different antenna ports, different numbers and sizes of SRS resources, different periodicities, different offsets, different transmission comb values, different number of symbols, different power control parameters, and/or different trans- (Continued)

mission comb offset values for SRS transmissions on different frequency subbands of the frequency hopping pattern to ensure that sounding operations cover all antennas of the UE, cover the entire frequency range of interest, and provide sufficiently dense SRS transmissions from which a base station can determine the best channel for DL transmissions while also using a minimum amount of SRS resources and consuming minimal power in the UE.

27 Claims, 28 Drawing Sheets

(56) References Cited

U.S. PATENT DOCUMENTS

| | | | |
|---|---|---|---|
| 2019/0281588 A1 | 9/2019 | Zhang et al. | |
| 2020/0028638 A1 | 1/2020 | Liu et al. | |
| 2021/0250145 A1* | 8/2021 | Choi | H04L 5/0048 |

FOREIGN PATENT DOCUMENTS

| | | |
|---|---|---|
| CN | 109802810 A | 5/2019 |
| CN | 110301113 A | 10/2019 |
| CN | 110383927 A | 10/2019 |
| CN | 110546913 A | 12/2019 |
| WO | 2021151249 | 8/2021 |

OTHER PUBLICATIONS

Supplementary European Search Report—21750107—Search Authority—The Hague—Feb. 8, 2024.

International Search Report and Written Opinion—PCT/CN2020/074521—ISA/EPO—Nov. 10, 2020.

International Search Report and Written Opinion—PCT/CN2021/075223—ISA/EPO—Apr. 30, 2021.

Qualcomm Incorporated: "Remaining Details on SRS," 3GPP Draft; R1-1720670 SRS, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051370131, 7 Pages, Retrieved from the Internet: URL: http://www.3gpp.org/ftp/tsg%5Fran/WG1%5FRL1/TSGR1%5F91/Docs/ [retrieved on Nov. 18, 2017] section 4, section 6.

ZTE: et al., "Remaining Details on SRS", 3GPP TSG RAN WG1 Meeting 91, R1-1719544, Dec. 1, 2017 (Dec. 1, 2017), 6 Pages, sections 1-3.

* cited by examiner

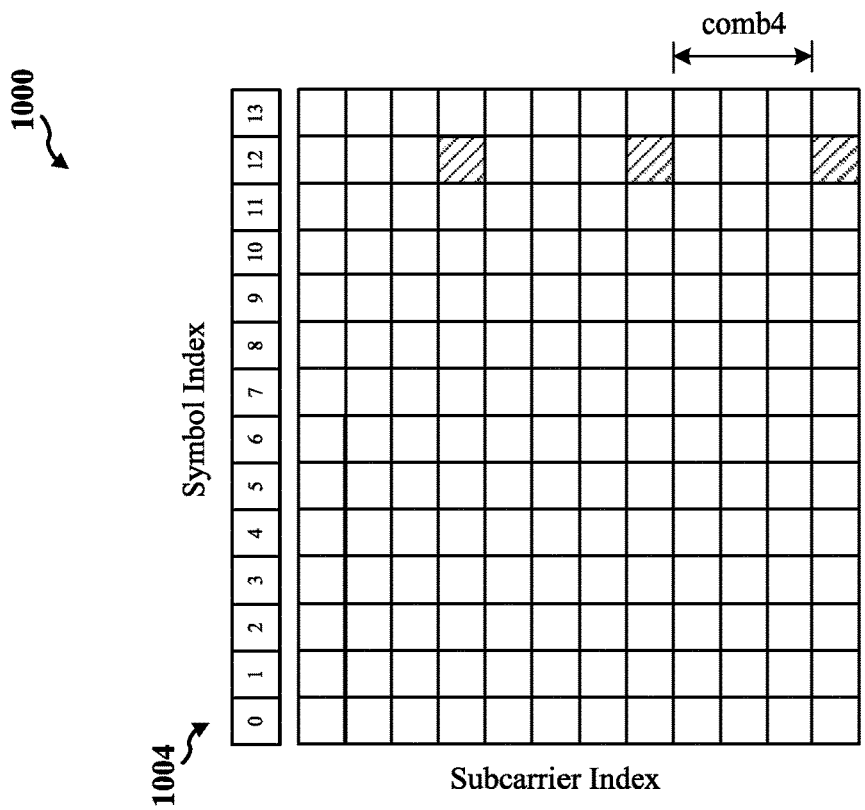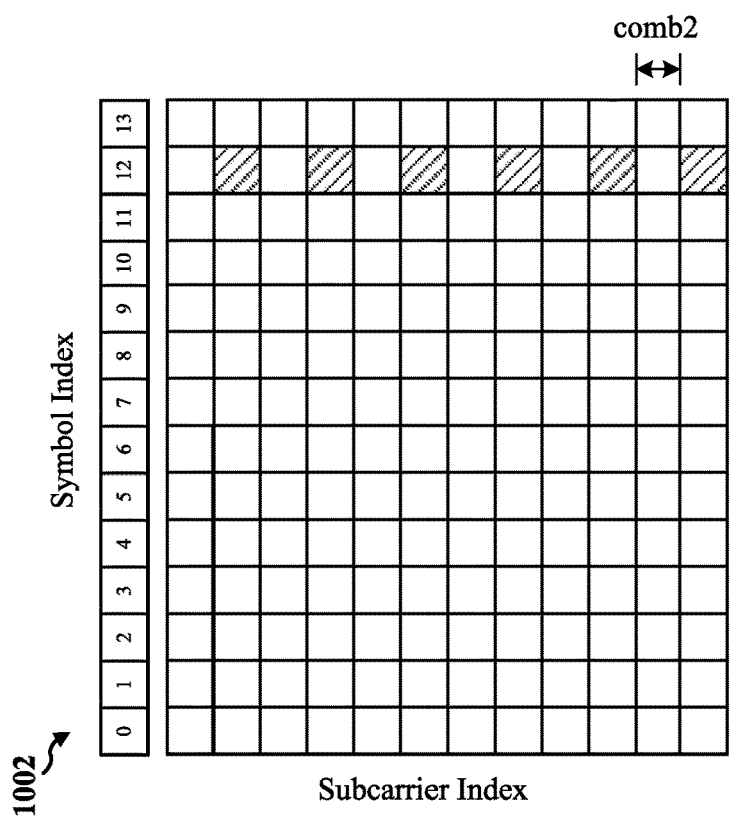
Figure 10

SOUNDING REFERENCE SIGNAL (SRS) ENHANCEMENTS

CROSS-REFERENCE TO RELATED APPLICATIONS

This application is a 371 national stage of Patent Cooperation Treaty (PCT) Application No. PCT/CN2021/075223, filed on Feb. 4, 2021, entitled "SOUNDING REFERENCE SIGNAL (SRS) ENHANCEMENTS," which claims priority to Patent Cooperation Treaty (PCT) Application No. PCT/CN2020/074521, filed on Feb. 7, 2020, entitled "SOUNDING REFERENCE SIGNAL (SRS) ENHANCEMENTS," which are hereby expressly incorporated by reference herein.

TECHNICAL FIELD

This disclosure relates generally to wireless communications and, more specifically, to wireless communications using frequency hopping techniques in unlicensed frequency bands.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G NR, which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by a user equipment (UE), and may include receiving sounding reference signal (SRS) configuration information indicating a frequency hopping pattern, transmitting one or more SRS resources on a first frequency subband of the frequency hopping pattern using a first set of SRS ports, and transmitting the one or more SRS resources on a second frequency subband of the frequency hopping pattern using a second set of SRS ports different than the first set of SRS ports. In some implementations, the first set of SRS ports corresponds to at least one different antenna port index than the second set of SRS ports. In some instances, the first and second sets of SRS ports may be configured to sound all antenna ports of the UE.

In some implementations, the one or more SRS resources may be transmitted on the first frequency subband using a first group of antenna ports, and the one or more SRS resources may be transmitted on the second frequency subband using a second group of antenna ports that includes at least one antenna port not included in the first group of antenna ports. In some instances, the SRS configuration information includes a higher-layer parameter freqHoppingPort indicating first port numbers corresponding to the first set of SRS ports and indicating second port numbers corresponding to the second set of SRS ports.

In some implementations, the method may also include receiving a message from a base station. In some instances, the message may indicate at least one of a number of antenna ports used to transmit SRS resources on each frequency subband of the frequency hopping pattern or antenna port numbers associated with transmission of the SRS resources on each frequency subband of the frequency hopping pattern. In some implementations, the message may be one of a medium access control (MAC) control element (CE) (MAC-CE) command or a downlink control information (DCI) message.

Another innovative aspect of the subject matter described in this disclosure can be implemented in a UE. The UE may include one or more processors coupled to a memory. The memory may store instructions that, when executed by the one or more processors, cause the UE to perform a number of operations. In some implementations, the number of operations may include receiving SRS configuration information indicating a frequency hopping pattern, transmitting one or more SRS resources on a first frequency subband of the frequency hopping pattern using a first set of SRS ports, and transmitting the one or more SRS resources on a second frequency subband of the frequency hopping pattern using a second set of SRS ports different than the first set of SRS ports. In some implementations, the first set of SRS ports corresponds to at least one different antenna port index than the second set of SRS ports. In some instances, the first and second sets of SRS ports may be configured to sound all antenna ports of the UE.

In some implementations, the one or more SRS resources may be transmitted on the first frequency subband using a first group of antenna ports, and the one or more SRS resources may be transmitted on the second frequency subband using a second group of antenna ports that includes at least one antenna port not included in the first group of antenna ports. In some instances, the SRS configuration information includes a higher-layer parameter freqHoppingPort indicating first port numbers corresponding to the first set of SRS ports and indicating second port numbers corresponding to the second set of SRS ports.

In some implementations, the UE may receive a message from a base station. In some instances, the message may indicate at least one of a number of antenna ports used to transmit SRS resources on each frequency subband of the frequency hopping pattern or antenna port numbers associated with transmission of the SRS resources on each frequency subband of the frequency hopping pattern. In some implementations, the message may be one of a MAC-CE command or a DCI message.

Another innovative aspect of the subject matter described in this disclosure can be implemented as a method for wireless communication. The method may be performed by a UE, and may include receiving an indication of an SRS resource set including a plurality of SRS resources, and transmitting at least some SRS resources of the plurality of SRS resources using different slot offset values, using different periodicities, or using different slot offset values and different periodicities. In some implementations, the method may also include receiving an indication of a frequency hopping pattern, transmitting the at least some SRS resources on a first frequency subband of the frequency hopping pattern using a first slot offset value, and transmitting the at least some SRS resources on a second frequency subband of the frequency hopping pattern using a second slot offset value different than the first slot offset value. In some instances, the at least some SRS resources may be transmitted on the first frequency subband in the $n^{th}$ symbol of a first uplink (UL) slot, and the at least some SRS resources may be transmitted on the second frequency subband in the $n^{th}+1$ symbol of a second UL slot.

In some implementations, the method may also include receiving a message from a base station. In some instances, the message may indicate at least one of a number of antenna ports used to transmit SRS resources on each frequency subband of the frequency hopping pattern, antenna port numbers associated with transmission of the SRS resources on each frequency subband of the frequency hopping pattern, or a periodicity and offset value associated with transmission of the SRS resources on each frequency subband of the frequency hopping pattern. In some implementations, the message may be one of a MAC-CE command or a DCI message.

Another innovative aspect of the subject matter described in this disclosure can be implemented in a UE. The UE may include one or more processors coupled to a memory. The memory may store instructions that, when executed by the one or more processors, cause the UE to perform a number of operations. In some implementations, the number of operations may include receiving an indication of an SRS resource set including a plurality of SRS resources, and transmitting at least some SRS resources of the plurality of SRS resources using different slot offset values, using different periodicities, or using different slot offset values and different periodicities. In some implementations, the UE may also receive an indication of a frequency hopping pattern, may transmit the at least some SRS resources on a first frequency subband of the frequency hopping pattern using a first slot offset value, and may transmit the at least some SRS resources on a second frequency subband of the frequency hopping pattern using a second slot offset value different than the first slot offset value. In some instances, the at least some SRS resources may be transmitted on the first frequency subband in the $n^{th}$ symbol of a first uplink slot, and the at least some SRS resources may be transmitted on the second frequency subband in the $n^{th}+1$ symbol of a second UL slot.

In some implementations, the UE may also receive a message from a base station. In some instances, the message may indicate at least one of a number of antenna ports used to transmit SRS resources on each frequency subband of the frequency hopping pattern, antenna port numbers associated with transmission of the SRS resources on each frequency subband of the frequency hopping pattern, or a periodicity and offset value associated with transmission of the SRS resources on each frequency subband of the frequency hopping pattern. In some implementations, the message may be one of a MAC-CE command or a DCI message.

Another innovative aspect of the subject matter described in this disclosure can be implemented as a method for wireless communication. The method may be performed by a UE, and may include receiving SRS configuration information indicating a frequency hopping pattern, transmitting one or more SRS resources on a first frequency subband of the frequency hopping pattern based on a first transmission comb value, and transmitting the one or more SRS resources on a second frequency subband of the frequency hopping pattern based on a second transmission comb value different than the first transmission comb value. In some implementations, the one or more SRS resources may be transmitted on the first frequency subband using every $i^{th}$ subcarrier index of a group of subcarrier indices, and the one or more SRS resources may be transmitted on the second frequency subband using every $n^{th}$ subcarrier index of the group of subcarrier indices, where the $i^{th}$ subcarrier index is different than the $n^{th}$ subcarrier index. In some instances, the SRS configuration information includes higher-layer parameters transmissionComb and freqHoppingTC indicating the values of i and n.

The method may also include repeating transmission of the one or more SRS resources on a respective frequency subband R times. In some implementations, the method may also include mapping each of the antenna ports of an SRS resource in a respective slot to the corresponding set of subcarriers within each pair of R adjacent orthogonal frequency-division multiplex (OFDM) symbols based at least in part on the higher-layer parameters transmissionComb and freqHoppingTC. In some instances, frequency hopping across the pairs of R adjacent OFDM symbols may be based at least in part on the higher-layer parameters transmissionComb and freqHoppingTC.

In some implementations, the method may also include receiving a message from a base station. In some instances, the message may indicate at least one of a number of antenna ports used to transmit SRS resources on each frequency subband of the frequency hopping pattern, antenna port numbers associated with transmission of the SRS resources on each frequency subband of the frequency hopping pattern, a periodicity and offset value associated with transmission of the SRS resources on each frequency subband of the frequency hopping pattern, or a transmission comb value associated with transmission of the SRS resources on each frequency subband of the frequency hopping pattern. Additionally, in some implementations, the one or more SRS resources may be transmitted on the first frequency subband pattern based on a first comb offset value, and the one or more SRS resources may be transmitted on the second frequency subband based on a second comb offset value different than the first comb offset value.

Another innovative aspect of the subject matter described in this disclosure can be implemented in a UE. The UE may include one or more processors coupled to a memory. The memory may store instructions that, when executed by the one or more processors, cause the UE to perform a number of operations. In some implementations, the number of operations may include receiving SRS configuration information indicating a frequency hopping pattern, transmitting one or more SRS resources on a first frequency subband of the frequency hopping pattern based on a first transmission comb value, and transmitting the one or more SRS resources on a second frequency subband of the frequency hopping pattern based on a second transmission comb value different than the first transmission comb value. In some implementations, the one or more SRS resources may be transmitted on the first frequency subband using every $i^{th}$ subcarrier index of a group of subcarrier indices, and the one or more SRS resources may be transmitted on the second frequency subband using every $n^{th}$ subcarrier index of the group of subcarrier indices, where the $i^{th}$ subcarrier index is different than the $n^{th}$ subcarrier index. In some instances, the SRS configuration information includes higher-layer parameters transmissionComb and freqHoppingTC indicating the values of i and n.

The number of operations may also include repeating transmission of the one or more SRS resources on a respective frequency subband R times. In some implementations, the UE may map each of the antenna ports of an SRS resource in a respective slot to the corresponding set of subcarriers within each pair of R adjacent OFDM symbols based at least in part on the higher-layer parameters transmissionComb and freqHoppingTC. In some instances, frequency hopping across the pairs of R adjacent OFDM symbols may be based at least in part on the higher-layer parameters transmissionComb and freqHoppingTC.

In some implementations, the UE may also receive a message from a base station. In some instances, the message may indicate at least one of a number of antenna ports used to transmit SRS resources on each frequency subband of the frequency hopping pattern, antenna port numbers associated with transmission of the SRS resources on each frequency subband of the frequency hopping pattern, a periodicity and offset value associated with transmission of the SRS resources on each frequency subband of the frequency hopping pattern, or a transmission comb value associated with transmission of the SRS resources on each frequency subband of the frequency hopping pattern. Additionally, in some implementations, the one or more SRS resources may be transmitted on the first frequency subband pattern based on a first comb offset value, and the one or more SRS resources may be transmitted on the second frequency subband based on a second comb offset value different than the first comb offset value.

Another innovative aspect of the subject matter described in this disclosure can be implemented as a method for wireless communication. The method may be performed by a UE, and may include receiving a message identifying a frequency band, transmitting first SRS resources on the identified frequency band based on a first transmission comb value, and transmitting second SRS resources on one or more other frequency bands based on a second transmission comb value different than the first transmission comb value. In some instances, the first SRS resources may be transmitted on the identified frequency band using every $i^{th}$ subcarrier index within a first group of subcarrier indices corresponding to the first SRS resources, and the second SRS resources may be transmitted on the one or more other frequency bands using every $n^{th}$ subcarrier index within a second group of subcarrier indices corresponding to the second SRS resources, where the $i^{th}$ subcarrier index is different than the $n^{th}$ subcarrier index.

In some implementations, the method also includes receiving higher-layer parameters transmissionComb and freqHoppingTC indicating the values of i and n. The method may include receiving a higher-layer parameter resourceMapping indicating a start position of the identified frequency band. In some instances, the first group of subcarrier indices spans a first number of resource blocks (RBs), and the second group of subcarrier indices spans a second number of RBs different than the first number of RBs.

Another innovative aspect of the subject matter described in this disclosure can be implemented in a UE. The UE may include one or more processors coupled to a memory. The memory may store instructions that, when executed by the one or more processors, cause the UE to perform a number of operations. In some implementations, the number of operations may include receiving a message identifying a frequency band, transmitting first SRS resources on the identified frequency band based on a first transmission comb value, and transmitting second SRS resources on one or more other frequency bands based on a second transmission comb value different than the first transmission comb value. In some instances, the first SRS resources may be transmitted on the identified frequency band using every $i^{th}$ subcarrier index within a first group of subcarrier indices corresponding to the first SRS resources, and the second SRS resources may be transmitted on the one or more other frequency bands using every $n^{th}$ subcarrier index within a second group of subcarrier indices corresponding to the second SRS resources, where the $i^{th}$ subcarrier index is different than the $n^{th}$ subcarrier index.

In some implementations, the number of operations also includes receiving higher-layer parameters transmissionComb and freqHoppingTC indicating the values of i and n. The UE may also receive a higher-layer parameter resourceMapping indicating a start position of the identified frequency band. In some instances, the first group of subcarrier indices spans a first number of resource blocks (RBs), and the second group of subcarrier indices spans a second number of RBs different than the first number of RBs.

Another innovative aspect of the subject matter described in this disclosure can be implemented as a method for wireless communication. The method may be performed by a UE, and may include receiving SRS configuration information indicating a frequency hopping pattern, transmitting one or more SRS resources on a first frequency subband of the frequency hopping pattern based on a first set of SRS parameters, and transmitting the one or more SRS resources on a second frequency subband of the frequency hopping pattern based on a second set of SRS parameters different than the first set of SRS parameters. The first set of SRS parameters may identify one or more of a first set of SRS ports, first periodicity and offset values, a first transmission comb value, or a first transmission comb offset value, and the second set of SRS parameters may identify one or more of a second set of SRS ports, second periodicity and offset values, a second transmission comb value, or a second transmission comb offset value.

In some implementations, the one or more SRS resources may be transmitted on the first frequency subband using a first set of antennas, and the one or more SRS resources may be transmitted on the second frequency subband using a second set of antennas different than the first set of antennas. In addition, or in the alternative, at least some SRS resources may be transmitted on the first frequency subband using a first slot offset value, and the at least some SRS resources may be transmitted on the second frequency subband using a second slot offset value different than the first slot offset value. Additionally, the one or more SRS resources may be transmitted on the first frequency subband based on a first transmission comb value, and the one or more SRS resources may be transmitted on the second frequency subband based on a second transmission comb value different than the first transmission comb value.

Another innovative aspect of the subject matter described in this disclosure can be implemented in a UE. The UE may include one or more processors coupled to a memory. The memory may store instructions that, when executed by the one or more processors, cause the UE to perform a number of operations. In some implementations, the number of operations may include receiving SRS configuration information indicating a frequency hopping pattern, transmitting one or more SRS resources on a first frequency subband of the frequency hopping pattern based on a first set of SRS parameters, and transmitting the one or more SRS resources on a second frequency subband of the frequency hopping pattern based on a second set of SRS parameters different than the first set of SRS parameters. The first set of SRS parameters may identify one or more of a first set of SRS ports, first periodicity and offset values, a first transmission comb value, or a first transmission comb offset value, and the second set of SRS parameters may identify one or more of a second set of SRS ports, second periodicity and offset values, a second transmission comb value, or a second transmission comb offset value.

In some implementations, the one or more SRS resources may be transmitted on the first frequency subband using a first set of antennas, and the one or more SRS resources may be transmitted on the second frequency subband using a second set of antennas different than the first set of antennas. In addition, or in the alternative, at least some SRS resources may be transmitted on the first frequency subband using a first slot offset value, and the at least some SRS resources may be transmitted on the second frequency subband using a second slot offset value different than the first slot offset value. Additionally, the one or more SRS resources may be transmitted on the first frequency subband based on a first transmission comb value, and the one or more SRS resources may be transmitted on the second frequency subband based on a second transmission comb value different than the first transmission comb value.

Another innovative aspect of the subject matter described in this disclosure can be implemented as a method for wireless communication. The method may be performed by a base station (BS), and may include transmitting SRS configuration information indicating a frequency hopping pattern to a UE, receiving one or more SRS resources on a first frequency subband of the frequency hopping pattern from a first set of SRS ports of the UE, and receiving the one or more SRS resources on a second frequency subband of the frequency hopping pattern using a second set of SRS ports different than the first set of SRS ports. In some implementations, the first set of SRS ports corresponds to at least one different antenna port index than the second set of SRS ports. In some instances, the first and second sets of SRS ports may be configured to sound all antenna ports of the UE.

In some implementations, the one or more SRS resources may be received on the first frequency subband from a first group of antenna ports of the UE, and the one or more SRS resources may be received on the second frequency subband from a second group of antenna ports of the UE that includes at least one antenna port not included in the first group of antenna ports. In some instances, the SRS configuration information includes a higher-layer parameterfreqHopping-Port indicating first port numbers corresponding to the first set of SRS ports of the UE and indicating second port numbers corresponding to the second set of SRS ports of the UE.

In some implementations, the method may also include transmitting a message to the UE. In some instances, the message may indicate at least one of a number of antenna ports of the UE for transmitting SRS resources on each frequency subband of the frequency hopping pattern or antenna port numbers associated with the transmission of the SRS resources on each frequency subband of the frequency hopping pattern. In some implementations, the message may be one of a medium access control MAC-CE command or a DCI message.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting SRS configuration information indicating a frequency hopping pattern, receiving one or more SRS resources on a first frequency subband of the frequency hopping pattern from a first set of SRS ports of the UE, and receiving the one or more SRS resources on a second frequency subband of the frequency hopping pattern using a second set of SRS ports different than the first set of SRS ports. In some implementations, the first set of SRS ports corresponds to at least one different antenna port index than the second set of SRS ports. In some instances, the first and second sets of SRS ports may be configured to sound all antenna ports of the UE.

In some implementations, the one or more SRS resources may be received on the first frequency subband from a first group of antenna ports of the UE, and the one or more SRS resources may be received on the second frequency subband from a second group of antenna ports of the UE that includes at least one antenna port not included in the first group of antenna ports. In some instances, the SRS configuration information includes a higher-layer parameterfreqHopping-Port indicating first port numbers corresponding to the first set of SRS ports of the UE and indicating second port numbers corresponding to the second set of SRS ports of the UE.

In some implementations, the base station may transmit a message to the UE. In some instances, the message may indicate at least one of a number of antenna ports of the UE for transmitting SRS resources on each frequency subband of the frequency hopping pattern or antenna port numbers associated with the transmission of the SRS resources on each frequency subband of the frequency hopping pattern. In some implementations, the message may be one of a medium access control MAC-CE command or a DCI message.

Another innovative aspect of the subject matter described in this disclosure can be implemented as a method for wireless communication. The method may be performed by a base station, and may include transmitting an indication of an SRS resource set including a plurality of SRS resources to a UE, and receiving at least some SRS resources of the plurality of SRS resources based on different slot offset values, based on different periodicities, or based on different slot offset values and different periodicities. In some implementations, the indications of the SRS resource set and the frequency hopping pattern may be transmitted to the UE in a radio resource control (RRC) configuration message.

In some implementations, the method may also include transmitting an indication of a frequency hopping pattern to the UE, receiving the at least some SRS resources on a first frequency subband of the frequency hopping pattern based on a first slot offset value, and receiving the at least some SRS resources on a second frequency subband of the frequency hopping pattern based on a second slot offset value different than the first slot offset value. In some instances, the at least some SRS resources may be transmitted on the first frequency subband in the $n^{th}$ symbol of a first uplink slot, and the at least some SRS resources may be transmitted on the second frequency subband in the $n^{th}+1$ symbol of a second UL slot.

In some implementations, the method may also include transmitting a message to the UE. In some instances, the message may indicate at least one of a number of antenna ports of the UE for transmitting SRS resources on each frequency subband of the frequency hopping pattern, antenna port numbers associated with the transmission of the SRS resources on each frequency subband of the frequency hopping pattern, or a periodicity and offset value associated with the transmission of the SRS resources on each frequency subband of the frequency hopping pattern. In some implementations, the message may be one of a medium access control MAC-CE command or a DCI message.

In some implementations, the method may also include transmitting a message including a parameter periodicity-AndOffset indicating different slot offset values for at least two SRS resources of the plurality of SRS resources. In some instances, the plurality of SRS resources may be configured as periodic SRS resources, semi-persistent SRS resources, or aperiodic SRS resources based on a radio resource control (RRC) configuration message. In some instances, the configured semi-persistent SRS resources may be activated by a MAC-CE command, and the aperiodic SRS resources may be triggered by a DCI message.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting an indication of an SRS resource set including a plurality of SRS resources to a UE, and receiving at least some SRS resources of the plurality of SRS resources based on different slot offset values, based on different periodicities, or based on different slot offset values and different periodicities. In some implementations, the indications of the SRS resource set and the frequency hopping pattern may be transmitted to the UE in an RRC configuration message.

In some implementations, the base station may transmit an indication of a frequency hopping pattern to the UE, may receive the at least some SRS resources on a first frequency subband of the frequency hopping pattern based on a first slot offset value, and may receive the at least some SRS resources on a second frequency subband of the frequency hopping pattern based on a second slot offset value different than the first slot offset value. In some instances, the at least some SRS resources may be transmitted on the first frequency subband in the $n^{th}$ symbol of a first uplink slot, and the at least some SRS resources may be transmitted on the second frequency subband in the $n^{th}+1$ symbol of a second UL slot.

In some instances, the base station may transmit a message to the UE. In some instances, the message may indicate at least one of a number of antenna ports of the UE for transmitting SRS resources on each frequency subband of the frequency hopping pattern, antenna port numbers associated with the transmission of the SRS resources on each frequency subband of the frequency hopping pattern, or a periodicity and offset value associated with the transmission of the SRS resources on each frequency subband of the frequency hopping pattern. In some implementations, the message may be one of a medium access control MAC-CE command or a DCI message.

In some implementations, the base station may transmit a message including a parameter periodicityAndOffset indicating different slot offset values for at least two SRS resources of the plurality of SRS resources. In some instances, the plurality of SRS resources may be configured as periodic SRS resources, semi-persistent SRS resources, or aperiodic SRS resources based on an RRC configuration message. In some instances, the configured semi-persistent SRS resources may be activated by a MAC-CE command, and the aperiodic SRS resources may be triggered by a DCI message.

Another innovative aspect of the subject matter described in this disclosure can be implemented as a method for wireless communication. The method may be performed by a base station, and may include transmitting SRS configuration information indicating a frequency hopping pattern to a UE, receiving one or more SRS resources on a first frequency subband of the frequency hopping pattern based on a first transmission comb value, and receiving the one or more SRS resources on a second frequency subband of the frequency hopping pattern based on a second transmission comb value different than the first transmission comb value. In some implementations, the one or more SRS resources may be transmitted on the first frequency subband using every $i^{th}$ subcarrier index of a group of subcarrier indices, and the one or more SRS resources may be transmitted on the second frequency subband using every $n^{th}$ subcarrier index of the group of subcarrier indices, where the $i^{th}$ subcarrier index is different than the $n^{th}$ subcarrier index. In some instances, the SRS configuration information includes higher-layer parameters transmissionComb and freqHoppingTC indicating the values of i and n.

In some implementations, the one or more SRS resources may be configured as periodic SRS resources, semi-persistent SRS resources, or aperiodic SRS resources based on an RRC configuration message. In some instances, the configured semi-persistent SRS resources may be activated by a MAC-CE command, and the aperiodic SRS resources may be triggered by a DCI message.

In some implementations, the method may also include transmitting a message to the UE. In some instances, the message may indicate at least one of a number of antenna ports of the UE for transmitting SRS resources on each frequency subband of the frequency hopping pattern, antenna port numbers associated with the transmission of the SRS resources on each frequency subband of the frequency hopping pattern, a periodicity and offset value associated with the transmission of the SRS resources on each frequency subband of the frequency hopping pattern, or a transmission comb value associated with the transmission of the SRS resources on each frequency subband of the frequency hopping pattern.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting SRS configuration information indicating a frequency hopping pattern to a UE, receiving one or more SRS resources on a first frequency subband of the frequency hopping pattern based on a first transmission comb value, and receiving the one or more SRS resources on a second frequency subband of the frequency hopping pattern based on a second transmission comb value different than the first transmission comb value. In some implementations, the one or more SRS resources may be transmitted on the first frequency subband pattern based on a first comb offset value, and the one or more SRS resources may be transmitted on the second frequency subband based on a second comb offset value different than the first comb offset value. In some instances, the one or more SRS resources may be transmitted on the first frequency subband using every $i^{th}$ subcarrier index of a group of subcarrier indices, and the one or more SRS resources may be transmitted on the second frequency subband using every $n^{th}$ subcarrier index of the group of subcarrier indices, where the $i^{th}$ subcarrier index is different than the $n^{th}$ subcarrier index.

In some implementations, the one or more SRS resources may be configured as periodic SRS resources, semi-persistent SRS resources, or aperiodic SRS resources based on an RRC configuration message. In some instances, the configured semi-persistent SRS resources may be activated by a MAC-CE command, and the aperiodic SRS resources may be triggered by a DCI message.

In some implementations, the base station may transmit a message to the UE. In some instances, the message may indicate at least one of a number of antenna ports of the UE for transmitting SRS resources on each frequency subband of the frequency hopping pattern, antenna port numbers associated with the transmission of the SRS resources on each frequency subband of the frequency hopping pattern, a periodicity and offset value associated with the transmission of the SRS resources on each frequency subband of the frequency hopping pattern, or a transmission comb value associated with the transmission of the SRS resources on each frequency subband of the frequency hopping pattern.

Another innovative aspect of the subject matter described in this disclosure can be implemented as a method for wireless communication. The method may be performed by a base station, and may include transmitting a message identifying a frequency band to a UE, receiving first SRS resources on the identified frequency band based on a first transmission comb value, and receiving second SRS resources on one or more other frequency bands based on a second transmission comb value different than the first transmission comb value. In some instances, the first SRS resources may be transmitted on the identified frequency band using every $i^{th}$ subcarrier index within a first group of subcarrier indices corresponding to the first SRS resources, and the second SRS resources may be transmitted on the one or more other frequency bands using every $n^{th}$ subcarrier index within a second group of subcarrier indices corresponding to the second SRS resources, where the $i^{th}$ subcarrier index is different than the $n^{th}$ subcarrier index.

In some implementations, the method also includes transmitting higher-layer parameters transmissionComb and freqHoppingTC indicating the values of i and n. The method may also include transmitting a higher-layer parameter resourceMapping indicating a start position of the identified frequency band. In some instances, the first group of subcarrier indices spans a first number of RBs, and the second group of subcarrier indices spans a second number of RBs different than the first number of RBs.

In some implementations, the first and second SRS resources may be configured as periodic SRS resources, semi-persistent SRS resources, or aperiodic SRS resources based on an RRC configuration message. In some instances, the configured semi-persistent SRS resources may be activated by a MAC-CE command, and the aperiodic SRS resources may be triggered by a DCI message.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting a message identifying a frequency band to a UE, receiving first SRS resources on the identified frequency band based on a first transmission comb value, and receiving second SRS resources on one or more other frequency bands based on a second transmission comb value different than the first transmission comb value. In some instances, the first SRS resources may be transmitted on the identified frequency band using every $i^{th}$ subcarrier index within a first group of subcarrier indices corresponding to the first SRS resources, and the second SRS resources may be transmitted on the one or more other frequency bands using every $n^{th}$ subcarrier index within a second group of subcarrier indices corresponding to the second SRS resources, where the $i^{th}$ subcarrier index is different than the $n^{th}$ subcarrier index.

In some implementations, the number of operations also includes transmitting higher-layer parameters transmissionComb and freqHoppingTC indicating the values of i and n. The base station may also transmit a higher-layer parameter resourceMapping indicating a start position of the identified frequency band. In some instances, the first group of subcarrier indices spans a first number of RBs, and the second group of subcarrier indices spans a second number of RBs different than the first number of RBs.

In some implementations, the first and second SRS resources may be configured as periodic SRS resources, semi-persistent SRS resources, or aperiodic SRS resources based on an RRC configuration message. In some instances, the configured semi-persistent SRS resources may be activated by a MAC-CE command, and the aperiodic SRS resources may be triggered by a DCI message.

Another innovative aspect of the subject matter described in this disclosure can be implemented as a method for wireless communication. The method may be performed by a base station, and may include transmitting SRS configuration information indicating a frequency hopping pattern to a UE, receiving one or more SRS resources on a first frequency subband of the frequency hopping pattern based on a first set of SRS parameters, and receiving the one or more SRS resources on a second frequency subband of the frequency hopping pattern based on a second set of SRS parameters different than the first set of SRS parameters. The first set of SRS parameters may identify one or more of a first set of SRS ports of the UE, first periodicity and offset values, a first transmission comb value, or a first transmission comb offset value, and the second set of SRS parameters may identify one or more of a second set of SRS ports of the UE, second periodicity and offset values, a second transmission comb value, or a second transmission comb offset value.

In some implementations, the one or more SRS resources may be received on the first frequency subband from a first set of antennas of the UE, and the one or more SRS resources may be received on the second frequency subband from a second set of antennas of the UE different than the first set of antennas. In addition, or in the alternative, at least some SRS resources may be received on the first frequency subband using a first slot offset value, and the at least some SRS resources may be received on the second frequency subband using a second slot offset value different than the first slot offset value. Additionally, the one or more SRS resources may be received on the first frequency subband based on a first transmission comb value, and the one or more SRS resources may be received on the second frequency subband based on a second transmission comb value different than the first transmission comb value.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting SRS configuration information indicating a frequency hopping pattern to a UE, receiving one or more SRS resources on a first frequency subband of the frequency hopping pattern based on a first set of SRS parameters, and receiving the one or more SRS resources on a second frequency subband of the frequency hopping pattern based on a second set of SRS parameters different than the first set of SRS parameters. The first set of SRS parameters may identify one or more of a first set of SRS ports of the UE, first periodicity and offset values, a first transmission comb value, or a first transmission comb offset value, and the second set of SRS parameters may identify one or more of a second set of SRS ports of the UE, second periodicity and offset values, a second transmission comb value, or a second transmission comb offset value.

In some implementations, the one or more SRS resources may be received on the first frequency subband from a first set of antennas of the UE, and the one or more SRS resources may be received on the second frequency subband from a second set of antennas of the UE different than the first set of antennas. In other implementations, at least some SRS resources may be received on the first frequency subband using a first slot offset value, and the at least some SRS resources may be received on the second frequency subband using a second slot offset value different than the first slot offset value. In some other implementations, the one or more SRS resources may be received on the first frequency subband based on a first transmission comb value, and the one or more SRS resources may be received on the second frequency subband based on a second transmission comb value different than the first transmission comb value.

Another innovative aspect of the subject matter described in this disclosure can be implemented as a method for wireless communication. The method may be performed by a UE, and may include receiving SRS configuration information indicating a frequency hopping pattern, transmitting one or more SRS resources on a first frequency subband of the frequency hopping pattern using a first number of symbols, and transmitting the one or more SRS resources on a second frequency subband of the frequency hopping pattern using a second number of symbols different than the first number of symbols.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting SRS configuration information indicating a frequency hopping pattern to a UE, receiving one or more SRS resources on a first frequency subband of the frequency hopping pattern using a first number of symbols, and receiving the one or more SRS resources on a second frequency subband of the frequency hopping pattern using a second number of symbols different than the first number of symbols.

Another innovative aspect of the subject matter described in this disclosure can be implemented as a method for wireless communication. The method may be performed by a UE, and may include receiving SRS configuration information indicating a frequency hopping pattern, transmitting one or more SRS resources on a first frequency subband of the frequency hopping pattern using a first set of power control parameters, and transmitting the one or more SRS resources on a second frequency subband of the frequency hopping pattern using a second set of power control parameters different than the first set of power control parameters.

In some implementations, the first set of power control parameters includes a first default power parameter that is different than a second default power parameter of the second set of power control parameters. The first default power parameter and the second default power parameter are p0 parameters. In some implementations, the first set of power control parameters includes a first offset factor parameter that is different than a second offset factor parameter of the second set of power control parameters. The first offset factor parameter and the second offset factor parameter are alpha parameters.

Another innovative aspect of the subject matter described in this disclosure can be implemented in a base station. The base station may include one or more processors coupled to a memory. The memory may store instructions that, when executed by the one or more processors, cause the base station to perform a number of operations. In some implementations, the number of operations may include transmitting SRS configuration information indicating a frequency hopping pattern to a UE, receiving one or more SRS resources on a first frequency subband of the frequency hopping pattern using a first number of symbols, and receiving the one or more SRS resources on a second frequency subband of the frequency hopping pattern using a second number of symbols different than the first number of symbols.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 10 shows an example SRS transmission pattern that may be used without frequency hopping according to some implementations.

Like reference numbers and designations in the various drawings indicate like elements.

DETAILED DESCRIPTION

Figure 1:
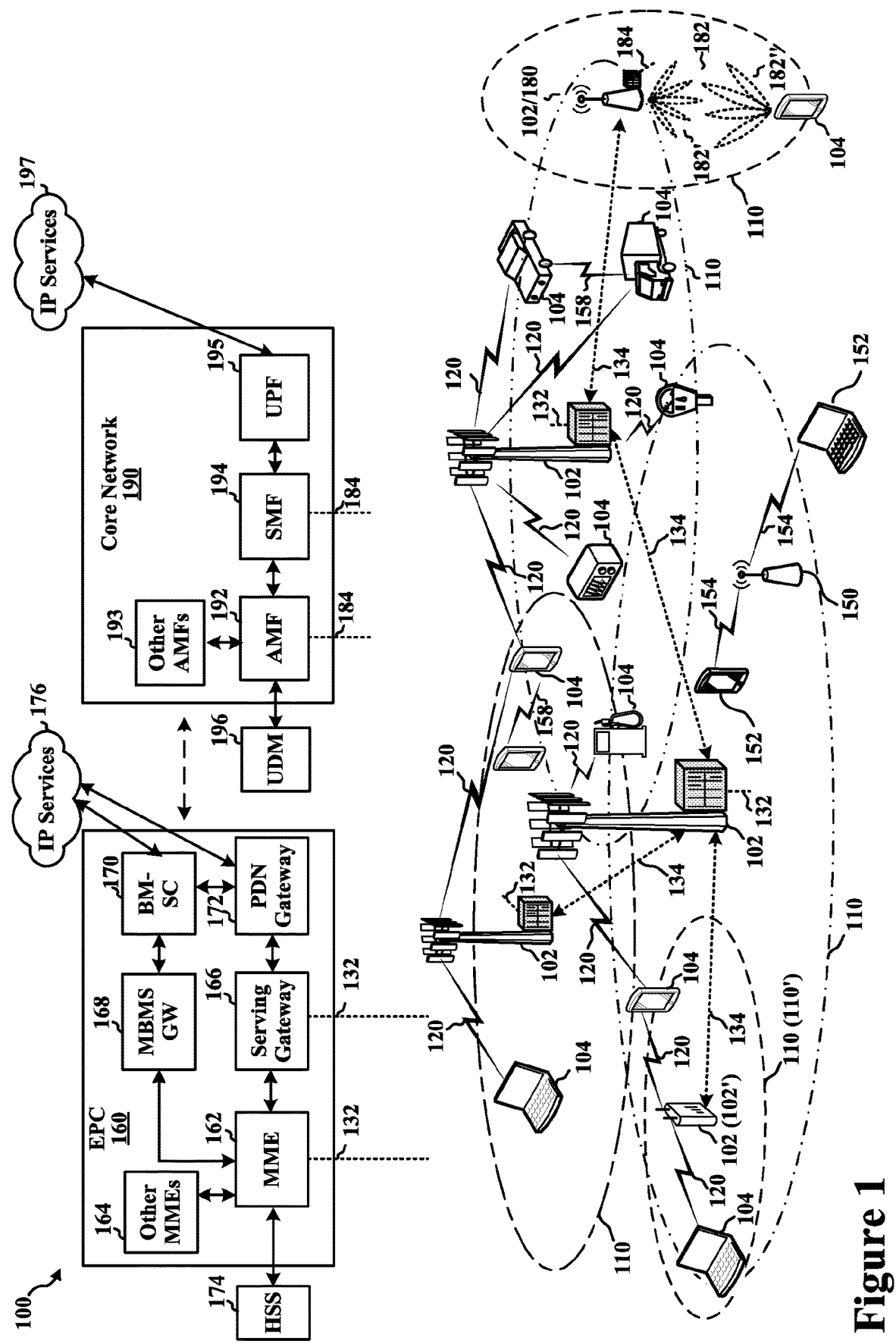
FIG. 1 shows a diagram illustrating an example wireless communications system.

The following description is directed to some implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to channel sounding in a wireless communication system. Some implementations more specifically relate to configuring SRS resources for transmission to a base station using frequency hopping. A device, such as a user equipment (UE), may be configured to transmit SRS resources to another device, such as a network node or base station (BS), on different frequency bands using different SRS parameters and/or different transmission patterns. The base station may use the received SRS resources to estimate channel conditions and/or to determine channel information associated with the UE's antenna ports. For example, the base station may determine a channel quality indicator (CQI), rank indicator (RI), or precoding matrix indicator (PMI) based on the received SRS resources. More specifically, the base station may use the channel information determined from the SRS resources to select the best channel and/or the best antenna port configuration for DL transmissions to the UE.

In some implementations, the base station may use the determined channel information to configure a number of SRS resource sets that can be used with frequency hopping for channel sounding. The base station may provide the UE with indications of the configured SRS resource sets, one or more frequency hopping patterns, one or more frequency hopping parameters, one or more SRS parameters, one or more higher-layer parameters, and/or other suitable information. The indications may be provided to the UE via RRC signaling and/or DL messages. The UE may use the received indications to configure one or more SRS transmissions to the base station using the frequency hopping pattern.

More specifically, the UE may transmit one or more SRS resources on a first frequency subband of the frequency hopping pattern based on a first set of SRS parameters, and may transmit one or more SRS resources on a second frequency subband of the frequency hopping pattern based on a second set of SRS parameters that are different than the first set of SRS parameters. Each set of SRS parameters may identify one or more of a number of SRS ports, a number of antenna port indices, a periodicity, an offset value, a transmission comb value, a first transmission comb offset value, or other suitable parameters or values. The UE may transmit SRS resources on different frequency subbands of the frequency hopping pattern using different SRS ports, different antenna port indices, different periodicities, different offset values, different transmission comb values, and/or different transmission comb offset values.

In some implementations, the UE may transmit SRS resources on a first frequency subband using a first set of SRS ports or antenna port indices, and may transmit SRS resources on a second frequency subband using a second set of SRS ports or antenna port indices that are different than the first set of SRS ports or antenna port indices. For example, the UE may transmit SRS resources on the first frequency subband using a first group of antenna ports, and transmit SRS resources on the second frequency subband using a second group of antenna ports that is different than the first group of antenna ports. In some instances, the first and second sets of SRS ports may be configured to sound all antenna ports of the UE.

In other implementations, the UE may transmit SRS resources on the first and second frequency subbands using different slot offset values and/or different periodicities. In some instances, the UE may transmit SRS resources on the first frequency subband in a first slot, and may transmit SRS resources on the second frequency subband in a second slot that is different than the first slot. In some other instances, the UE may transmit SRS resources on the first frequency subband in a first symbol period of a first slot, and may transmit SRS resources on the second frequency subband in a second symbol period of a second slot.

In some other implementations, the UE may transmit SRS resources on the first frequency subband using a first transmission comb value, and may transmit SRS resources on the second frequency subband using a second transmission comb value that is different than the first transmission comb value. In addition, or in the alternative, the UE may transmit SRS resources on the first frequency subband using a first transmission comb offset value, and may transmit SRS resources on the second frequency subband using a second transmission comb offset value that is different than the first transmission comb offset value.

In other implementations, the UE may receive a message identifying a specific frequency band and indicating a set of unique parameters for SRS transmissions on the specified frequency band. The UE may transmit SRS resources on the specified frequency band based on the set of unique parameters, and may transmit SRS resources on one or more other (non-specified) frequency bands based on different parameters. For example, in some instances, the UE may transmit SRS resources on the specified frequency band based on a first transmission comb value, and may transmit SRS resources on the one or more other frequency bands based on a second transmission comb value that is different than the first transmission comb value.

In some implementations, the UE may transmit SRS resources on a first frequency subband using a first number of symbols, and may transmit SRS resources on a second frequency subband using a second number of symbols that is different than the first number of symbols. For example, the UE may transmit SRS resources on the first frequency subband using a one symbol, and transmit SRS resources on the second frequency subband using two symbols.

In some implementations, the UE may transmit SRS resources on a first frequency subband using a first set of power control parameters, and may transmit SRS resources on a second frequency subband using a second set of power control parameters that are different than the first set of power control parameters. For example, the UE may transmit SRS resources on the first frequency subband using a default power parameter and/or an offset factor parameter that are different than a default power parameter and/or an offset factor parameter used on the second frequency subband.

Various implementations of the subject matter described in this disclosure can be implemented to realize one or more of the following potential advantages. The accuracy of channel estimates may be proportional to the frequency bandwidth used for SRS transmissions. For example, channel information derived from SRS resources transmitted using a relatively large frequency bandwidth may be more accurate than channel information derived from SRS resources transmitted using a relatively small frequency bandwidth. However, wideband SRS transmissions consume more resources and more power than narrowband SRS transmissions, and may not be suitable for UEs with limited power, limited resources, or located on the edge of a cell. By using frequency hopping for SRS transmissions, a UE may sound a wide bandwidth of interest (such as a bandwidth part (BWP) of a base station) by transmitting SRS resources on a plurality of different narrow bandwidths that collectively span or cover the wide bandwidth of interest, which may require fewer SRS resources and consume less power than wideband SRS transmissions. Additionally, because channel conditions on different frequency bands may be different from one another, the ability to transmit SRS resources on a specified frequency band based on a periodicity and/or a transmission comb value that is different than the periodicities, number of symbols, power control parameters, and/or transmission comb values used for SRS transmissions on other frequency bands may allow SRS transmissions on the specified frequency band to have a different density (or sparseness) or power than SRS transmissions on the other frequency bands. For example, when channel conditions on the specified frequency band are better than a value (or better than channel conditions on one or more other frequency bands), the base station may configure SRS transmissions on the specified frequency band to be sparser than SRS transmissions on the one or more other frequency bands, for example, by using a larger periodicity, smaller number, and/or transmission comb value for SRS transmissions on the specified frequency band than for SRS transmissions on the one or more other frequency bands.

The accuracy of channel estimates may also depend on the number of UE antennas or SRS ports that are sounded. For example, channel information based on SRS resources received from four antennas of a UE may be more accurate than channel information based on SRS resources received from only two antennas of the UE. Among other advantages, transmitting SRS resources on different frequency subbands using different sets of antenna ports of the UE may allow a base station (or other receiving device) to determine channel information for all antenna ports of the UE using narrowband SRS transmissions, which may require fewer resources and may consume less power than wideband SRS transmissions. In another example, using different power parameters for different frequency bands may enable the UE to account for different conditions for different frequency bands.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100, which may be a Next Generation RAN (NG-RAN), includes base stations 102, UEs 104, an Evolved Packet Core (EPC) 160, and another core network 190. The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 via 51 interfaces, and the base stations 102 configured for 5G NR may interface with the core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or the core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102 and UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 2.4 GHz unlicensed frequency spectrum, a 5 GHz unlicensed frequency spectrum, or both. When communicating in an unlicensed frequency spectrum, the STAs 152 and the AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW gNB 180 may utilize beamforming 182 with the UE 104 to compensate for the extremely high path loss and short range.

The gNB 180 may transmit a beamformed signal to the UE 104 in one or more transmit directions 182'. The UE 104 may receive the beamformed signal from the gNB 180 in one or more receive directions 182". The UE 104 also may transmit a beamformed signal to the gNB 180 in one or more transmit directions. The gNB 180 may receive the beamformed signal from the UE 104 in one or more receive directions. The gNB 180 and UE 104 may perform beam training to determine the best receive and transmit directions for each of the gNB 180 and UE 104. The transmit and receive directions for the gNB 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
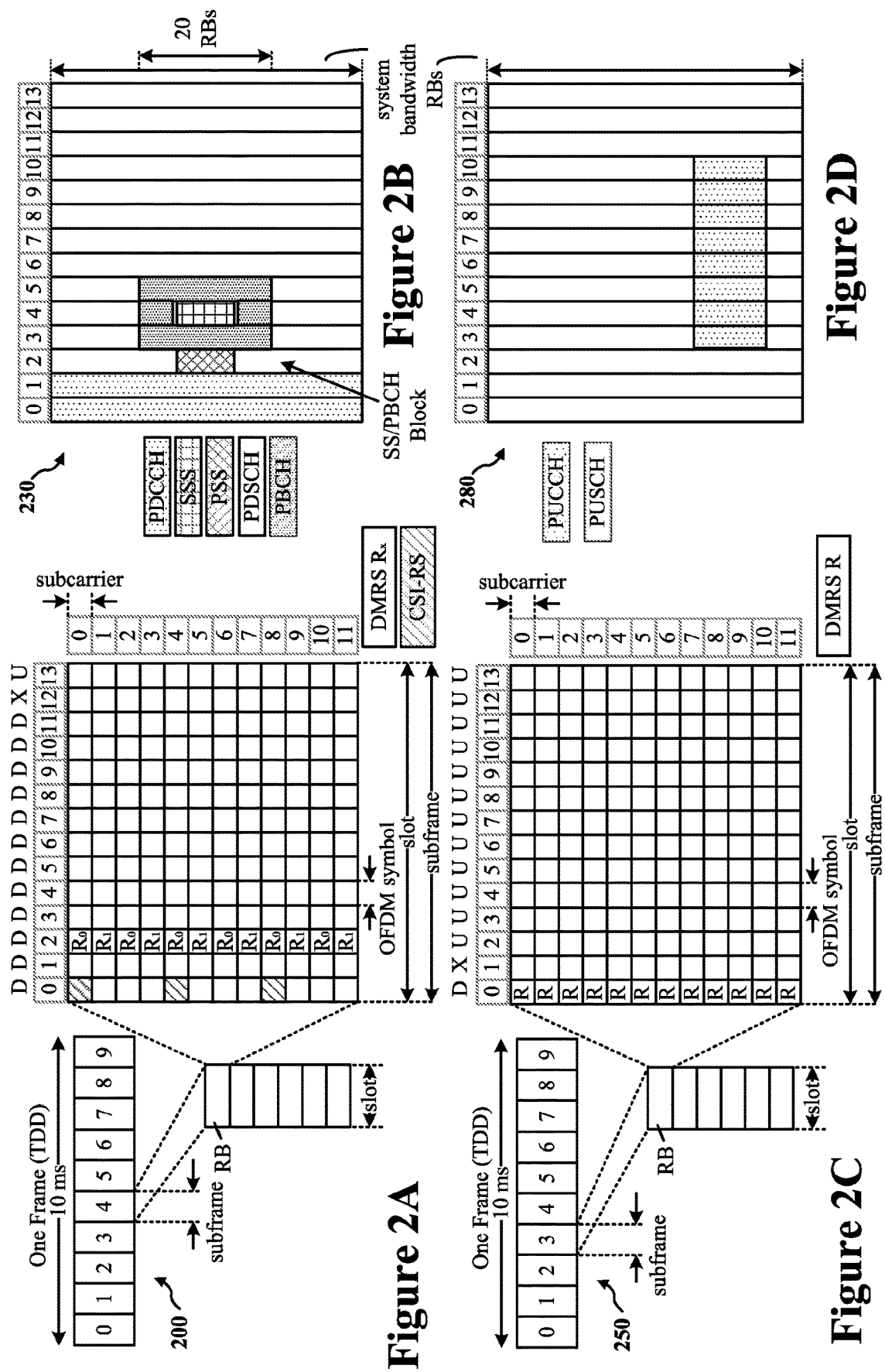
FIG. 2A shows an example of a first 5G NR frame.
FIG. 2B shows example downlink (DL) channels within a 5G NR slot.
FIG. 2C shows an example of a second 5G NR frame.
FIG. 2D shows example uplink (UL) channels within a 5G NR slot.

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. In some cases, the 5G NR frame structure may be FDD in which, for a set of subcarriers (carrier system bandwidth), slots within the set of subcarriers are dedicated for either DL or UL transmissions. In other cases, the 5G NR frame structure may be time division duplexing (TDD) in which, for a set of subcarriers (carrier system bandwidth), slots within the set of subcarriers are dedicated for both DL and UL transmissions. In the examples shown in FIGS. 2A and 2C, the 5G NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G NR frame structure that is based on FDD.

Other wireless communication technologies may have a different frame structure or different channels. A frame may be divided into a number of equally sized subframes. For example, a frame having a duration of 10 microseconds (ms) may be divided into 10 equally sized subframes each having a duration of 1 ms. Each subframe may include one or more time slots. Each slot may include 7 or 14 symbols, depending on the slot configuration. For slot configuration 0, each slot may include 14 symbols, and for slot configuration 1, each slot may include 7 symbols. Subframes also may include mini-slots, which may include 7, 4, or 2 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols per slot and $2^\mu$ slots per subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

In some implementations, a resource element (RE) may consist of one symbol period and one subcarrier (such as a 15 kHz frequency range). A resource block (RB), also referred to as a physical resource block (PRB), typically spans across 14 OFDM symbols in the time domain and extend across 12 consecutive subcarriers in the frequency domain. Thus, an RB may include 160 REs associated with a slot of a radio subframe. The number of bits carried by each RE depends on the modulation scheme.

As illustrated in FIG. 2A, some of the REs carry a reference signal (RS) for the UE. In some configurations, one or more REs may carry a demodulation reference signal (DMRS) (indicated as Rx for one configuration, where 100x is the port number, but other DMRS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of subframes of a frame. The PSS is used by a UE 104 to determine subframe or symbol timing and a physical layer identity. A secondary synchronization signal (SSS) may be within symbol 4 of subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement/negative acknowledgement (ACK/NACK) feedback. The PUSCH carries data, and may additionally be used to carry a buffer status report (BSR), a power headroom report (PHR), or UCI.

Figure 3:
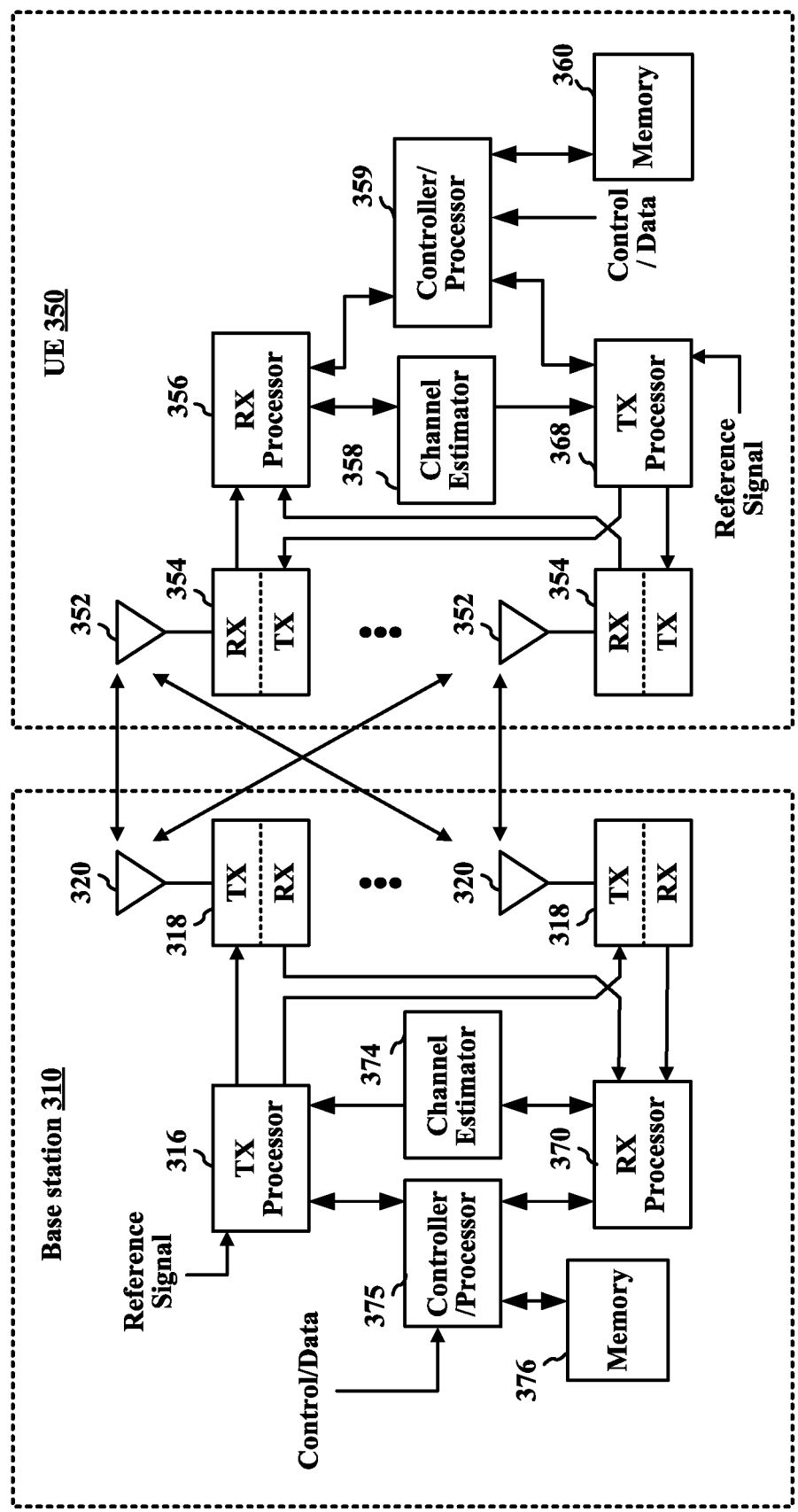
FIG. 3 shows a diagram illustrating an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in some other implementations, the UE 350 may include fewer transmitters (or transmit chains) than receive (RX) antennas. Although not shown for simplicity, each transmitter may be coupled to a respective power amplifier (PA) which amplifies the signal to be transmitted. The combination of a transmitter and a PA may be referred to herein as a "transmit chain" or "TX chain." To save on cost or die area, the same PA may be reused to transmit signals over multiple RX antennas. In other words, one or more TX chains of a UE may be selectively coupled to multiple RX antennas ports.

As mentioned above, a base station may use SRS resources transmitted from a UE to estimate channel conditions and to determine channel information associated with the UE's antennas or SRS ports. Each antenna port of a UE may correspond to a different communication channel, and thus the channel conditions for one antenna port may be different than the channel conditions for another antenna port. The number of SRS resources needed to sound each of the UE's antenna ports may depend on the number of TX chains and RX antenna ports of the UE. For example, a UE with 1 TX chain and 4 RX antenna ports (1T4R) may require 4 SRS resources to sound all 4 RX antenna ports (with each SRS resource transmitted from a single port and each SRS port associated with a different RX antenna port), and a UE with 2 TX chains and 4 RX antenna ports (2T4R) may require only 2 SRS resources to sound all 4 RX antenna ports (with each SRS resource transmitted from two ports and each SRS port associated with a different RX antenna port).

Each SRS resource may be transmitted in a corresponding symbol of a slot within an UL subframe, and the SRS resources transmitted in the same slot may be collectively referred to as an SRS resource set. The number of SRS resources that can be transmitted in the same UL slot may depend on a number of factors including, but not limited to, a switching time between transmission of UL data and SRS resources, a switching time between antenna ports, a switching time between UL and DL transmissions, and any limitations or requirements of 3GPP or other standards. For example, existing 3GPP standards (such as LTE Rel-15 and NR Rel-15) provide SRS configurations for UEs having up to 4 RX antennas (1T2R, 1T4R, 2T4R, and T=R), and support SRS resources that span 1, 2, or 4 adjacent symbols in a slot with up to 4 ports per SRS resource. Typically, an SRS resource can be transmitted only in the last 6 symbols of a slot, and SRS resources can only be transmitted after the PUSCH in the slot. SRS transmissions may be aperiodic, semi-persistent, or periodic.

Figure 4:
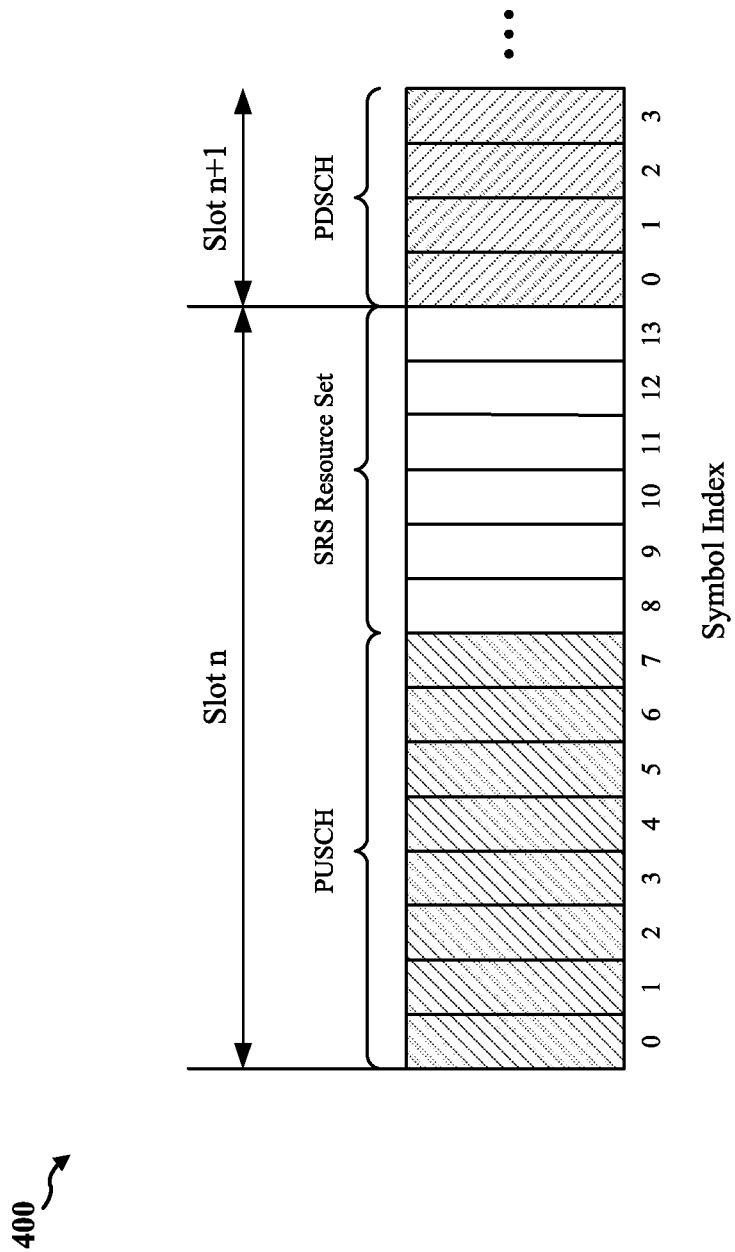
FIG. 4 shows an example slot configuration usable for communications between a base station and a UE according to some implementations.

FIG. 4 shows an example slot configuration 400 usable for communications between a base station and a UE according to some implementations. In some aspects, the slot configuration 400 may be an example implementation of any of the slot configurations described above with respect to FIGS. 2A-2D. More specifically, FIG. 4 depicts a UL slot (n) and a DL slot (n+1). The UL slot n includes 14 symbols (0-13). The first 8 symbols (0-7) may be reserved for UL data transmissions on the PUSCH, and the last 6 symbols (8-13) may be used for UL channel sounding. Thus, in the example shown, an SRS resource set is limited to the last 6 symbols of the UL slot n.

Although not shown for simplicity, a guard period may be inserted between individual SRS resources to allow time for the UE to switch between different antenna ports. In some implementations, a guard period may be provided at the beginning of the SRS resource set (such as symbol 8) to allow time for the UE to switch from transmitting UL data to SRS resources. In some other implementations, a guard period may be provided at the end of the SRS resource set (such as symbol 13) to allow time the UE to switch communications between adjacent slots (such as from UL traffic to DL traffic).

A UE may be configured with multiple SRS resources that can be grouped in one or more different SRS resource sets and can be configured for different types of sounding operations. In some implementations, different SRS resource sets can be configured for different antenna switching configurations. For example, a first SRS resource set including four SRS resources may be used for 1T4R antenna sounding operations, a second SRS resource set including one SRS resource may be used for codebook based sounding operations, and a third SRS resource set including two SRS resources may be used for beam management.

In other implementations, different SRS resource sets can be configured for different frequency bands or subbands. As discussed above, wideband SRS transmissions may allow the UE to sound an entire bandwidth of interest using single SRS transmission, and narrowband SRS transmissions consume less power than wideband SRS transmissions and may allow the UE to use frequency hopping for SRS transmissions while still being able to sound the entire bandwidth of interest. Because channel conditions may vary between different frequency bands, the UE may use different SRS configurations or different SRS transmission patterns for sounding different frequency bands. For example, one SRS resource set may be used for SRS transmissions on a first frequency subband, and a different SRS resource set may be used for SRS transmissions on a second frequency subband. In this manner, the UE can use relatively spare SRS transmissions to sound the first frequency band, and can use relatively dense SRS transmissions to sound the second frequency band.

Figure 5A:
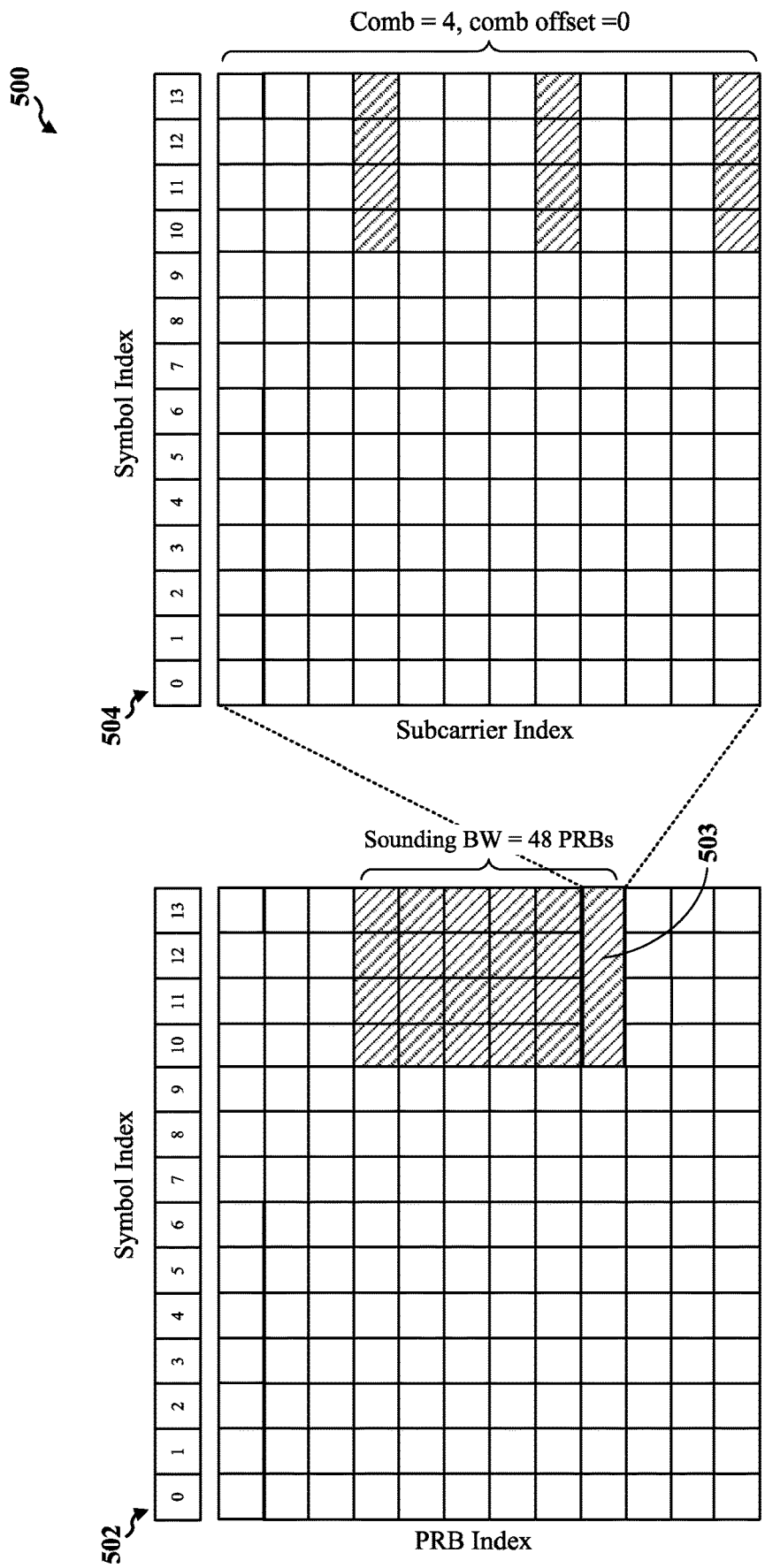
FIG. 5A shows an example sounding reference signal (SRS) resource that spans across 48 physical resource blocks (PRBs).

FIG. 5A shows an example SRS resource set 500 that spans across 4 symbols of a slot in the time domain, and extends across 48 PRBs in the frequency domain. In some instances, each PRB corresponds to one symbol in the time slot, and extends across 12 consecutive subcarriers in the frequency domain. More specifically, a first SRS transmission pattern 502 depicts SRS resources transmitted in symbol periods 10-13 of a slot and having a sounding bandwidth extending across the 48 PRBs. A second SRS transmission pattern 504 depicts a portion 503 of the first SRS transmission pattern 502 being transmitted using a transmission comb value=4 without frequency hopping. Thus, the SRS resources associated with the second SRS transmission pattern 504 are transmitted in symbol periods 10-13 of the slot using every fourth subcarrier of the PRBs.

Figure 5C:
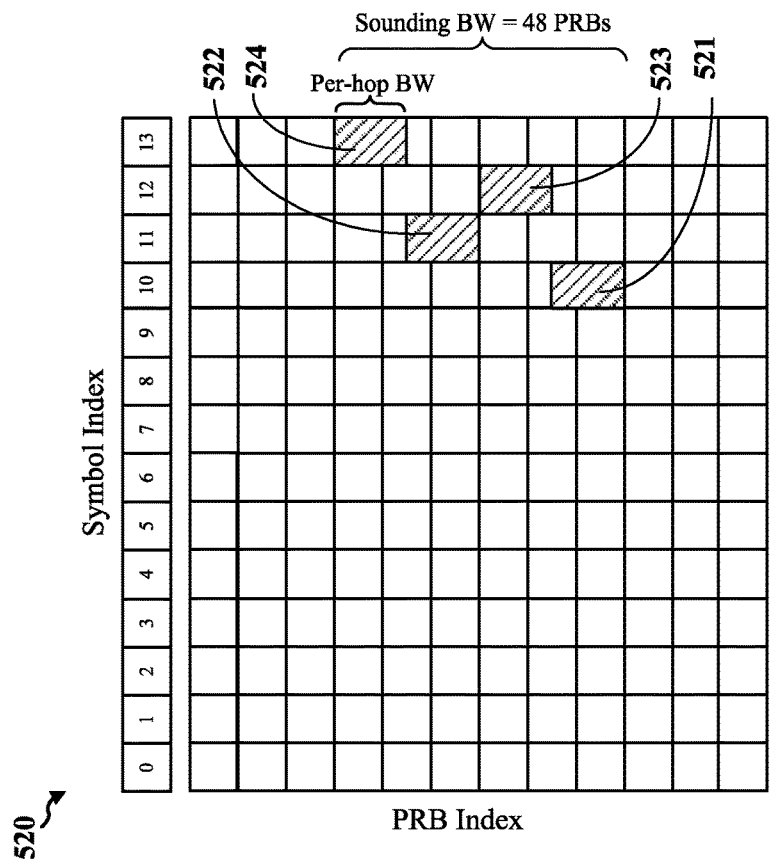
FIG. 5C shows another example SRS resource that spans across 48 PRBs and can be used with frequency hopping.
Figure 5B:
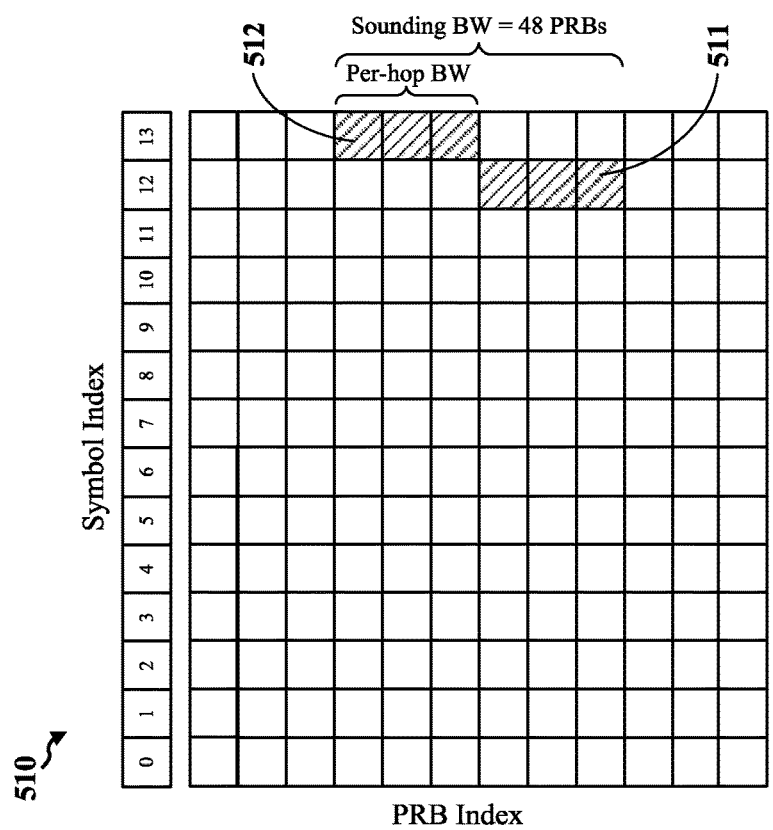
FIG. 5B shows an example SRS resource that spans across 48 PRBs and can be used with frequency hopping.

FIG. 5B shows an example SRS resource set 510 that spans across 2 symbols of a slot in the time domain, and extends across 48 PRBs in the frequency domain. In some instances, each PRB corresponds to one symbol in the time slot, and extends across 12 consecutive subcarriers in the frequency domain. More specifically, a first number of SRS resources 511 of the SRS resource set 510 extend across a first group of 24 PRBs and are transmitted in symbol period 12 of the slot, and a second number of SRS resources 512 of the SRS resource set 510 extend across a second group of 24 PRBs and are transmitted in symbol period 13 of the slot. As described below, a UE may use the SRS resource set 510 to sound the entire bandwidth of the 48 PRBs using fewer SRS resources than the example SRS resource set 500 of FIG. 5A, thereby not only conserving SRS resources but also reducing power consumption and signaling overhead.

FIG. 5C shows another example SRS resource set 520 that spans across 4 symbols of a slot in the time domain, and extends across 48 PRBs in the frequency domain. In some instances, each PRB corresponds to one symbol in the time slot, and extends across 12 consecutive subcarriers in the frequency domain. More specifically, a first number of SRS resources 521 of the SRS resource set 520 extend across a first group of 12 PRBs and are transmitted in symbol period 10 of the slot, a second number of SRS resources 522 of the SRS resource set 520 extend across a second group of 12 PRBs and are transmitted in symbol period 11 of the slot, a third number of SRS resources 523 of the SRS resource set 520 extend across a third group of 12 PRBs and are transmitted in symbol period 12 of the slot, and a fourth number of SRS resources 524 of the SRS resource set 520 extend across a fourth group of 12 PRBs and are transmitted in symbol period 13 of the slot. As described below, a UE may use the SRS resource set 520 to sound the entire bandwidth of the 48 PRBs using fewer SRS resources than the example SRS resource set 500 of FIG. 5A. Further, the ability to transmit SRS resources 521-524 in 4 symbols of the slot, rather than in only 2 symbols of the slot (as in the example SRS resource set 510 of FIG. 5B), may offer greater flexibility and efficiency in the scheduling of SRS resources for devices having more than 4 RX antennas, and may also increase the number of antenna ports that can be sounded.

Figure 5D:
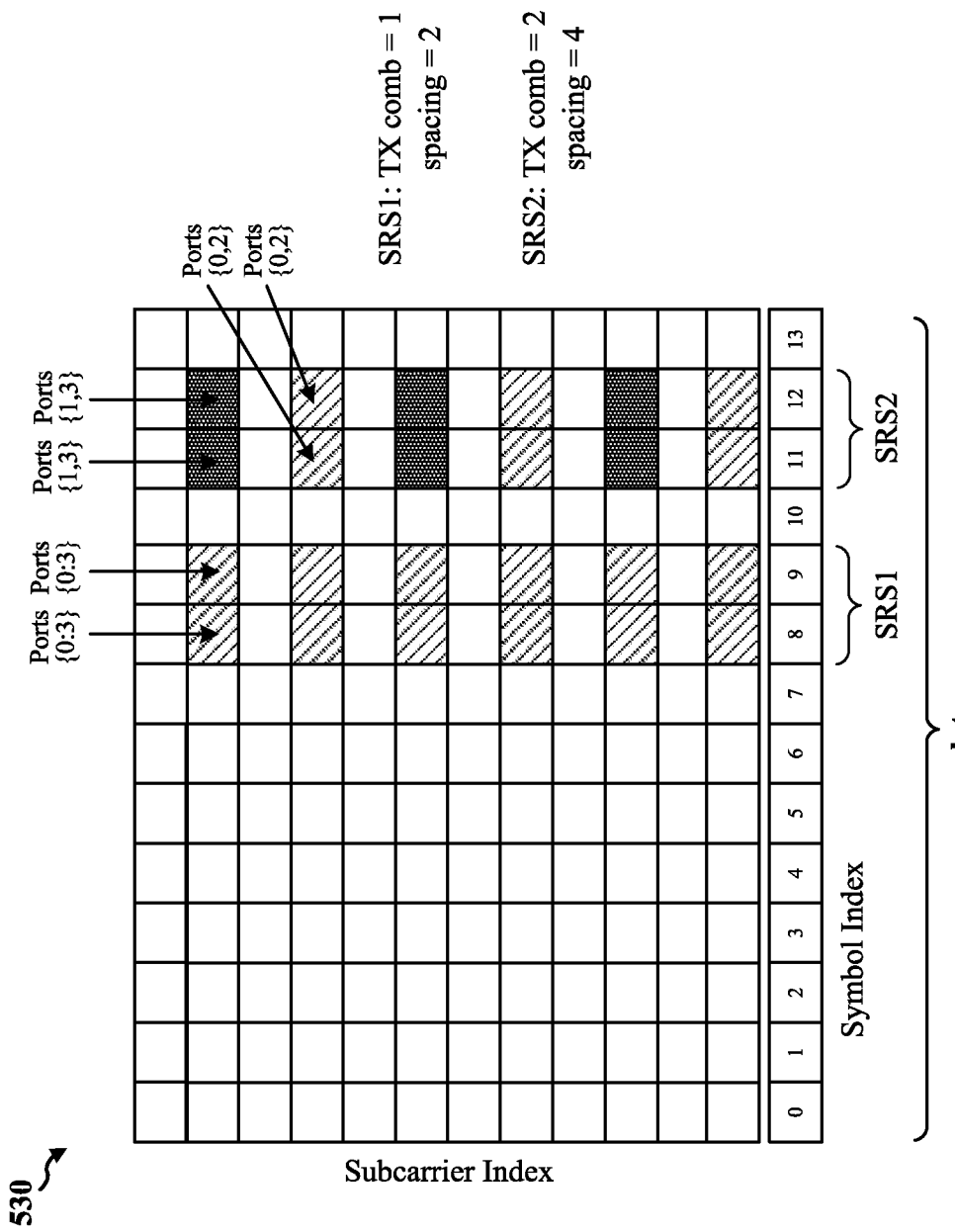
FIG. 5D shows an example mapping between antenna ports and SRS resources.

FIG. 5D shows an example mapping 530 between antenna ports and SRS resources. As shown, a first SRS resource SRS1 is transmitted in symbol periods 8-9 of a slot from antenna ports 0-3 on every other subcarrier, and is transmitted in symbol periods 11-12 of the slot from antenna ports 0 and 2 on every fourth subcarrier. A second SRS resource SRS2 is transmitted in symbol periods 11-12 of the slot from antenna ports 1 and 3, and occupies every fourth subcarrier (with a subcarrier offset of 2 relative to the first SRS resource SRS1 transmitted in symbol periods 11-12 of the slot).

Figure 6A:
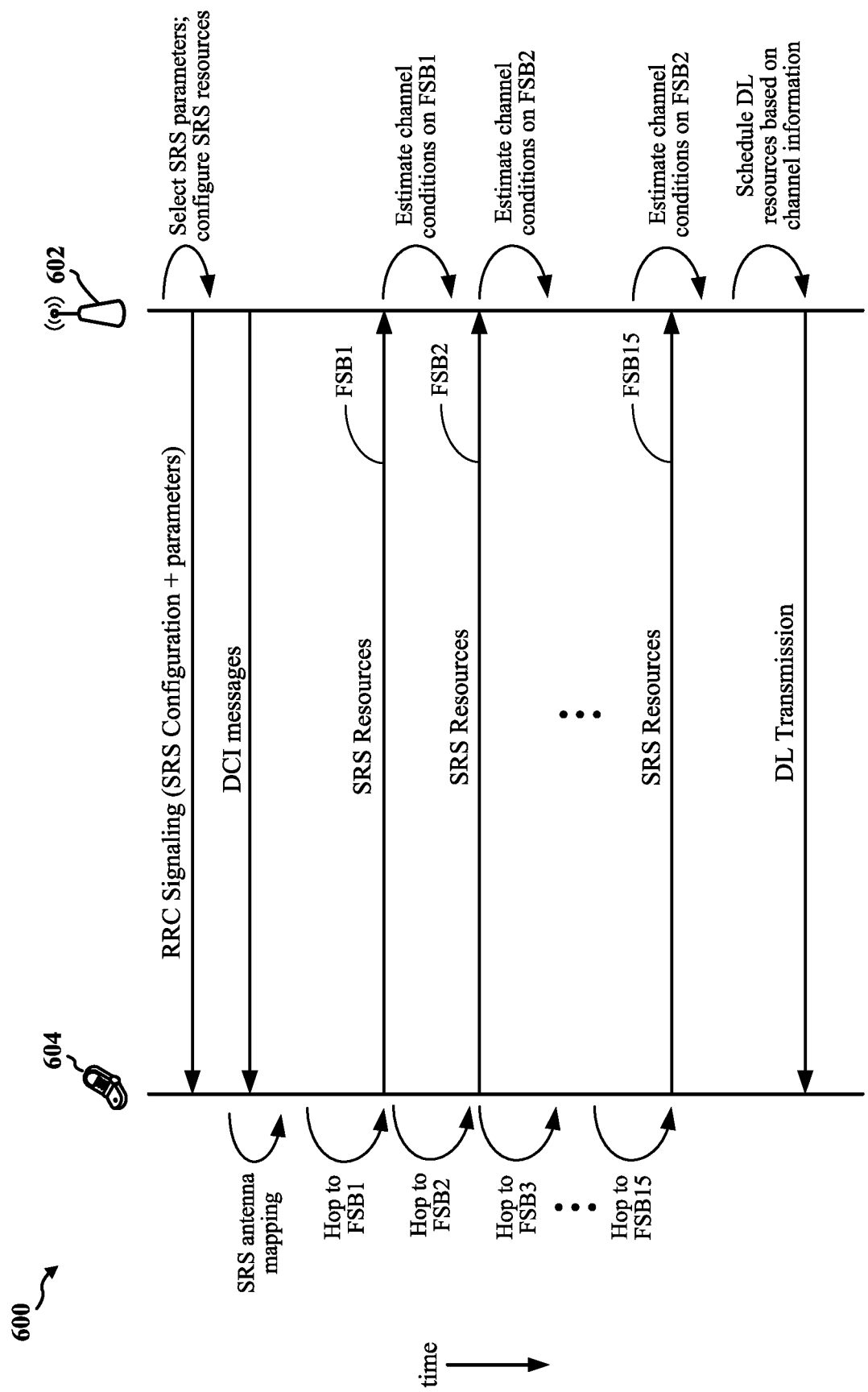
FIG. 6A shows a sequence diagram illustrating an example message exchange between a base station and a UE according to some implementations.

FIG. 6A shows a sequence diagram illustrating an example message exchange 600 between a base station 602 and a UE 604 in a radio access network (RAN). The base station 602 may be one example of the base station 102 of FIG. 1 or the base station 310 of FIG. 3, and the UE 604 may be one example of the UE 104 of FIG. 1 or the UE 350 of FIG. 3. The base station 602 may be any suitable base station or node including, for example, a gNB or an eNB. The RAN may be any suitable radio access network, and may include any suitable radio access technology. network a 5G NR communication system. In some implementations, the base station 602 and UE 604 may use frequency hopping to exploit frequency diversity in the BWP of the base station 602.

The base station 602 may select values for a number of SRS parameters, and may configure one or more SRS resource sets for channel sounding operations by the UE 604. Each SRS resource set may include one or more SRS resources, and may be configured as periodic SRS resources, semi-persistent SRS resources, or aperiodic SRS resources. The configured semi-persistent SRS resources may be activated by a medium access control (MAC) control element (CE) (MAC-CE) command, and the aperiodic SRS resources may be triggered by a DCI message.

The SRS parameters may indicate information including (but not limited to) SRS ports, antenna port indices, periodicities, offsets, SRS resource sizes and locations, bandwidths, transmission comb values, transmission comb offset values, and the like. In some implementations, the base station 602 may also determine (or select) a frequency hopping pattern and a number of frequency hopping parameters for SRS transmissions. The frequency hopping pattern may include a plurality of hopping channels or frequency subbands across which the UE 604 can sequentially hop or jump to transmit SRS resources to the base station 602. In some implementations, the frequency hopping pattern may include a plurality of unique frequency subbands that collectively span a wider bandwidth, and therefore can be used to sound the wider bandwidth. Although the example message exchange 600 depicts the frequency hopping pattern as including 15 frequency subbands (FSB1-FSB15), in other implementations, the frequency hopping pattern may include other suitable numbers of frequency subbands. The frequency hopping parameters may indicate locations of the frequency subbands, an order in which the UE 604 is to hop between the sequence of frequency subbands, the dwell time on each frequency subband, and other suitable information.

The base station 602 may provide the configured SRS resource sets, the SRS parameters, and frequency hopping information to the UE 604 via RRC signaling (such as in one or more RRC messages). The RRC signaling may also facilitate connection establishment and release functions, broadcast of system information, radio bearer establishment, reconfiguration and release operations, RRC connection mobility procedures, paging notification, and power control. In some instances, the RRC signaling may also configure user and control planes, define multiple downlink semi-persistent scheduling (SPS) configurations, define multiple uplink configured grant (CG) configurations, and control various other functions of the access network.

The base station 602 may also transmit one or more DCI messages to the UE 604. The DCI messages may contain a number of parameters, configurations, schedules, and/or characteristics of one or more DL channels or beams upon which the base station 602 can transmit DL data and control information to the UE 604. The DCI messages may also activate and release one or more SPS configurations and/or one or more CG configurations. In some implementations, the DCI messages may trigger aperiodic SRS resources for the UE 604.

The UE 604 may use information contained in the RRC and DCI messages to determine the frequency hopping pattern and identify the locations and ordering of the frequency subbands. The UE 604 may also use information contained in the RRC and DCI messages to identify SRS resources associated with each of the frequency subbands, to determine an SRS transmission pattern for each of the frequency subbands, and to map antenna ports of each SRS resource in a respective slot to a corresponding set of subcarriers. In accordance with various aspects of the present disclosure, the UE 604 may use different SRS ports, different antenna ports, different numbers and sizes of SRS resources, different periodicities, different offsets, different transmission comb values, and/or different transmission comb offset values for SRS transmissions on different frequency subbands of the frequency hopping pattern to ensure that sounding operations cover all antennas of the UE, cover the entire frequency range of interest, and provide sufficiently dense SRS transmissions from which a base station can determine the best channel for DL transmissions while also using a minimum amount of SRS resources and consuming minimal power in the UE.

For example, the UE 604 may transmit one or more SRS resources on the first frequency subband FSB1 of the frequency hopping pattern based on a first set of SRS parameters, may transmit one or more SRS resources on the second frequency subband FSB2 of the frequency hopping pattern based on a second set of SRS parameters, and so on, such that SRS resources may be transmitted on different frequency subbands using different transmission patterns that may provide varying levels of SRS density. In this manner, the density of SRS resources transmitted on each of the frequency subbands can be different from one another and can be dynamically changed based on one or more factors such as, for example, channel conditions, the availability of SRS resources, TX power levels, remaining battery life of the UE, and the like.

In some implementations, the UE 604 may transmit one or more SRS resources on the first frequency subband FSB1 using a first group of antenna ports, and may transmit one or more SRS resources on the second frequency subband FSB2 using a second group of antenna ports that is different than the first group of antenna ports, for example, as described with reference to FIG. 7. In addition, or in the alternative, the UE 604 may transmit one or more SRS resources on the first frequency subband FSB1 using a first set of SRS ports, and may transmit one or more SRS resources on the second frequency subband FSB2 using a second set of SRS ports that is different than the first set of SRS ports. In some instances, the base station 602 may provide a higher-layer parameter freqHoppingPort that indicates port numbers corresponding to the first and second sets of SRS ports.

In other implementations, the UE 604 may transmit at least some SRS resources using different slot offset values, using different periodicities, or using different slot offset values and different periodicities. The periodicities and slot offset values corresponding to different frequency subbands may be indicated by a higher layer parameter periodicityAndOffset, which can be provided to the UE 604 via RRC signaling. In some instances, the UE 604 may transmit SRS resources on the first frequency subband FSB1 using a first slot offset value, may transmit SRS resources on the second frequency subband FSB2 using a second slot offset value, and so on, based on the parameter periodicityAndOffset, for example, as described with reference to FIG. 8. In addition, or in the alternative, the UE 604 may transmit SRS resources on the first frequency subband FSB1 with a first periodicity, may transmit SRS resources on the second frequency subband FSB2 with a second periodicity, and so on, based on the parameter periodicityAndOffset, for example.

In some other implementations, the UE 604 may transmit SRS resources on different frequency subbands using different transmission comb values. In some instances, the UE 604 may transmit one or more SRS resources on the first frequency subband FSB1 using a first transmission comb value, and may transmit one or more SRS resources on the second frequency subband FSB2 using a second transmission comb value that is different than the first transmission comb value. More specifically, SRS resources may be transmitted on the first frequency subband FSB1 using every $i^{th}$ subcarrier index of a group of subcarrier indices, and SRS resources may be transmitted on the second frequency subband FSB2 using every $n^{th}$ subcarrier index of the group of subcarrier indices, where the $i^{th}$ subcarrier index is different than the $n^{th}$ subcarrier index. In some instances, the value of i may be one of 2, 4, 6, 8, or 12, and the value of n may be another of 2, 4, 6, 8, or 12. The values for i and n may be indicated by higher-layer parameters transmissionComb and freqHoppingTC, which can be provided to the UE 604 via RRC signaling.

For example, when the value of i=2 and the value of n=4, the UE 604 may transmit SRS resources on the first frequency subband FSB1 based on a transmissionComb2 value, and may transmit SRS resources on the second frequency subband FSB2 based on a transmissionComb4 value. In this manner, SRS resources can be transmitted on the first frequency subband FSB1 using every other subcarrier, and can be transmitted on the second frequency subband FSB2 using every fourth subcarrier, for example, as described with reference to FIG. 9A.

In addition, or in the alternative, SRS resources may be transmitted on the first frequency subband FSB1 based on a first transmission comb offset value, and SRS resources may be transmitted on the second frequency subband FSB2 based on a second transmission comb offset value that is different than the first transmission comb offset value.

The base station 602 receives the SRS resources transmitted from the UE 604 on each of the frequency subbands FSB1-FSB15, and may use the received SRS resources to estimate channel conditions on the respective frequency subbands FSB1-FSB15. In some implementations, the base station 602 may also use the received SRS resources to determine channel information associated with the UE's antennas. The base station 602 may use the estimated channel conditions and/or the determined channel information to schedule or allocate resources for DL transmissions to the UE 604.

In some implementations, the UE 604 may repeat transmission of SRS resources on a respective frequency subband R times, and may map each of the antenna ports of an SRS resource in a respective slot to the corresponding set of subcarriers within each pair of R adjacent OFDM symbols based at least in part on the higher-layer parameters transmissionComb and freqHoppingTC. In some instances, frequency hopping across the pairs of R adjacent OFDM symbols may be based at least in part on the higher-layer parameters transmissionComb and freqHoppingTC.

Figure 6B:
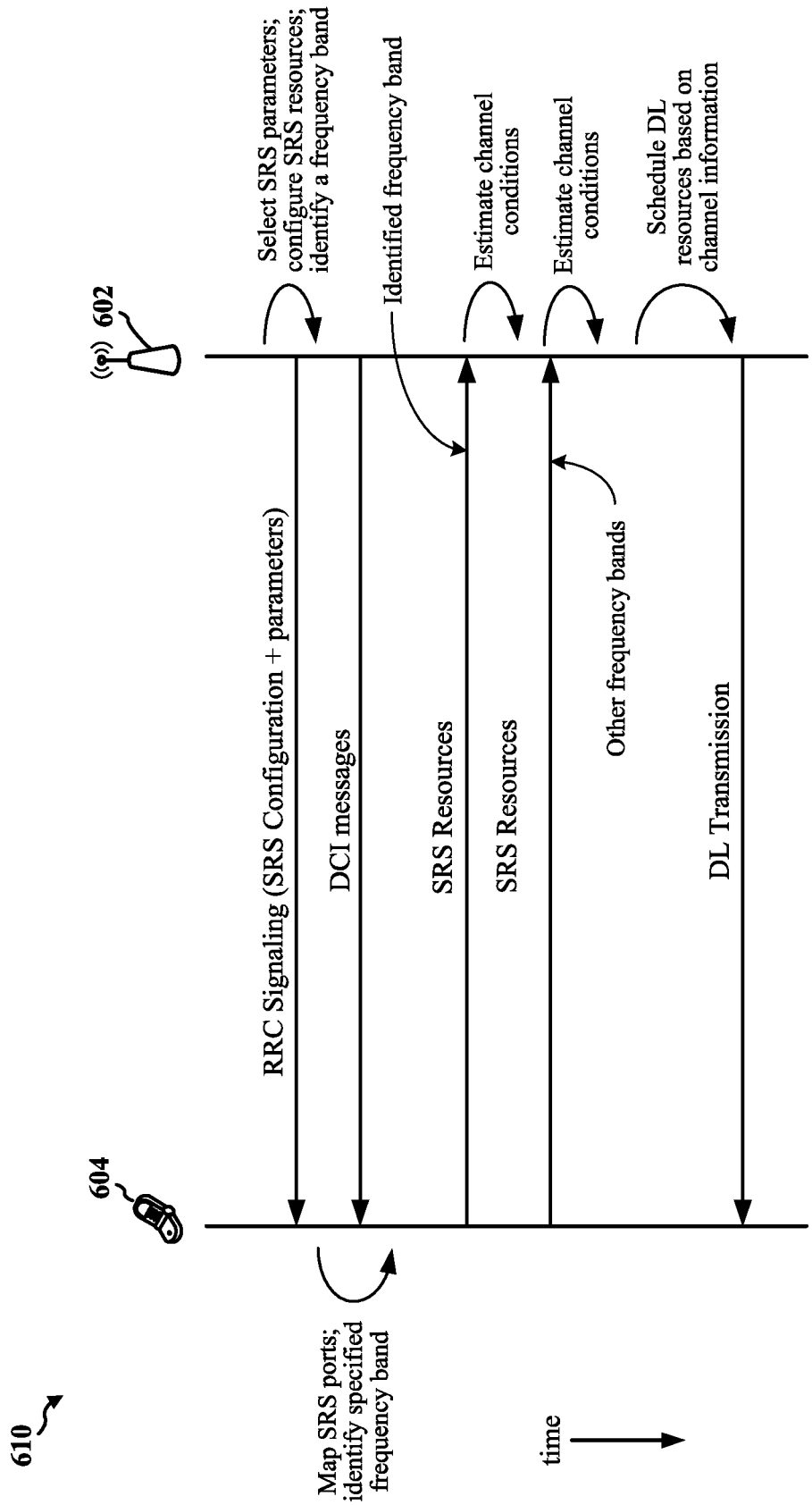
FIG. 6B shows a sequence diagram illustrating another example message exchange between the base station and the UE according to some implementations.

FIG. 6B shows a sequence diagram illustrating another example message exchange 610 between the base station 602 and the UE 604. The example message exchange 610 of FIG. 6B is similar in many aspects to the example message exchange 600 of FIG. 6A, and differs from the example message exchange 600 of FIG. 6A in that frequency hopping is not used by the UE 604. For the example of FIG. 6B, SRS resources may be transmitted on a specified frequency band using one transmission comb value, and may be transmitted on one or more other (non-specified) frequency bands using one or more different transmission comb values.

In some implementations, the base station 602 may transmit a message to the UE 604 that identifies the specified frequency band. The message may be an RRC message or a DCI message, and may indicate transmission comb values for the specified frequency band and the one or more other (non-specified) frequency bands. In some aspects, the message may include the higher-layer parameters transmissionComb and freqHoppingTC, may include a higher-layer parameter resourceMapping that indicates a start position of the identified frequency band, and may include a higher-layer parameter resourceBandwidth that indicates the bandwidth of the identified frequency band.

The UE 604 receives the message, determines the location and bandwidth of the specified frequency band, and obtains the transmission comb values for the specified frequency band and the one or more other (non-specified) frequency bands. Based on the received message, the UE 604 may transmit first SRS resources on the specified frequency band based on a first transmission comb value, and may transmit second SRS resources on the one or more other frequency bands based on a second transmission comb value (which is different than the first transmission comb value). In this manner, SRS transmissions on the specified frequency band may be either sparser or denser than SRS transmissions on the one or more other frequency bands.

In some implementations, the first SRS resources are transmitted on the identified frequency band using every $i^{th}$ subcarrier index within a first group of subcarrier indices corresponding to the first SRS resources, and the second SRS resources are transmitted on the one or more other frequency bands using every $n^{th}$ subcarrier index within a second group of subcarrier indices corresponding to the second SRS resources, where the $i^{th}$ subcarrier index is different than the $n^{th}$ subcarrier index. In some instances, the value of i may be one of 2, 4, 6, 8, or 12, and the value of n may be another of 2, 4, 6, 8, or 12. The values for i and n may be indicated by higher-layer parameters transmissionComb and freqHoppingTC, which can be provided to the UE 604 via RRC signaling.

For example, when the value of i=2 and the value of n=4, the UE 604 transmits SRS resources on the specified frequency band using every other subcarrier, and transmits SRS resources on the one or more other frequency bands using every fourth subcarrier, as described with reference to FIG. 10. For another example, when the value of i=4 and the value of n=2, the UE 604 transmits SRS resources on the specified frequency band using every fourth subcarrier, and transmits SRS resources on the one or more other frequency bands using every other subcarrier.

In other instances, the first transmission comb value may be comb4 and the second transmission comb value may be comb2 such that SRS resources are transmitted on the specified frequency band using every fourth subcarrier and are transmitted on the one or more other frequency bands using every other subcarrier.

Figure 7:
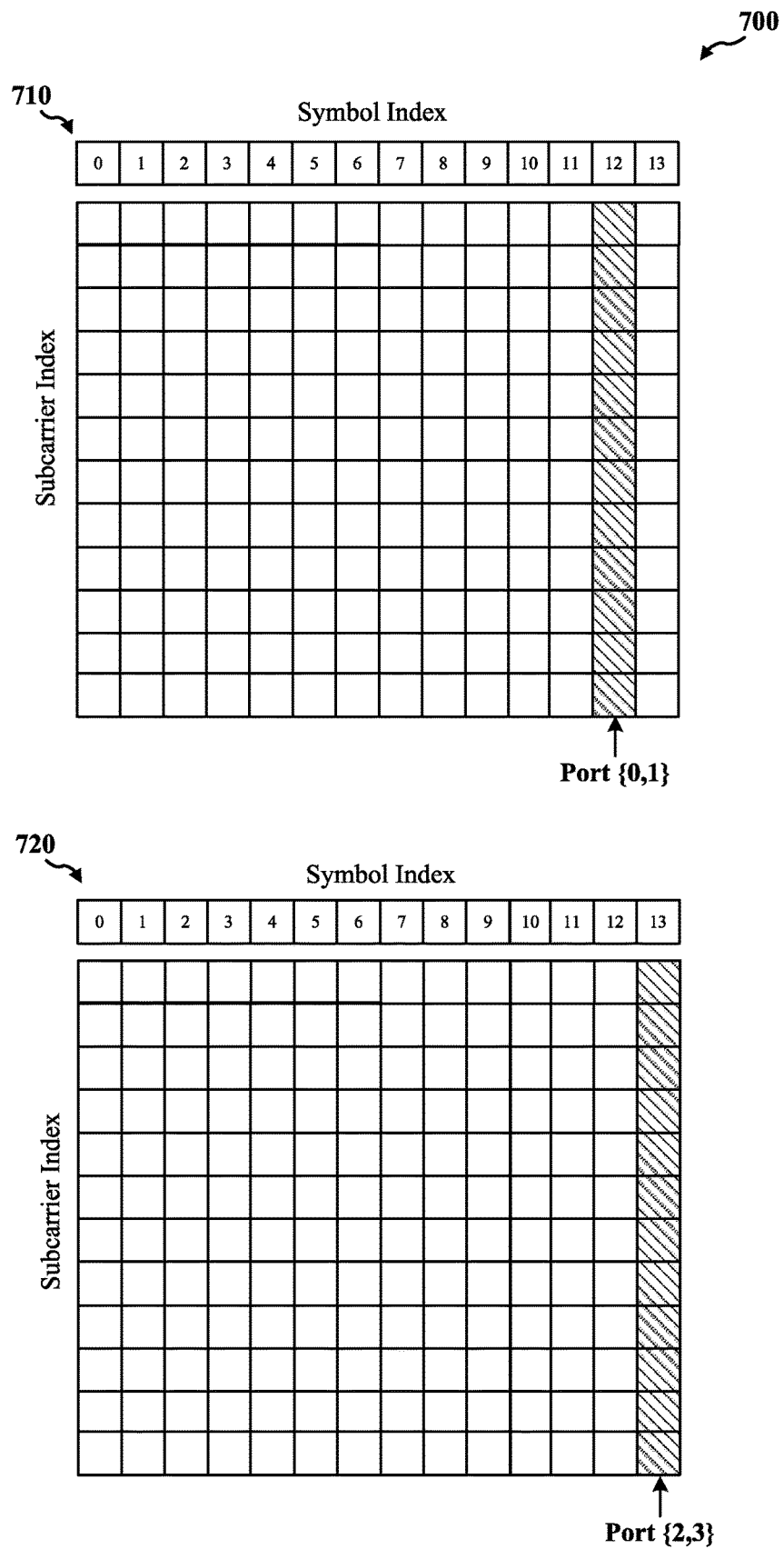
FIG. 7 shows an example SRS transmission pattern that may be used with frequency hopping according to some implementations.

FIG. 7 shows an example SRS transmission pattern 700 that may be used with frequency hopping according to some implementations. The transmission pattern 700 depicts a first SRS resource 710 transmitted on a first frequency subband using a first port {0,1} of a UE, and depicts a second SRS resource 720 transmitted on a second frequency subband using a second port {2,3} of the UE. In some implementations, a new parameter freqHoppingPort may be provided when using the example SRS transmission pattern 700 for channel sounding with frequency hopping. The new parameter freqHoppingPort may indicate which antenna ports are to be used for SRS transmissions on each of the frequency hopping channels. The new parameter freqHoppingPort may include a parameter nrofPorts that identifies the SRS port numbers to be used, and may include a parameter portOffset that identifies which SRS port is to start the SRS transmissions. In some instances, the number of antenna ports ($N_{ap}^{SRS}$) defined by the 3GPP TS 38.211 may be modified such that:

$N_{ap,b}^{SRS} \in \{1,2,4\}$ antenna ports $\{p_i\}_{i=0}^{N_{ap,b}^{SRS}}$, where the number of antenna ports is given by the higher layer parameter nrofPorts, $p_i = 1000 + (i+i_0) \mod(N_{ap,b}^{SRS})$, $i_0$ is given by the higher parameter portOffser-hop for each hop, where the cyclic shift ($\alpha_i$) for each antenna port ($p_i$) is a function of the number of antenna ports ($N_{ap}^{SRS}$), the number of cyclic shifts ($n_{SRS}^{cs}$) defined by the parameter transmissionComb, and a maximum number of cyclic shifts ($n_{SRS}^{cs,max}$).

Figure 8:
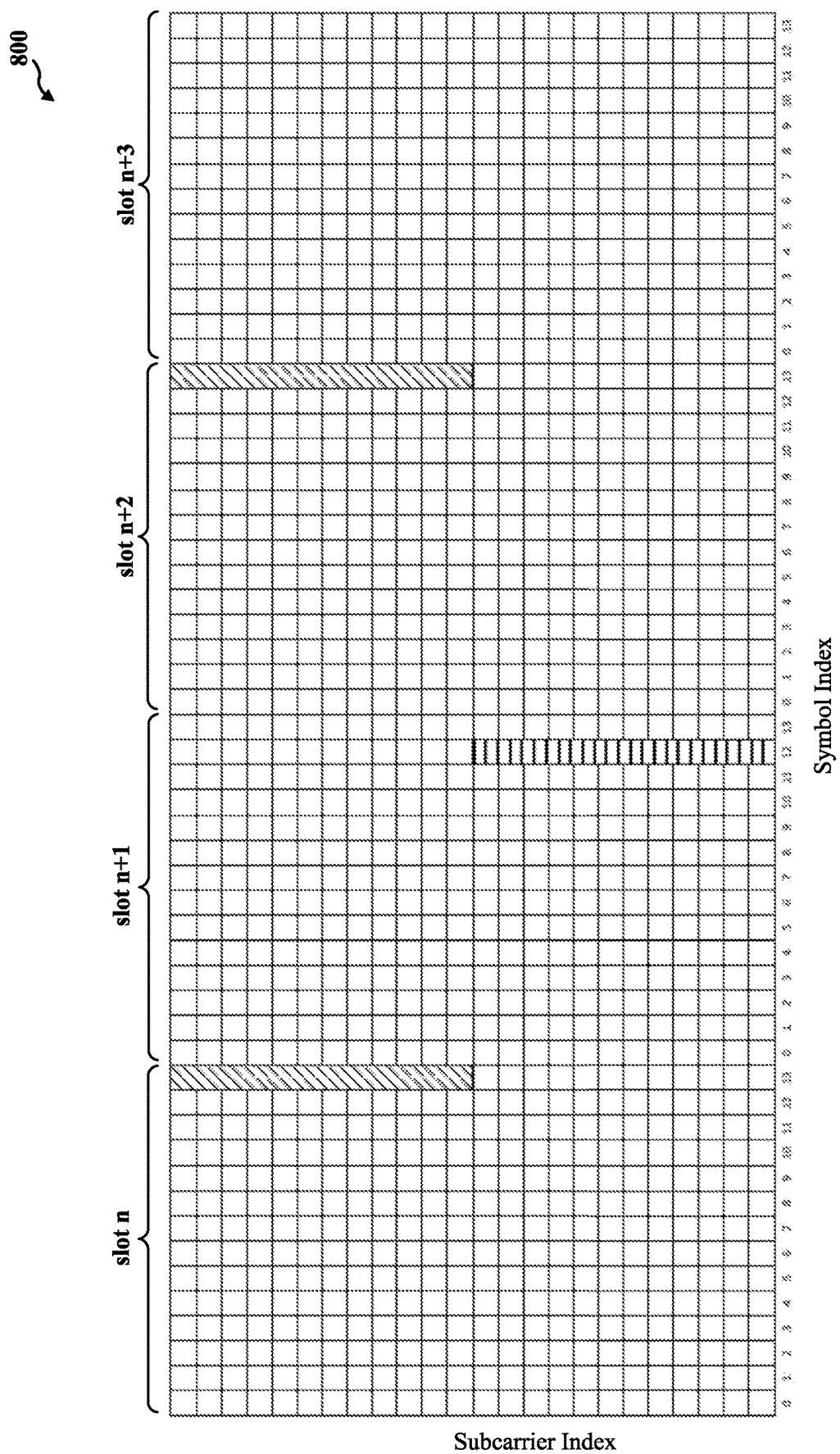
FIG. 8 shows an example SRS transmission pattern that may be used with frequency hopping according to some implementations.

FIG. 8 shows an example SRS transmission pattern 800 that may be used with frequency hopping according to some implementations. The transmission pattern 800 depicts an SRS resource transmitted in symbol 13 of a first slot n, transmitted in symbol 12 (rather than in symbol 13) of a second slot n+1, transmitted in symbol 13 of a third slot n+2, and transmitted in symbol 12 (rather than in symbol 13) of a fourth slot n+1. As such, SRS resources transmitted in the first and third slots have an offset=0, and SRS resources transmitted in the second and fourth slots have an offset=1.

Figure 9A:
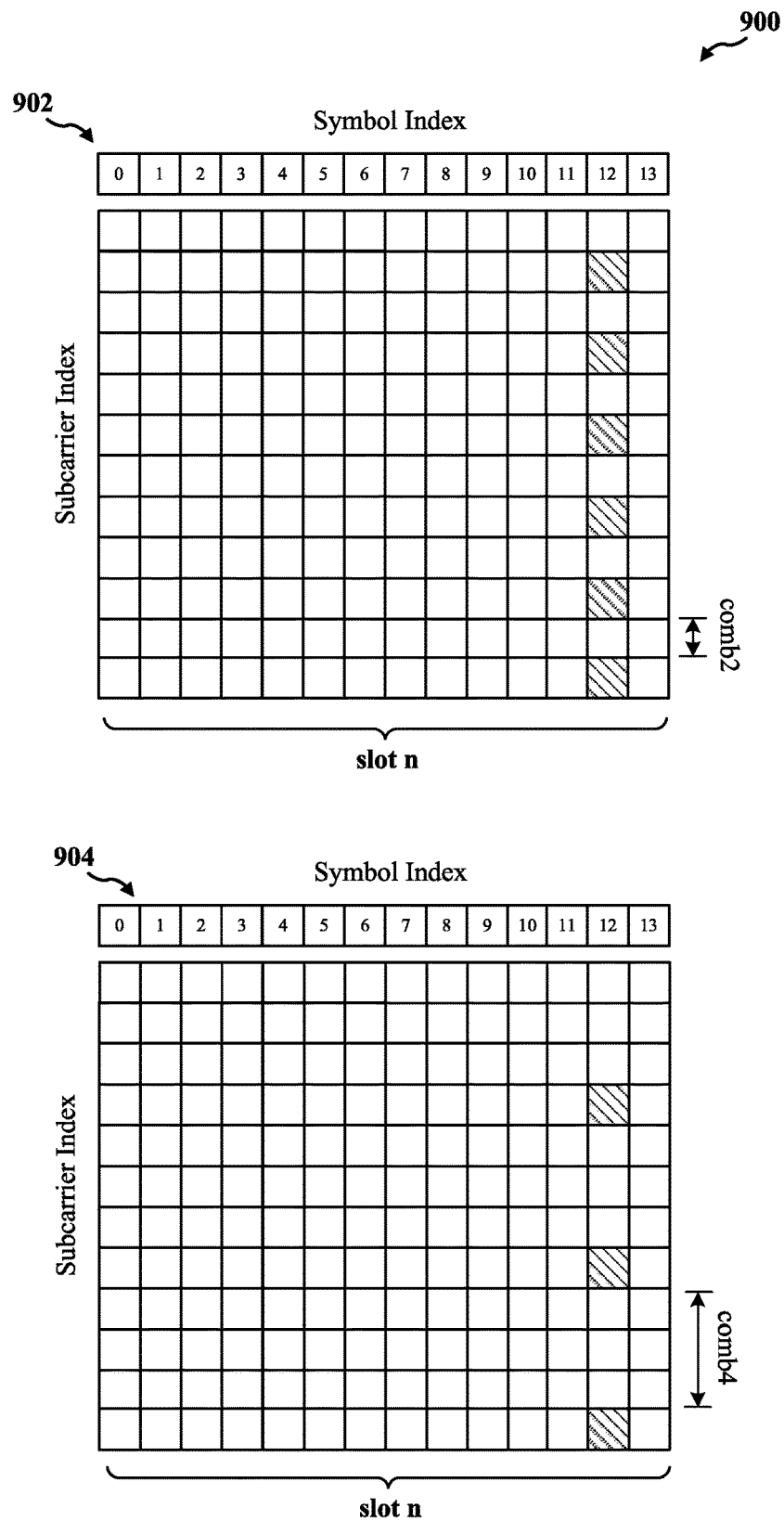
FIGS. 9A-9C show example SRS transmission patterns that may be used with frequency hopping according to some implementations.

FIG. 9A shows an example SRS transmission pattern 900 that may be used with frequency hopping according to some implementations. The transmission pattern 900 depicts a first SRS resource 902 transmitted on a first frequency subband in symbol period 12 of a slot n using a transmission comb value=2, and depicts a second SRS resource 904 transmitted on a second frequency subband in symbol period 12 of the slot n using a transmission comb value=4. As such, the first SRS resource 902 is transmitted on every fourth subcarrier of a group of subcarriers, and the second SRS resource 904 is transmitted on every other subcarrier of the group of subcarriers. In some implementations, the group of subcarriers may correspond to a PRB. In other implementations, the group of subcarriers may correspond to a plurality of PRBs.

Figure 9B:
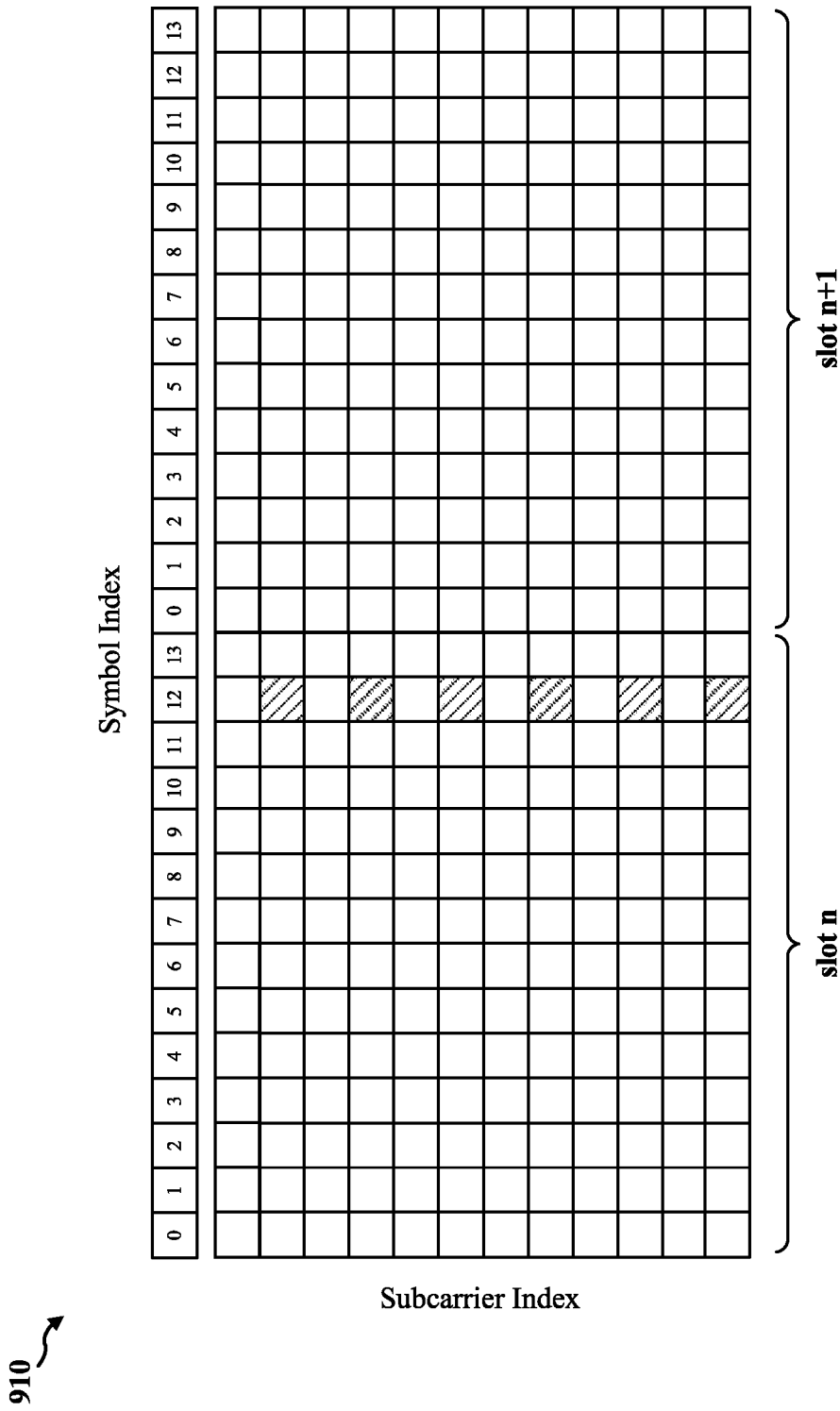
Figure 9C:
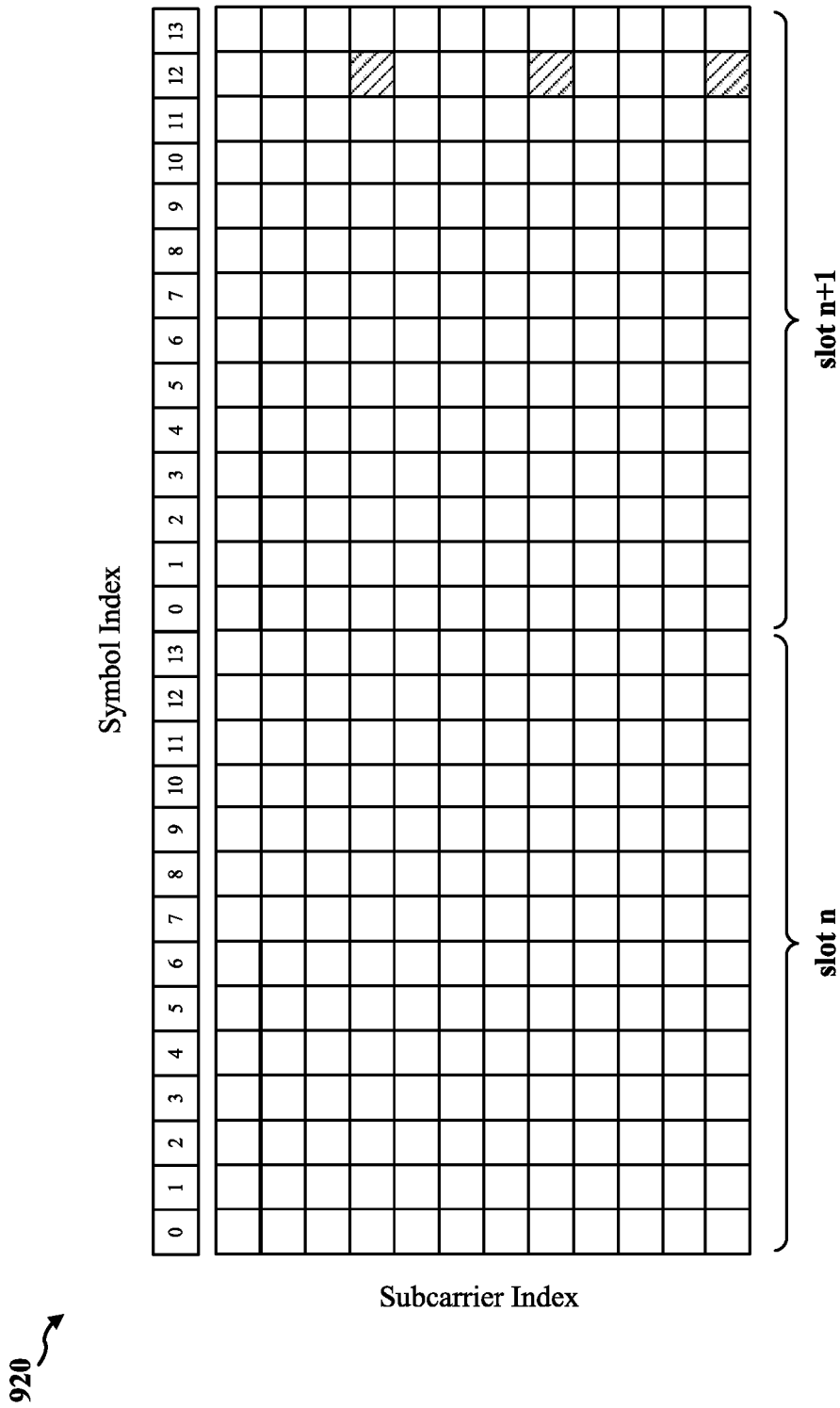

FIG. 9B shows an example SRS transmission pattern 910 that may be used with frequency hopping according to some implementations, and FIG. 9C shows an example SRS transmission pattern 920 that may be used with frequency hopping according to other implementations. The transmission pattern 910 depicts transmission of an SRS resource using a transmission comb value=2 and a transmission comb offset value=0, and the transmission pattern 920 depicts transmission of an SRS resource using a transmission comb value=4 and a transmission comb offset value=1. Thus, SRS resources are transmitted on every other subcarrier in a first slot n and are not transmitted in a second slot n+1 when the SRS transmission pattern 910 is used, and SRS resources are not transmitted in the first slot n and are transmitted on every fourth subcarrier in the second slot n+1 when the SRS transmission pattern 920 is used. In some implementations, the parameter transmissionComb for different SRS resources in a given SRS resource set may be different from one another:

$$n_{SRS}^{cs,i} = \left( n_{SRS}^{cs} + \frac{n_{SRS}^{cs,max}(p_i - 1000)}{N_{ap,b}^{SRS}} \right) \mod n_{SRS}^{cs,max}$$

$$\alpha_{K_{TC}k' + k_0^{(p_i)}, l' + l_0}^{(p_i)} =$$

$$\begin{cases} \frac{1}{\sqrt{N_{ap,b}^{SRS}}} \beta_{SRS} r^{(p_i)}(k', l') & k' = 0, 1, \ldots, M_{sc,b}^{SRS} - 1 \quad l' = 0, 1, \ldots, N_{symb}^{SRS} - 1 \\ 0 & \text{otherwise} \end{cases},$$

$$a^{(p_i)}_{K_{TC}k'+k_0^{(p_i)},l'+l_0} =$$

$$\begin{cases} \dfrac{1}{\sqrt{N_{ap}}}\beta_{SRS}r^{(p_i)}(k',l') & k'=0,1,\ldots,M_{sc,b}^{SRS}-1 \quad l'=0,1,\ldots,N_{symb}^{SRS}-1 \\ 0 & \text{otherwise} \end{cases}$$

where $K_{TC}$ is contained in the higher-layer parameter transmissionComb and freqHoppingTC, and cyclic shifts (α) are calculated according to the corresponding $K_{TC}$.

In some implementations, when frequency hopping within an SRS resource in each slot is configured without repetition (such as R=1), each of the antenna ports of the SRS resource in each slot may be mapped to different sets of subcarriers in each OFDM symbol, where the same transmission comb value is assumed for different sets of subcarriers. When both frequency hopping and repetition within an SRS resource in each slot are configured (such as Ns=4, R=2), each of the antenna ports of the SRS resource in each slot may be mapped to the same set of subcarriers within each pair of R adjacent OFDM symbols, and frequency hopping across the two pairs is performed according to the SRS hopping parameters BSRS, CSRS, and bhop.

In addition, or in the alternative, when frequency hopping within an SRS resource in each slot is configured without repetition (such as R=1), each of the antenna ports of the SRS resource in each slot may be mapped to different sets of subcarriers in each OFDM symbol according to the higher layer parameters transmissionComb and freqHoppingTC in SRS-Resource, where the corresponding transmission comb value is assumed for different sets of subcarriers. When both frequency hopping and repetition within an SRS resource in each slot are configured (such as Ns=4, R=2), each of the antenna ports of the SRS resource in each slot may be mapped to the corresponding set of subcarriers within each pair of R adjacent OFDM symbols, and frequency hopping across the two pairs is performed according to the SRS hopping parameters BSRS, CSRS, and bhop as well as the higher layer parameters transmissionComb and freqHoppingTC in SRS-Resource.

FIG. 10 shows an example SRS transmission pattern 1000 that may be used with frequency hopping according to other implementations. The transmission pattern 1000 depicts a first SRS resource 1002 transmitted in symbol period 12 of a slot using a transmission comb value=2, and depicts a second SRS resource 1004 transmitted in symbol period 12 of a slot using a transmission comb value=4. As such, the first SRS resource 1002 is transmitted on every fourth subcarrier of a group of subcarriers, and the second SRS resource 1004 is transmitted on every other subcarrier of the group of subcarriers. In some implementations, different transmission comb values may be used for the SRS transmission pattern 1000 for different frequency bands. For one example, the first SRS resource 1002 may be transmitted on a specified frequency band using a transmission comb value=2, and the second SRS resource 1004 may be transmitted on one or more other (non-specified) frequency bands or subbands using a transmission comb value=4. In this manner, SRS transmissions on the specified frequency band may be denser than SRS transmissions on the one or more other frequency bands. For another example, the first SRS resource 1002 may be transmitted on a first frequency subband of a frequency hopping pattern using a transmission comb value=2, and the second SRS resource 1004 may be transmitted on a second frequency subband of the frequency hopping pattern using a transmission comb value=4. In this manner, SRS transmissions on the first frequency subband may be denser than SRS transmissions on the second frequency subband.

In some implementations, the parameter transmissionComb for SRS resources transmitted on the specified frequency band may be different than the parameter transmissionComb for SRS resources transmitted on the one or more other frequency bands:

$$a^{(p_i)}_{K_{TC}k'+k_0^{(p_i)},l'+l_0} =$$

$$\begin{cases} \dfrac{1}{\sqrt{N_{ap}}}\beta_{SRS}r^{(p_i)}(k',l') & k'=0,1,\ldots,M_{sc,b}^{SRS}-1 \quad l'=0,1,\ldots,N_{symb}^{SRS}-1 \\ 0 & \text{otherwise} \end{cases}$$

where $K_{TC}$ is contained in the higher-layer parameters transmissionComb and freqDomainNewTC, and cyclic shifts (α) are calculated according to the corresponding $K_{TC}$.

Figure 11:
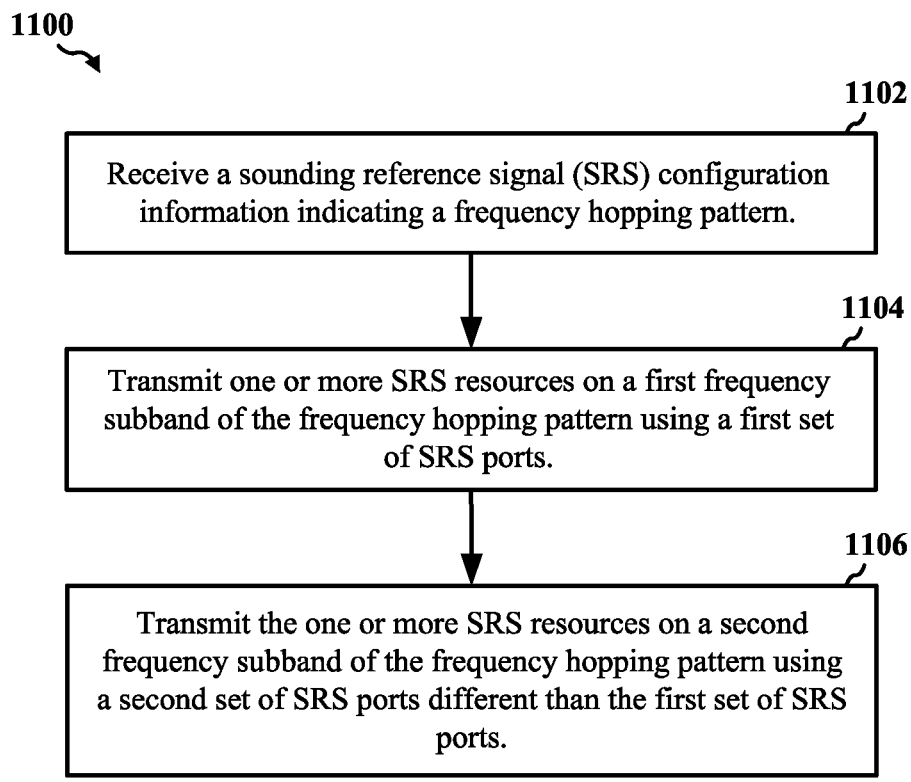
FIG. 11 shows a flowchart depicting an example operation for wireless communication that supports SRS transmissions with frequency hopping.

FIG. 11 shows a flowchart depicting an example operation 1100 for wireless communication that supports SRS transmissions with frequency hopping from a UE to a base station. The operation 1100 may be performed by a wireless communication device such as the UE 104 of FIG. 1, the UE 350 of FIG. 3, or the UE 604 of FIG. 6A.

At block 1102, the UE receives SRS configuration information indicating a frequency hopping pattern. In some implementations, the SRS configuration information may include configured SRS resource sets, SRS parameters, and frequency hopping information. The SRS configuration information may be provided to the UE via RRC signaling (such as in one or more RRC messages). In some instances, the SRS configuration information includes a higher-layer parameter freqHoppingPort indicating port numbers corresponding to SRS ports to be used for transmitting SRS resources on various frequency subbands of the frequency hopping pattern. In some other implementations, the SRS configuration information may be received in a message indicating at least one of a number of antenna ports used to transmit SRS resources on each frequency subband of the frequency hopping pattern or antenna port numbers associated with transmission of the SRS resources on each frequency subband of the frequency hopping pattern. In some instances, the message may be one of a MAC-CE command or a DCI message received from the base station on a DL channel (such as the PDCCH).

At block 1104, the UE transmits one or more SRS resources on a first frequency subband of the frequency hopping pattern using a first set of SRS ports. In some implementations, the one or more SRS resources are transmitted on the first frequency subband using a first group of antenna ports of the UE.

At block 1106, the UE transmits the one or more SRS resources on a second frequency subband of the frequency hopping pattern using a second set of SRS ports different than the first set of SRS ports. In some implementations, the one or more SRS resources are transmitted on the second frequency subband using a second group of antenna ports that includes at least one antenna port not included in the first group of antenna ports. In some instances, the first and second sets of SRS ports may be configured to sound all antenna ports of the UE.

Figure 12A:
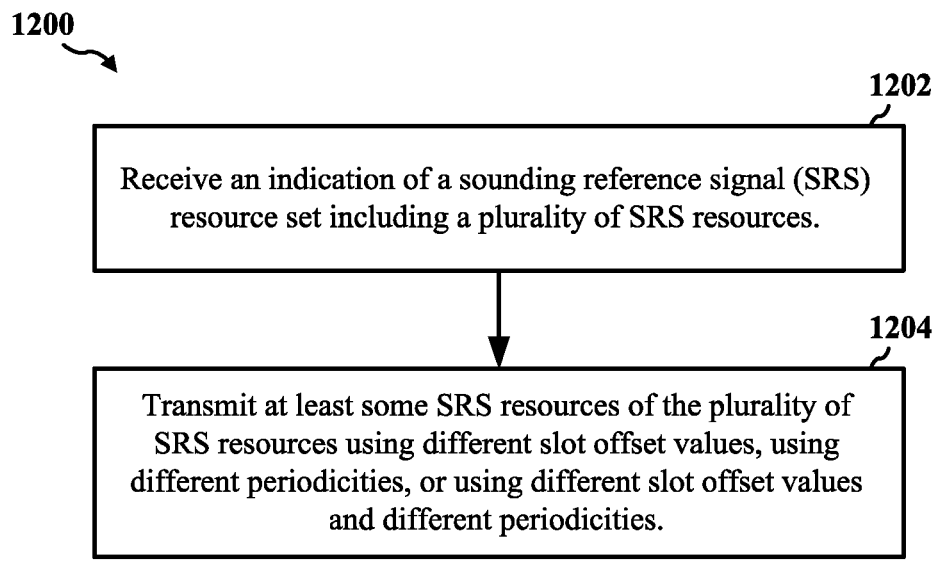
FIG. 12A-12B show flowcharts depicting example operations for wireless communication that supports SRS transmissions with frequency hopping.

FIG. 12A shows a flowchart depicting an example operation 1200 for wireless communication that supports SRS transmissions with frequency hopping from a UE to a base station. The operation 1200 may be performed by a wireless communication device such as the UE 104 of FIG. 1, the UE 350 of FIG. 3, or the UE 604 of FIG. 6A.

At block 1202, the UE receives an indication of an SRS resource set including a plurality of SRS resources. In some implementations, the indication may be received in a message that indicates at least one of a number of antenna ports used to transmit SRS resources on each frequency subband of the frequency hopping pattern, antenna port numbers associated with transmission of the SRS resources on each frequency subband of the frequency hopping pattern, or a periodicity and offset value associated with transmission of the SRS resources on each frequency subband of the frequency hopping pattern. In some instances, the indication may be received from the base station in an RRC configuration message. In other instances, the message may be one of a MAC-CE command or a DCI message received from the base station on a DL channel (such as the PDCCH).

At block 1204, the UE transmits at least some SRS resources of the plurality of SRS resources using different slot offset values, using different periodicities, or using different slot offset values and different periodicities. In some implementations, the UE transmits the at least some SRS resources on a first frequency subband of the frequency hopping pattern using a first slot offset value, and transmits the at least some SRS resources on a second frequency subband of the frequency hopping pattern using a second slot offset value different than the first slot offset value. In other implementations, the UE transmits the at least some SRS resources on the first frequency subband based on a first transmission comb value, and transmits the at least some SRS resources on the second frequency subband based on a second transmission comb value different than the first transmission comb value. In some other implementations, the UE transmits the at least some SRS resources on the first frequency subband using the first slot offset value and the first transmission comb value, and transmits the at least some SRS resources on the second frequency subband using the second slot offset value and the second transmission comb value.

Figure 12B:
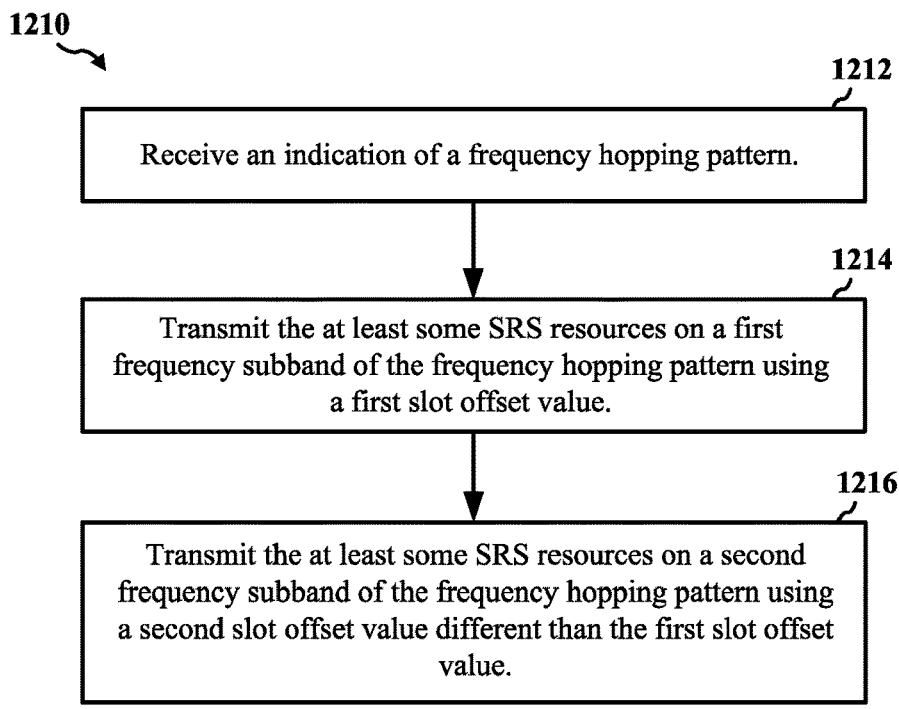

FIG. 12B shows a flowchart depicting an example operation 1210 for wireless communication that supports SRS transmissions with frequency hopping. The operation 1210 may be performed by a wireless communication device such as the UE 104 of FIG. 1, the UE 350 of FIG. 3, or the UE 604 of FIG. 6A. In some implementations, the example operation 1210 may be performed concurrently with one or more of the operations described in FIG. 12A.

At block 1212, the UE receives an indication of a frequency hopping pattern. In some implementations, the indication may be received in a message that indicates at least one of a number of antenna ports used to transmit SRS resources on each frequency subband of the frequency hopping pattern, antenna port numbers associated with transmission of the SRS resources on each frequency subband of the frequency hopping pattern, or a periodicity and offset value associated with transmission of the SRS resources on each frequency subband of the frequency hopping pattern. In some instances, the indication may be received from the base station in an RRC configuration message. In other instances, the message may be one of a MAC-CE command or a DCI message received from the base station on a DL channel (such as the PDCCH).

At block 1214, the UE transmits the at least some SRS resources on a first frequency subband of the frequency hopping pattern using a first slot offset value. In some implementations, the at least some SRS resources are transmitted on the first frequency subband in the $n^{th}$ symbol of a first uplink slot.

At block 1216, the UE transmits the at least some SRS resources on a second frequency subband of the frequency hopping pattern using a second slot offset value different than the first slot offset value. In some implementations, the at least some SRS resources are transmitted on the second frequency subband in the $n^{th}+1$ symbol of a second UL slot.

Figure 13A:
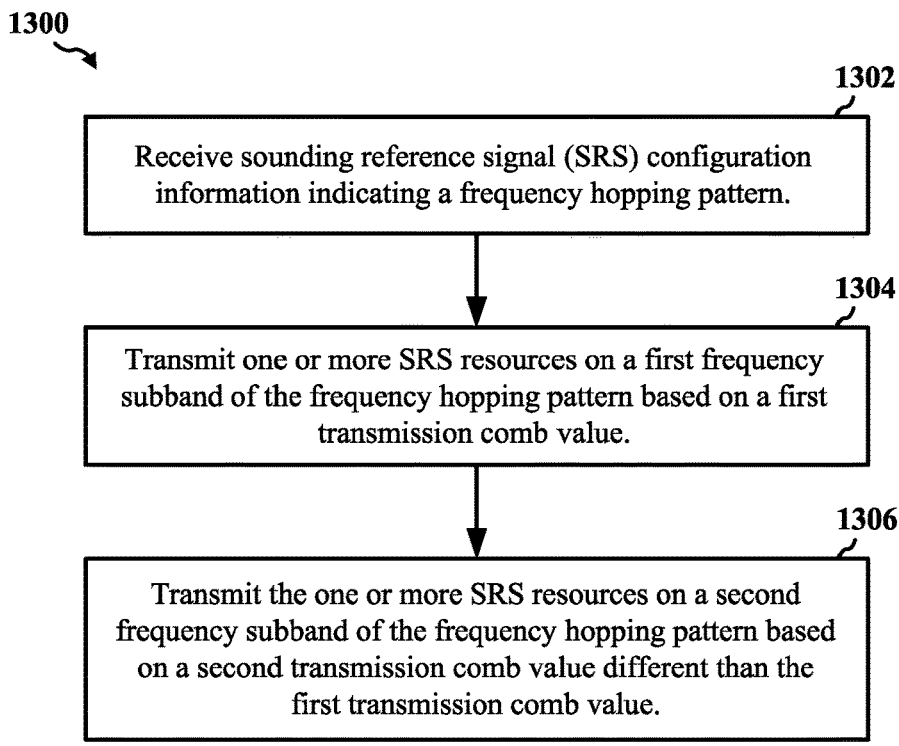
FIGS. 13A-13D show flowcharts depicting example operations for wireless communication that supports SRS transmissions with frequency hopping.

FIG. 13A shows a flowchart depicting an example operation 1300 for wireless communication that supports SRS transmissions with frequency hopping from a UE to a base station. The operation 1300 may be performed by a wireless communication device such as the UE 104 of FIG. 1, the UE 350 of FIG. 3, or the UE 604 of FIG. 6A.

At block 1302, the UE receives SRS configuration information indicating a frequency hopping pattern. In some implementations, the SRS configuration information may include higher-layer parameters transmissionComb and freqHoppingTC indicating transmission comb values for the various frequency subbands of the frequency hopping pattern. The SRS configuration information may also include a higher-layer parameter resourceMapping indicating a start position of each frequency subband of the frequency hopping pattern. In some other implementations, the SRS configuration information may be received in a message indicating at least one of a number of antenna ports used to transmit SRS resources on each frequency subband of the frequency hopping pattern, antenna port numbers associated with transmission of the SRS resources on each frequency subband of the frequency hopping pattern, a periodicity and offset value associated with transmission of the SRS resources on each frequency subband of the frequency hopping pattern, or a transmission comb value associated with transmission of the SRS resources on each frequency subband of the frequency hopping pattern. In some instances, the message may be one of an RRC configuration message or a DCI message.

At block 1304, the UE transmits one or more SRS resources on a first frequency subband of the frequency hopping pattern based on a first transmission comb value. In some implementations, the one or more SRS resources are transmitted on the first frequency subband using every $i^{th}$ subcarrier index of a group of subcarrier indices. In some instances, the group of subcarrier indices spans a certain number of RBs.

At block 1306, the UE transmits the one or more SRS resources on a second frequency subband of the frequency hopping pattern based on a second transmission comb value different than the first transmission comb value. In some implementations, the one or more SRS resources are transmitted on the second frequency subband using every $n^{th}$ subcarrier index of the group of subcarrier indices, where the $i^{th}$ subcarrier index is different than the $n^{th}$ subcarrier index. In some instances, the group of subcarrier indices spans a certain number of RBs.

Additionally, in some implementations, the one or more SRS resources may be transmitted on the first frequency subband pattern based on a first comb offset value, and the one or more SRS resources may be transmitted on the second frequency subband based on a second comb offset value different than the first comb offset value.

Figure 13B:
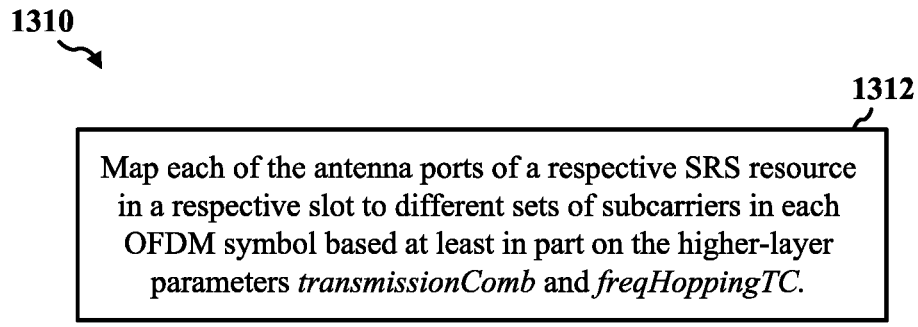

FIG. 13B shows a flowchart depicting an example operation 1310 for wireless communication that supports SRS transmissions with frequency hopping from a UE to a base station. The operation 1310 may be performed by a wireless communication device such as the UE 104 of FIG. 1, the UE 350 of FIG. 3, or the UE 604 of FIG. 6A. In some implementations, the example operation 1310 may be performed before transmitting the one or more SRS resources in block 1304 of FIG. 13A.

At block 1312, the UE maps each of the antenna ports of a respective SRS resource in a respective slot to different sets of subcarriers in each OFDM symbol based at least in part on the higher-layer parameters transmissionComb and freqHoppingTC. In some implementations, each of the antenna ports of the respective SRS resource transmits a corresponding spatial stream that is mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream.

Figure 13C:
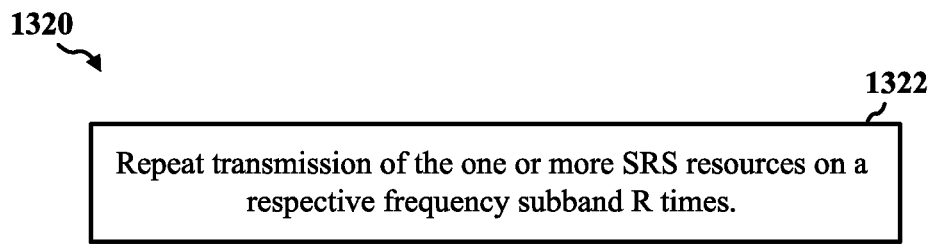

FIG. 13C shows a flowchart depicting an example operation 1320 for wireless communication that supports SRS transmissions with frequency hopping from a UE to a base station. The operation 1320 may be performed by a wireless communication device such as the UE 104 of FIG. 1, the UE 350 of FIG. 3, or the UE 604 of FIG. 6A. In some implementations, the example operation 1320 may be performed after transmitting the one or more SRS resources in block 1306 of FIG. 13A.

At block 1322, the UE repeats transmission of the one or more SRS resources on a respective frequency subband R times. In some implementations, the UE may map each of the antenna ports of an SRS resource in a respective slot to the corresponding set of subcarriers within each pair of R adjacent OFDM symbols based at least in part on the higher-layer parameters transmissionComb and freqHoppingTC. In some instances, frequency hopping across the pairs of R adjacent OFDM symbols may be based at least in part on the higher-layer parameters transmissionComb and freqHoppingTC.

Figure 13D:
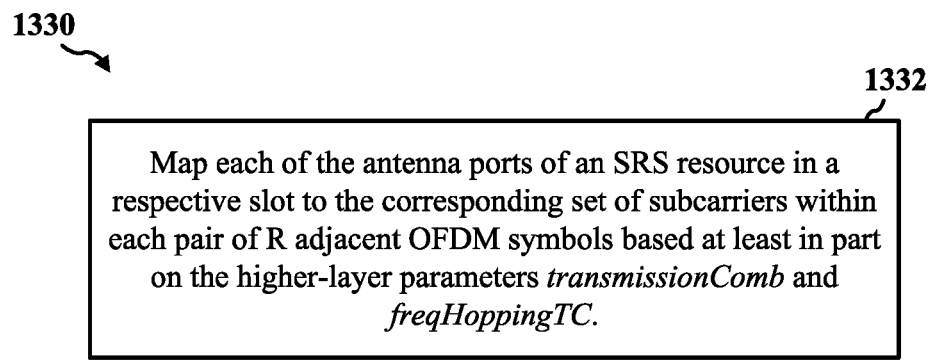

FIG. 13D shows a flowchart depicting an example operation 1330 for wireless communication that supports SRS transmissions with frequency hopping from a UE to a base station. The operation 1330 may be performed by a wireless communication device such as the UE 104 of FIG. 1, the UE 350 of FIG. 3, or the UE 604 of FIG. 6A. In some implementations, the example operation 1330 may be performed after repeating the transmission of the one or more SRS resources in block 1322 of FIG. 13C.

At block 1332, the UE maps each of the antenna ports of an SRS resource in a respective slot to the corresponding set of subcarriers within each pair of R adjacent OFDM symbols based at least in part on the higher-layer parameters transmissionComb and freqHoppingTC.

Figure 14:
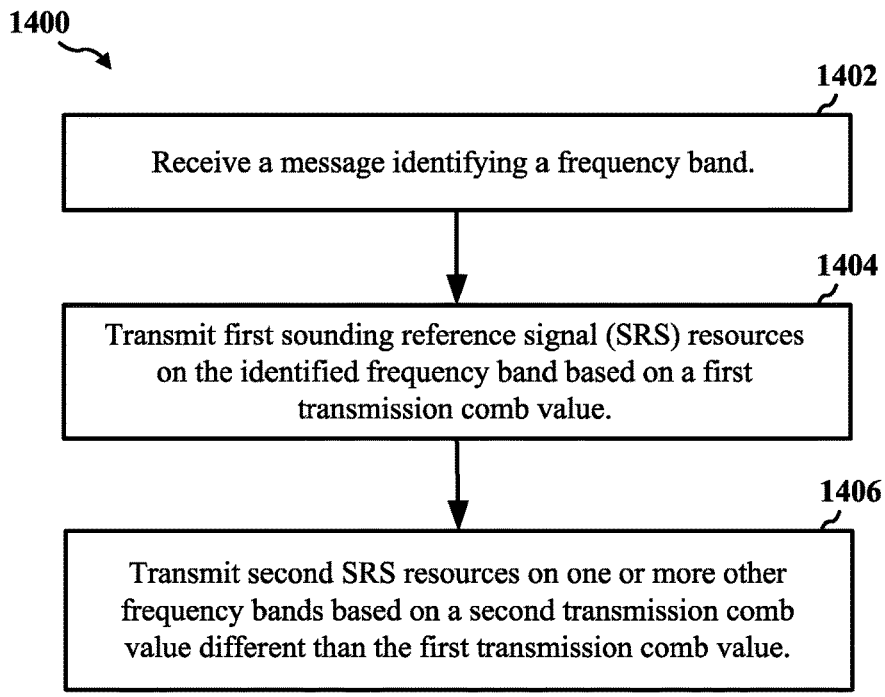
FIG. 14 shows a flowchart depicting an example operation for wireless communication that supports SRS transmissions without frequency hopping.

FIG. 14 shows a flowchart depicting an example operation 1400 for wireless communication that supports SRS transmissions from a UE to a base station. The operation 1400 may be performed by a wireless communication device such as the UE 104 of FIG. 1, the UE 350 of FIG. 3, or the UE 604 of FIG. 6B.

At block 1402, the UE receives a message identifying a frequency band. In some implementations, the message includes a higher-layer parameter transmissionComb indicating a first transmission comb value for the identified frequency band, and indicating one or more other transmission comb values for one or more other frequency bands. The message may also include a higher-layer parameter resourceMapping indicating a start position of the identified frequency band. In some instances, the message may be one of an RRC configuration message or a downlink control information (DCI) message.

At block 1404, the UE transmits first SRS resources on the identified frequency band based on a first transmission comb value. In some implementations, the first SRS resources are transmitted on the identified frequency band using every $i^{th}$ subcarrier index within a first group of subcarrier indices corresponding to the first SRS resources. In some instances, the first group of subcarrier indices spans a first number of RBs.

At block 1406, the UE transmits second SRS resources on one or more other frequency bands based on a second transmission comb value different than the first transmission comb value. In some implementations, second SRS resources are transmitted on the one or more other frequency bands using every $n^{th}$ subcarrier index within a second group of subcarrier indices corresponding to the second SRS resources, where the $i^{th}$ subcarrier index is different than the $n^{th}$ subcarrier index. In some instances, the second group of subcarrier indices spans a second number of RBs different than the first number of RBs.

Figure 15:
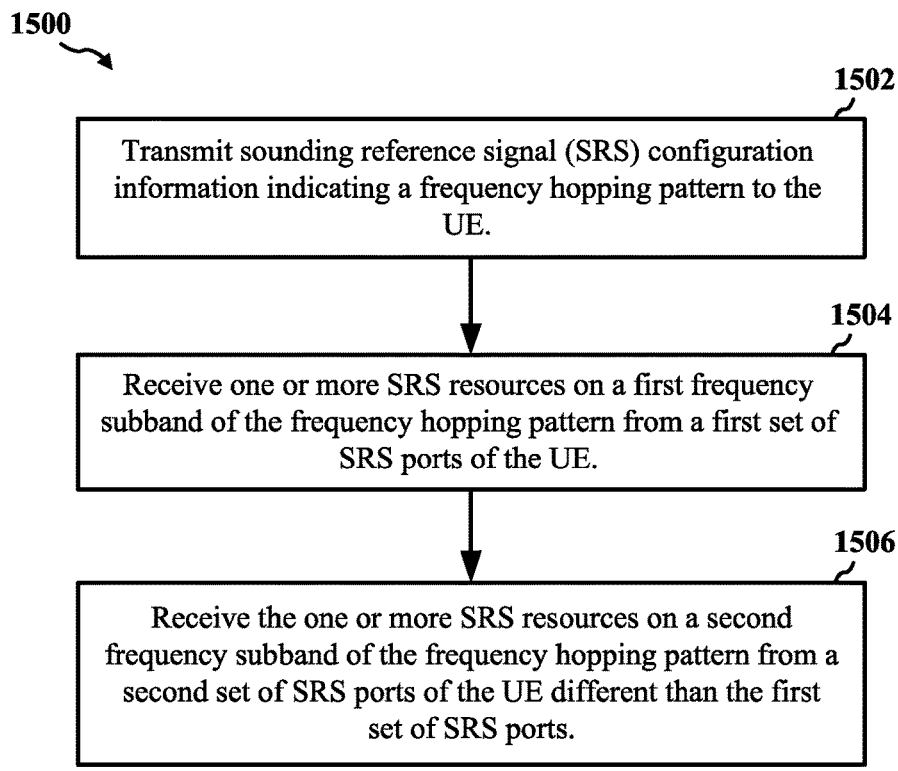
FIG. 15 shows a flowchart depicting another example operation for wireless communication that supports SRS transmissions with frequency hopping.

FIG. 15 shows a flowchart depicting an example operation 1500 for wireless communication that supports SRS transmissions with frequency hopping from a UE to a base station. The operation 1500 may be performed by a wireless communication device such as the base station 102 of FIG. 1, the base station 310 of FIG. 3, or the base station 602 of FIG. 6A.

At block 1502, the base station transmits SRS configuration information indicating a frequency hopping pattern to the UE. In some implementations, the SRS configuration information may include configured SRS resource sets, SRS parameters, and frequency hopping information. The SRS configuration information may be provided to the UE via RRC signaling (such as in one or more RRC messages). In some instances, the SRS configuration information includes a higher-layer parameter freqHoppingPort indicating port numbers corresponding to SRS ports to be used for transmitting SRS resources on various frequency subbands of the frequency hopping pattern. In some other implementations, the SRS configuration information may be received in a message indicating at least one of a number of antenna ports used to transmit SRS resources on each frequency subband of the frequency hopping pattern or antenna port numbers associated with transmission of the SRS resources on each frequency subband of the frequency hopping pattern. In some instances, the message may be one of a MAC-CE command or a DCI message received from the base station on a DL channel (such as the PDCCH).

At block 1504, the base station receives one or more SRS resources on a first frequency subband of the frequency hopping pattern from a first set of SRS ports of the UE. In some implementations, the one or more SRS resources are received on the first frequency subband from a first group of antenna ports of the UE.

At block 1506, the base station receives the one or more SRS resources on a second frequency subband of the frequency hopping pattern using a second set of SRS ports different than the first set of SRS ports. In some implementations, the one or more SRS resources are received on the second frequency subband from a second group of antenna ports that includes at least one antenna port not included in the first group of antenna ports. In some instances, the first and second sets of SRS ports may be configured to sound all antenna ports of the UE.

Figure 16A:
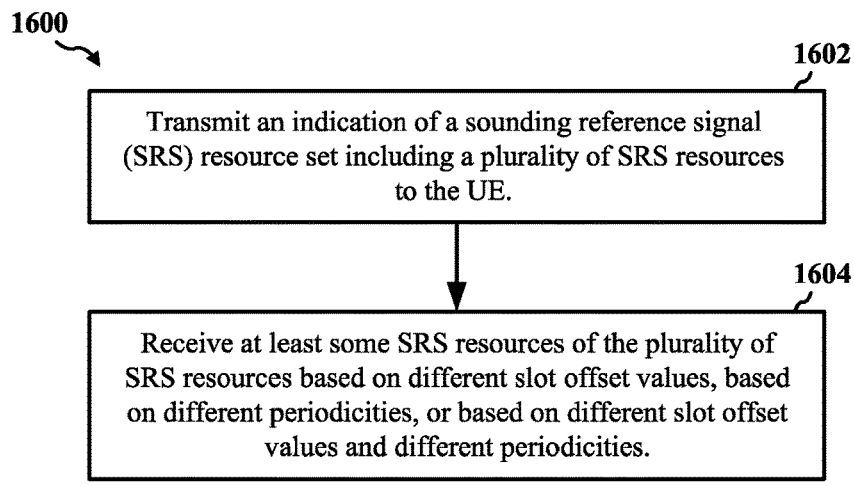
FIGS. 16A-16C show flowcharts depicting example operations for wireless communication that supports SRS transmissions with frequency hopping.

FIG. 16A shows a flowchart depicting an example operation 1600 for wireless communication that supports SRS transmissions with frequency hopping from a UE to a base station. The operation 1600 may be performed by a wireless communication device such as the base station 102 of FIG. 1, the base station 310 of FIG. 3, or the base station 602 of FIG. 6A.

At block 1602, the base station transmits an indication of an SRS resource set including a plurality of SRS resources to the UE. In some implementations, the indication may be transmitted in a message that indicates at least one of a number of antenna ports used to transmit SRS resources on each frequency subband of the frequency hopping pattern, antenna port numbers associated with transmission of the SRS resources on each frequency subband of the frequency hopping pattern, or a periodicity and offset value associated with transmission of the SRS resources on each frequency subband of the frequency hopping pattern. In some instances, the indication may be transmitted to the UE in an RRC configuration message. In other instances, the message may be one of a MAC-CE command or a DCI message transmitted to the UE on a DL channel (such as the PDCCH).

At block 1604, the base station receives at least some SRS resources of the plurality of SRS resources based on different slot offset values, based on different periodicities, or based on different slot offset values and different periodicities. In some implementations, the base station receives the at least some SRS resources on a first frequency subband of the frequency hopping pattern based on a first slot offset value, and receives the at least some SRS resources on a second frequency subband of the frequency hopping pattern based on a second slot offset value different than the first slot offset value. In other implementations, the base station receives the at least some SRS resources on the first frequency subband based on a first transmission comb value, and receives the at least some SRS resources on the second frequency subband based on a second transmission comb value different than the first transmission comb value. In some other implementations, the base station receives the at least some SRS resources on the first frequency subband based on the first slot offset value and the first transmission comb value, and receives the at least some SRS resources on the second frequency subband based on the second slot offset value and the second transmission comb value.

Figure 16B:
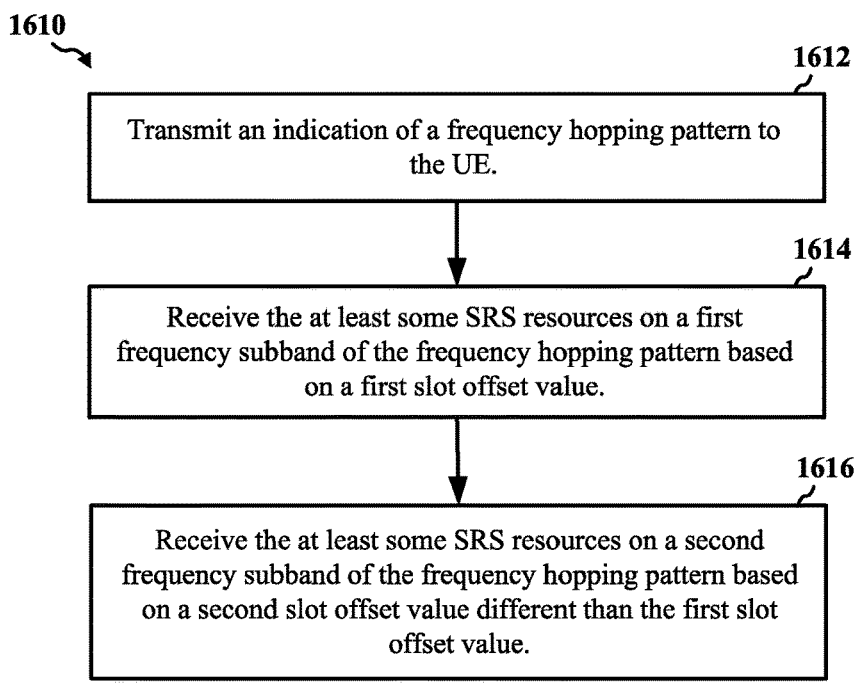

FIG. 16B shows a flowchart depicting an example operation 1610 for wireless communication that supports SRS transmissions with frequency hopping from a UE to a base station. The operation 1610 may be performed by a wireless communication device such as the base station 102 of FIG. 1, the base station 310 of FIG. 3, or the base station 602 of FIG. 6A. In some implementations, the example operation 1610 may be performed concurrently with one or more of the operations described in FIG. 16A.

At block 1612, the base station transmits an indication of a frequency hopping pattern to the UE. In some implementations, the indication may also indicate frequency offset values to be used for receiving SRS resources in each of the frequency subbands. In some instances, be transmitted by the base station in an RRC configuration message.

At block 1614, the base station receives the at least some SRS resources on a first frequency subband of the frequency hopping pattern based on a first slot offset value. In some implementations, the at least some SRS resources are received on the first frequency subband in the $n^{th}$ symbol of a first uplink slot.

At block 1616, the base station receives the at least some SRS resources on a second frequency subband of the frequency hopping pattern based on a second slot offset value different than the first slot offset value. In some implementations, the at least some SRS resources are received on the second frequency subband in the $n^{th}+1$ symbol of a second UL slot.

Figure 16C:
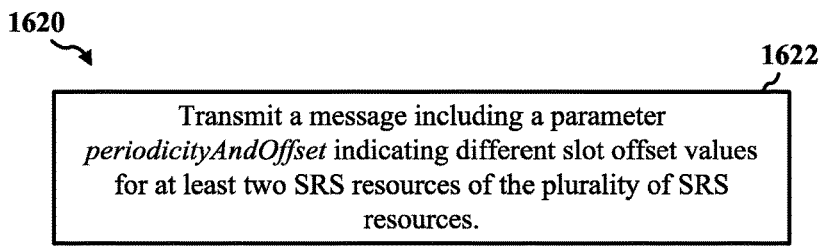

FIG. 16C shows a flowchart depicting an example operation 1620 for wireless communication that supports SRS transmissions with frequency hopping from a UE to a base station. The operation 1620 may be performed by a wireless communication device such as the base station 102 of FIG. 1, the base station 310 of FIG. 3, or the base station 602 of FIG. 6A. In some implementations, the example operation 1620 may be performed before transmitting the indication of the SRS resource set in block 1602 of FIG. 16A.

At block 1622, the base station transmits a message including a parameter periodicityAndOffset indicating different slot offset values for at least two SRS resources of the plurality of SRS resources. In some instances, the plurality of SRS resources are configured as periodic SRS resources, semi-persistent SRS resources, or aperiodic SRS resources based on a radio resource control (RRC) configuration message. The configured semi-persistent SRS resources may be activated by a MAC-CE command, and the aperiodic SRS resources may be triggered by a DCI message.

Figure 17:
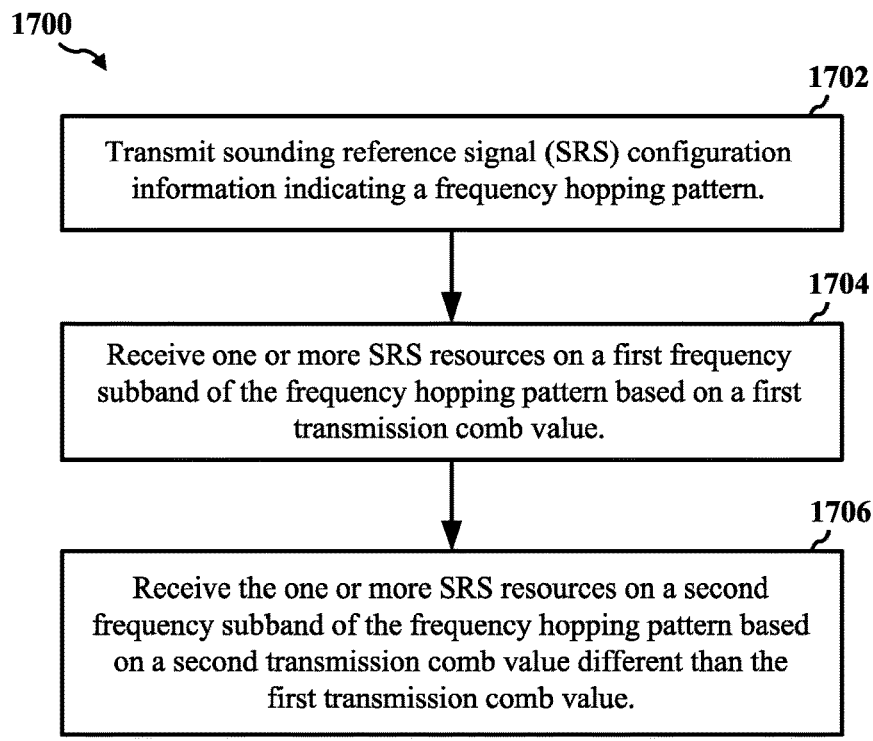
FIG. 17 shows a flowchart depicting another example operation for wireless communication that supports SRS transmissions with frequency hopping.

FIG. 17 shows a flowchart depicting an example operation 1700 for wireless communication that supports SRS transmissions with frequency hopping from a UE to a base station. The operation 1700 may be performed by a wireless communication device such as the base station 102 of FIG. 1, the base station 310 of FIG. 3, or the base station 602 of FIG. 6A.

At block 1702, the base station transmits SRS configuration information indicating a frequency hopping pattern. In some implementations, the SRS configuration information may include higher-layer parameters transmissionComb and freqHoppingTC indicating transmission comb values for the various frequency subbands of the frequency hopping pattern. The SRS configuration information may also include a higher-layer parameter resourceMapping indicating a start position of each frequency subband of the frequency hopping pattern. In some other implementations, the SRS configuration information may be transmitted in a message indicating at least one of a number of antenna ports used to transmit SRS resources on each frequency subband of the frequency hopping pattern, antenna port numbers associated with transmission of the SRS resources on each frequency subband of the frequency hopping pattern, a periodicity and offset value associated with transmission of the SRS resources on each frequency subband of the frequency hopping pattern, or a transmission comb value associated with transmission of the SRS resources on each frequency subband of the frequency hopping pattern. In some instances, the message may be one of an RRC configuration message or a DCI message.

At block 1704, the base station receives one or more SRS resources on a first frequency subband of the frequency hopping pattern based on a first transmission comb value. In some implementations, the one or more SRS resources are received on the first frequency subband in every $i^{th}$ subcarrier index of a group of subcarrier indices. In some instances, the group of subcarrier indices spans a certain number of RBs.

At block 1706, the base station receives the one or more SRS resources on a second frequency subband of the frequency hopping pattern based on a second transmission comb value different than the first transmission comb value. In some implementations, the one or more SRS resources are received on the second frequency subband in every $n^{th}$ subcarrier index of the group of subcarrier indices, where the $i^{th}$ subcarrier index is different than the $n^{th}$ subcarrier index. In some instances, the group of subcarrier indices spans a certain number of RBs.

Figure 18:
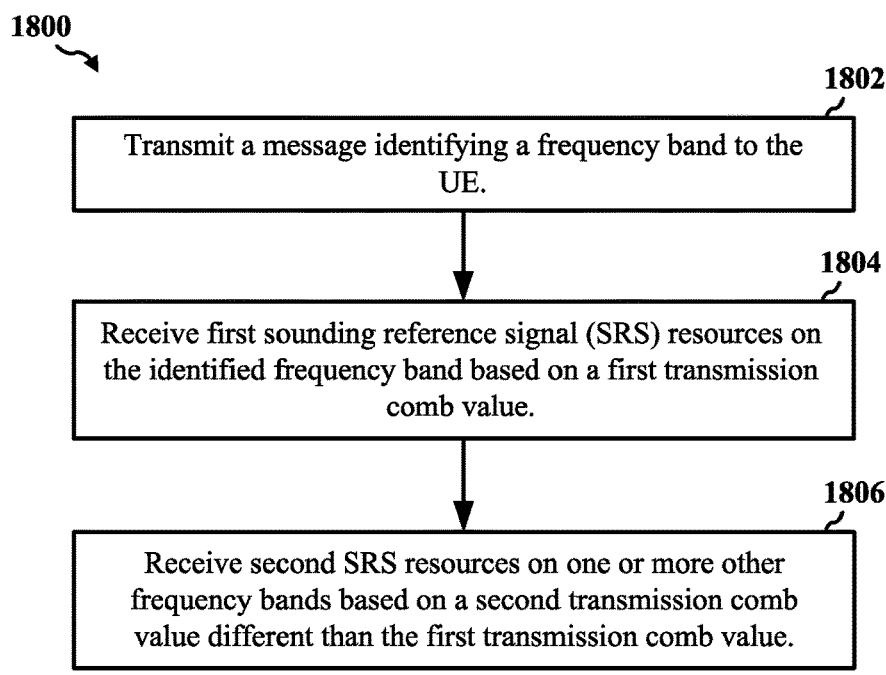
FIG. 18 shows a flowchart depicting another example operation for wireless communication that supports SRS transmissions without frequency hopping.

FIG. 18 shows a flowchart depicting an example operation 1800 for wireless communication that supports SRS transmissions from a UE to a base station. The operation 1800 may be performed by a wireless communication device such as the base station 102 of FIG. 1, the base station 310 of FIG. 3, or the base station 602 of FIG. 6B.

At block 1802, the base station transmits a message identifying a frequency band to the UE. In some implementations, the message includes higher-layer parameters transmissionComb and freqHoppingTC indicating offset values for the various frequency subbands of the frequency hopping pattern. The message may also include a higher-layer parameter resourceMapping indicating a start position of the identified frequency band. In some instances, the message may be one of an RRC configuration message or a downlink control information (DCI) message.

At block 1804, the base station receives first SRS resources on the identified frequency band based on a first transmission comb value. In some implementations, the first SRS resources are received on the identified frequency band in every $i^{th}$ subcarrier index within a first group of subcarrier indices corresponding to the first SRS resources. In some instances, the first group of subcarrier indices spans a first number of RBs.

At block 1806, the base station receives second SRS resources on one or more other frequency bands based on a second transmission comb value different than the first transmission comb value. In some implementations, second SRS resources are received on the one or more other frequency bands in every $n^{th}$ subcarrier index within a second group of subcarrier indices corresponding to the second SRS resources, where the $i^{th}$ subcarrier index is different than the $n^{th}$ subcarrier index. In some instances, the second group of subcarrier indices spans a second number of RBs different than the first number of RBs. In some instances, the message may include a higher-layer parameter resourceMapping indicating a start position of the identified frequency band. The message may be one of a RRC configuration message or a DCI message.

In some implementations, the first and second SRS resources are configured as periodic SRS resources, semi-persistent SRS resources, or aperiodic SRS resources based on an RRC configuration message. The configured semi-persistent SRS resources may be activated by a MAC-CE command, and the aperiodic SRS resources may be triggered by a DCI message.

Figure 19:
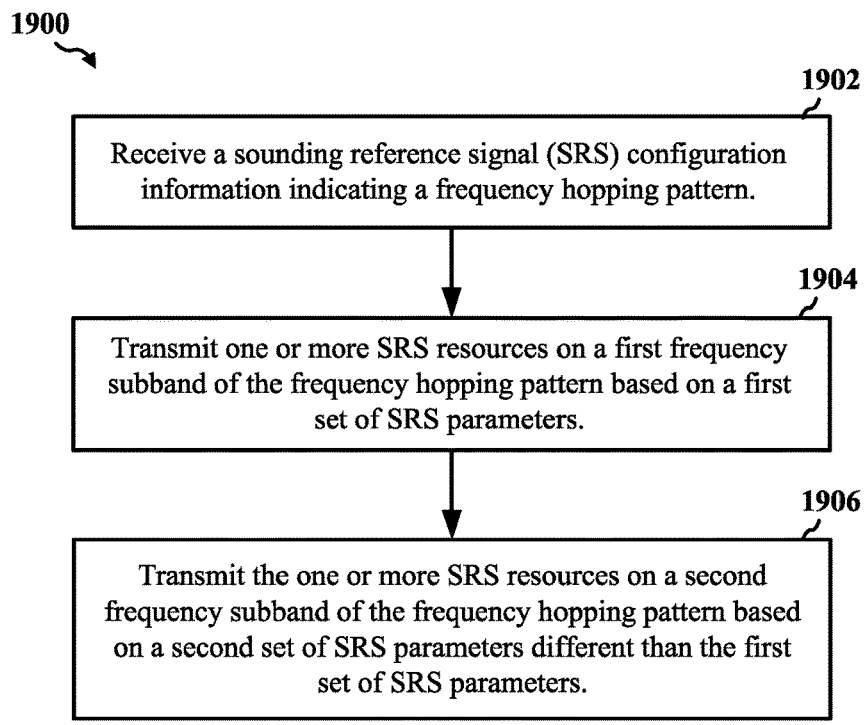
FIG. 19 shows a flowchart depicting another example operation for wireless communication that supports SRS transmissions with frequency hopping.

FIG. 19 shows a flowchart depicting an example operation 1900 for wireless communication that supports SRS transmissions with frequency hopping from a UE to a base station. The operation 1900 may be performed by a wireless communication device such as the UE 104 of FIG. 1, the UE 350 of FIG. 3, or the UE 604 of FIG. 6A.

At block 1902, the UE receives SRS configuration information indicating a frequency hopping pattern. In some implementations, the SRS configuration information may indicate at least one of a number of antenna ports used to transmit SRS resources on each frequency subband of the frequency hopping pattern, antenna port numbers associated with transmission of the SRS resources on each frequency subband, a periodicity and offset value associated with transmission of the SRS resources on each frequency subband, or a transmission comb value associated with transmission of the SRS resources on each frequency subband. In some instances, the SRS configuration information may include higher-layer parameters transmissionComb and freqHoppingTC indicating transmission comb values for the various frequency subbands of the frequency hopping pattern, and may include a higher-layer parameter resourceMapping indicating a start position of each frequency subband of the frequency hopping pattern. The SRS configuration information may be received from the base station in an RRC configuration message or in a DCI message.

At block 1904, the UE transmits one or more SRS resources on a first frequency subband of the frequency hopping pattern based on a first set of SRS parameters. The first set of SRS parameters may identify one or more of a first set of SRS ports of the UE, first periodicity and offset values, a first transmission comb value, or a first transmission comb offset value. In some implementations, the one or more SRS resources may be transmitted on the first frequency using a first set of antennas of the UE. In other implementations, at least some SRS resources may be transmitted on the first frequency subband using on a first slot offset value. In some other implementations, the one or more SRS resources may be transmitted on the first frequency subband based on a first transmission comb value.

At block 1906, the UE transmits the one or more SRS resources on a second frequency subband of the frequency hopping pattern based on a second set of SRS parameters different than the first set of SRS parameters. The second set of SRS parameters may identify one or more of a second set of SRS ports of the UE, second periodicity and offset values, a second transmission comb value, or a second transmission comb offset value. In some implementations, the one or more SRS resources are transmitted on the second frequency subband using a second set of antennas different than the first set of antennas. In other implementations, at least some SRS resources are transmitted on the second frequency subband using a second slot offset value different than the first slot offset value. In some other implementations, the one or more SRS resources are transmitted on the second frequency subband based on a second transmission comb value different than the first transmission comb value.

Figure 20:
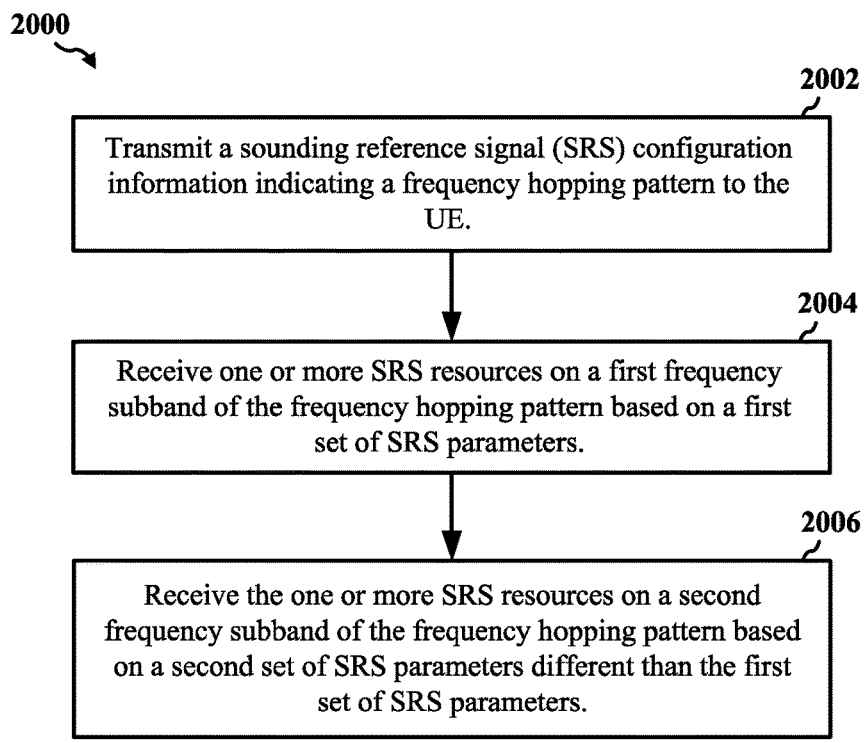
FIG. 20 shows a flowchart depicting another example operation for wireless communication that supports SRS transmissions with frequency hopping.

FIG. 20 shows a flowchart depicting an example operation 2000 for wireless communication that supports SRS transmissions with frequency hopping from a UE to a base station. The operation 2000 may be performed by a wireless communication device such as the base station 102 of FIG. 1, the base station 310 of FIG. 3, or the base station 602 of FIG. 6A.

At block 2002, the base station transmits SRS configuration information indicating a frequency hopping pattern to the UE. In some implementations, the SRS configuration information may indicate at least one of a number of antenna ports used to transmit SRS resources on each frequency subband of the frequency hopping pattern, antenna port numbers associated with transmission of the SRS resources on each frequency subband, a periodicity and offset value associated with transmission of the SRS resources on each frequency subband, or a transmission comb value associated with transmission of the SRS resources on each frequency subband. In some instances, the SRS configuration information may include higher-layer parameters transmissionComb and freqHoppingTC indicating transmission comb values for the various frequency subbands of the frequency hopping pattern, and may include a higher-layer parameter resourceMapping indicating a start position of each frequency subband of the frequency hopping pattern. The SRS configuration information may be transmitted to the UE in an RRC configuration message or in a DCI message.

At block 2004, the base station receives one or more SRS resources on a first frequency subband of the frequency hopping pattern based on a first set of SRS parameters. The first set of SRS parameters may identify one or more of a first set of SRS ports of the UE, first periodicity and offset values, a first transmission comb value, or a first transmission comb offset value. In some implementations, the one or more SRS resources may be received on the first frequency from a first set of antennas of the UE. In other implementations, at least some SRS resources may be received on the first frequency subband based on a first slot offset value. In some other implementations, the one or more SRS resources may be received on the first frequency subband based on a first transmission comb value.

At block 2006, the base station receives the one or more SRS resources on a second frequency subband of the frequency hopping pattern based on a second set of SRS parameters different than the first set of SRS parameters. The second set of SRS parameters may identify one or more of a second set of SRS ports of the UE, second periodicity and offset values, a second transmission comb value, or a second transmission comb offset value. In some implementations, the one or more SRS resources are received on the second frequency subband from a second set of antennas of the UE different than the first set of antennas. In other implementations, at least some SRS resources are received on the second frequency subband based on a second slot offset value different than the first slot offset value. In some other implementations, the one or more SRS resources are received on the second frequency subband based on a second transmission comb value different than the first transmission comb value.

Figure 21A:
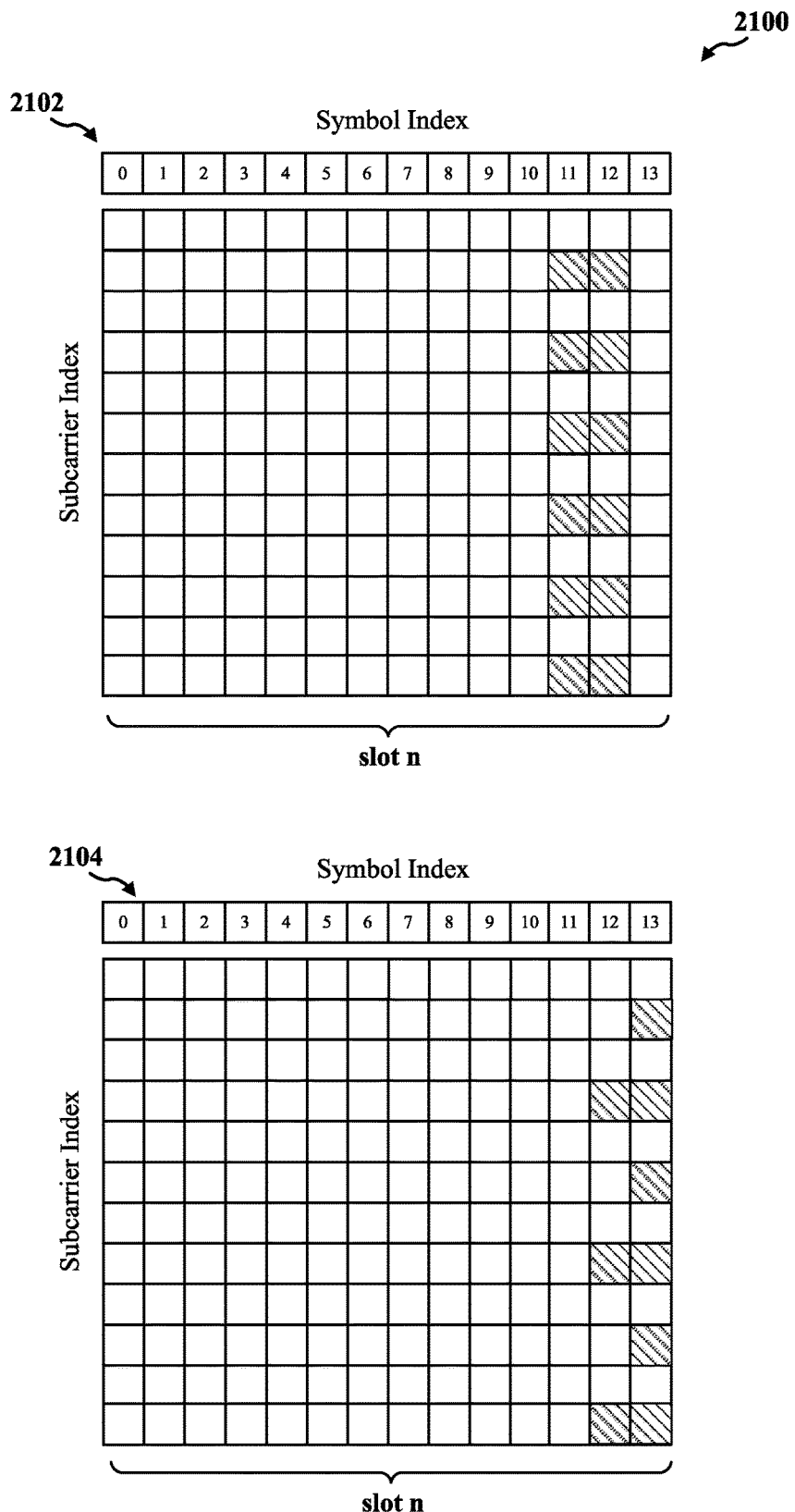
FIGS. 21A-21C show example SRS transmission patterns that may be used with frequency hopping according to some implementations.
Figure 21B:
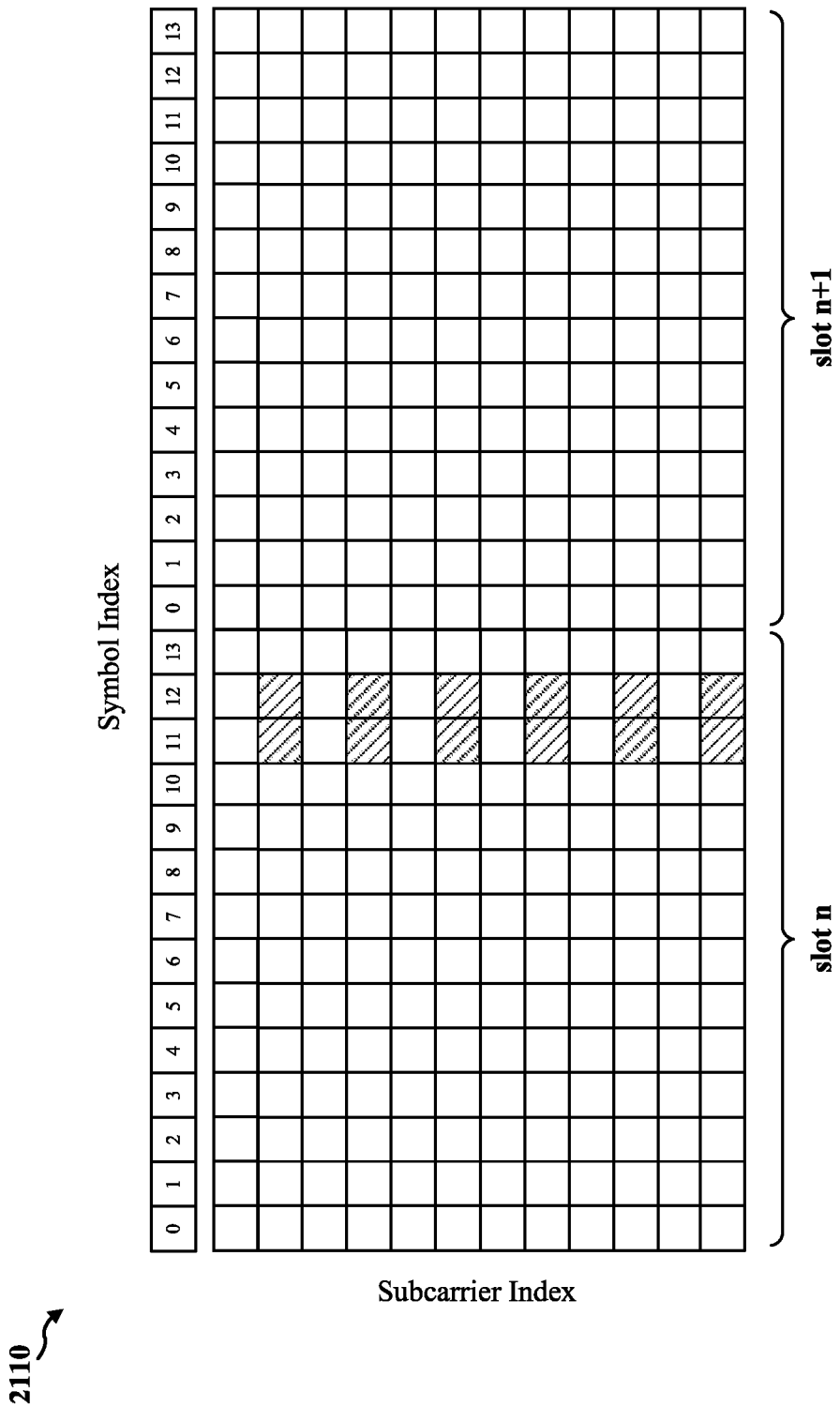
Figure 21C:
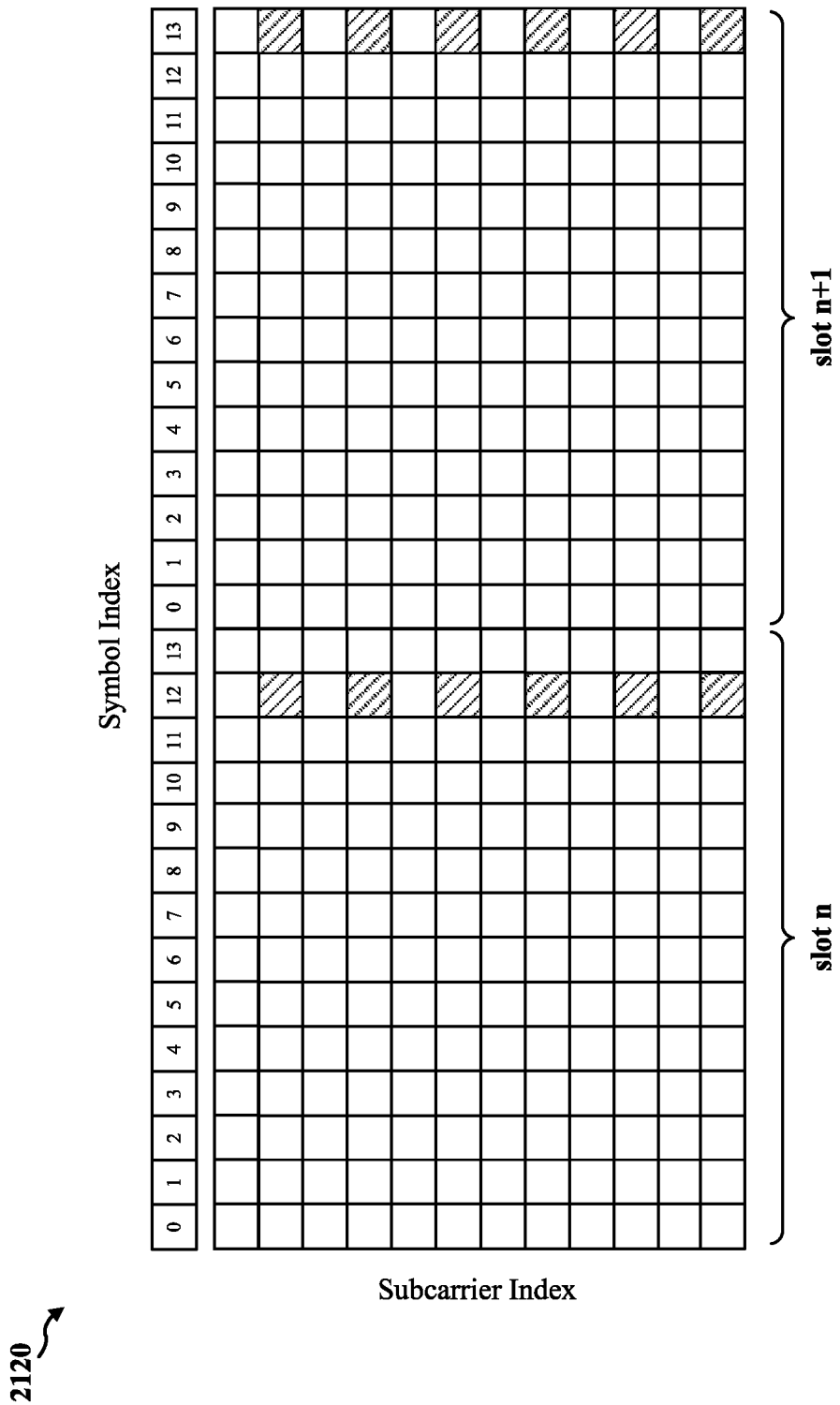

FIGS. 21A-21C show example SRS transmission patterns that may be used with frequency hopping according to some implementations. In some aspects, the UE may use different numbers of OFDM symbols for different frequency bands for frequency hopping. FIG. 21A shows an example SRS transmission pattern 2100 that may be used with frequency hopping according to some implementations. The transmission pattern 2100 depicts a first SRS resource 2102 transmitted on a first frequency subband using two symbols (in symbol periods 11 and 12) and depicts a second SRS resource 2104 transmitted on a second frequency subband using one symbol (in symbol period 13).

FIG. 21B shows an example SRS resource 2110 in association with first SRS resource 2102 that may be used with frequency hopping according to some implementations, and FIG. 21C shows an example SRS resource 2120 in association with second SRS resource 2104 that may be used with frequency hopping according to other implementations. The number of symbols used for different frequency hops may be indicated in an SRS resource configuration or in a separate message transmitted as an RRC message, as a MAC-CE, or in DCI.

Figure 22:
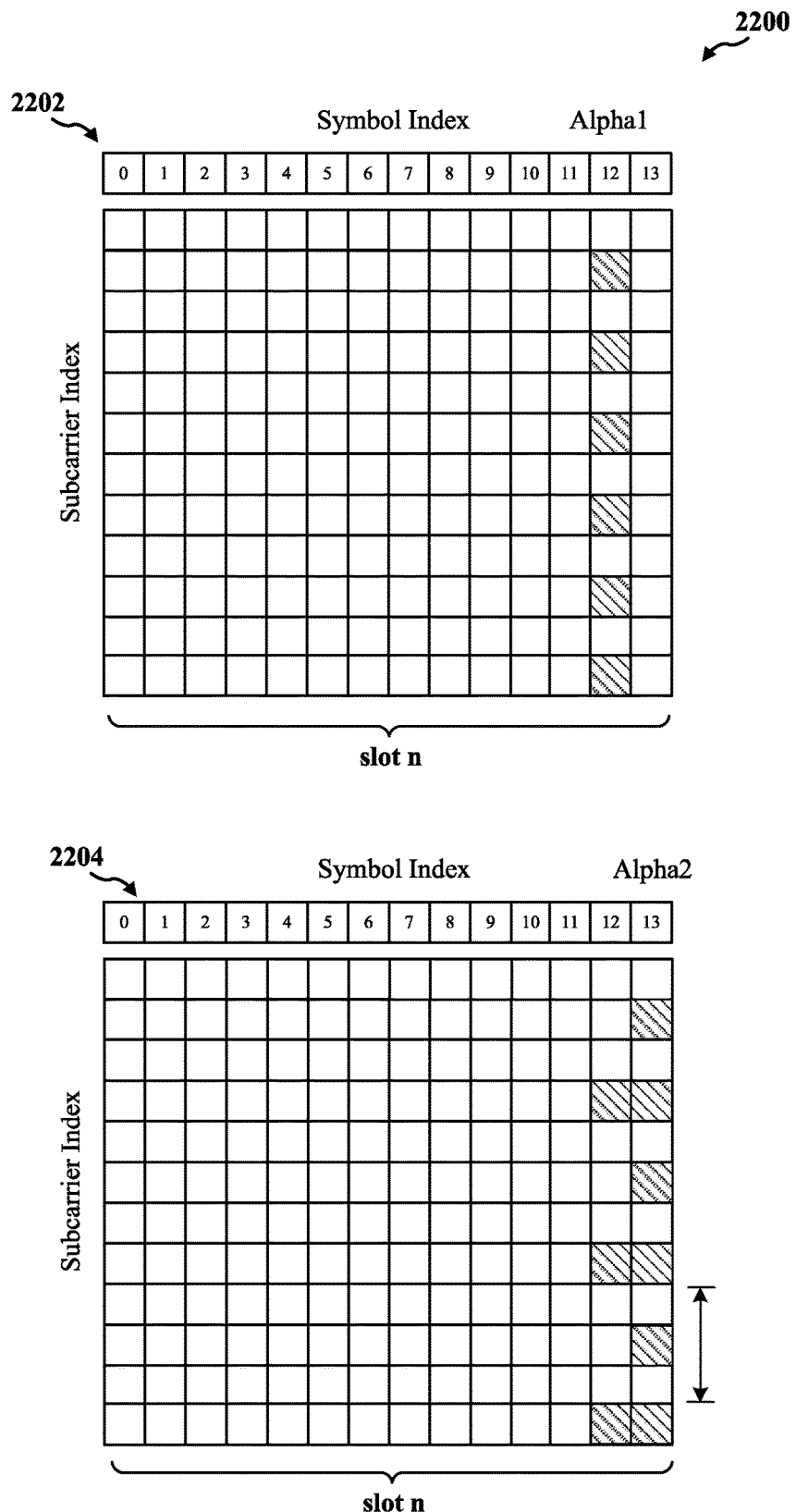
FIG. 22 shows an example SRS transmission pattern that may be used without frequency hopping according to some implementations.

FIG. 22 shows an example SRS transmission pattern 2200 that may be used with frequency hopping according to other implementations. In some aspects, the UE may use different power control parameters for different frequency bands for frequency hopping. The power control parameters may include parameters for setting a transmit power for SRS transmissions in a frequency band. The power control parameters may include default power parameters (e.g., p0) and/or offset factor (e.g., alpha) parameters as specified in technical specifications for SRS transmission power. For example, the UE may transmit an SRS with an SRS transmission power based at least in part on a value of p0 plus a product of alpha and a pathloss value, where the alpha serves as a factor for offsetting a total transmit power level from a default transmit power level. The p0 and alpha for each frequency band in a frequency hopping pattern may be specified in an SRS resource configuration or a separate message transmitted as an RRC message, as a MAC-CE, or in DCI.

The transmission pattern 2200 depicts a first SRS resource 2202 for a first frequency band that is transmitted with a first alpha value (shown in FIG. 22 as Alpha1) and a second SRS resource 2204 for a second frequency band that is transmitted with a second alpha value (shown in FIG. 22 as Alpha2).

Figure 23:
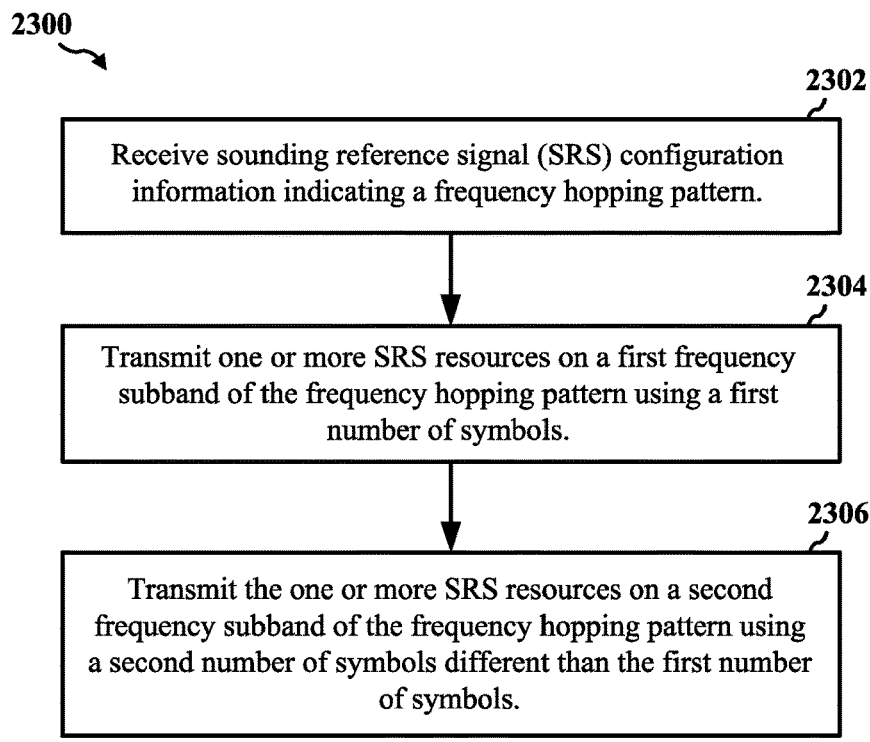
FIG. 23 shows a flowchart depicting another example operation for wireless communication that supports SRS transmissions with frequency hopping.

FIG. 23 shows a flowchart depicting an example operation 2300 for wireless communication that supports SRS transmissions with frequency hopping from a UE to a base station. The operation 2300 may be performed by a wireless communication device such as the UE 104 of FIG. 1, the UE 350 of FIG. 3, or the UE 604 of FIG. 6A.

At block 2302, the UE receives SRS configuration information indicating a frequency hopping pattern. In some instances, the SRS configuration information may be transmitted to the UE in an RRC configuration message, a MAC-CE, or in a DCI message.

At block 2304, the UE transmits one or more SRS resources on a first frequency subband of the frequency hopping pattern using a first number of symbols.

At block 2306, the UE transmits the one or more SRS resources on a second frequency subband of the frequency hopping pattern using a second number of symbols different than the first number of symbols. In some implementations, one frequency band may use one OFDM symbol and another frequency band may use two OFDM symbols. Various combinations of different numbers of OFDM symbols may be used. In some instances, an indication of the numbers of symbols may be transmitted to the UE separately in an RRC configuration message, a MAC-CE, or in a DCI message.

Figure 24:
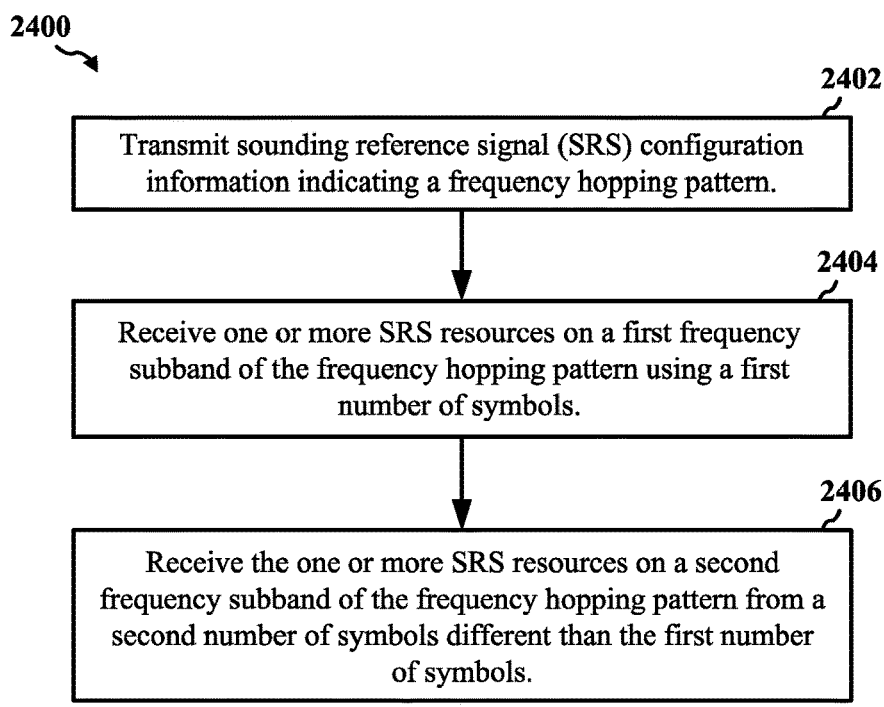
FIG. 24 shows a flowchart depicting another example operation for wireless communication that supports SRS transmissions without frequency hopping.

FIG. 24 shows a flowchart depicting an example operation 2400 for wireless communication that supports SRS transmissions with frequency hopping from a UE to a base station. The operation 2400 may be performed by a wireless communication device such as the base station 102 of FIG. 1, the base station 310 of FIG. 3, or the base station 602 of FIG. 6A.

At block 2402, the base station transmits SRS configuration information indicating a frequency hopping pattern to the UE. The SRS configuration information may be transmitted to the UE in an RRC configuration message, a MAC-CE, or in a DCI message.

At block 2404, the base station receives one or more SRS resources on a first frequency subband of the frequency hopping pattern using a first number of symbols.

At block 2406, the base station receives the one or more SRS resources on a second frequency subband of the frequency hopping pattern using a second number of symbols different than the first number of symbols. In some instances, an indication of the numbers of symbols may be transmitted to the UE separately in an RRC configuration message, a MAC-CE, or in a DCI message.

Figure 25:
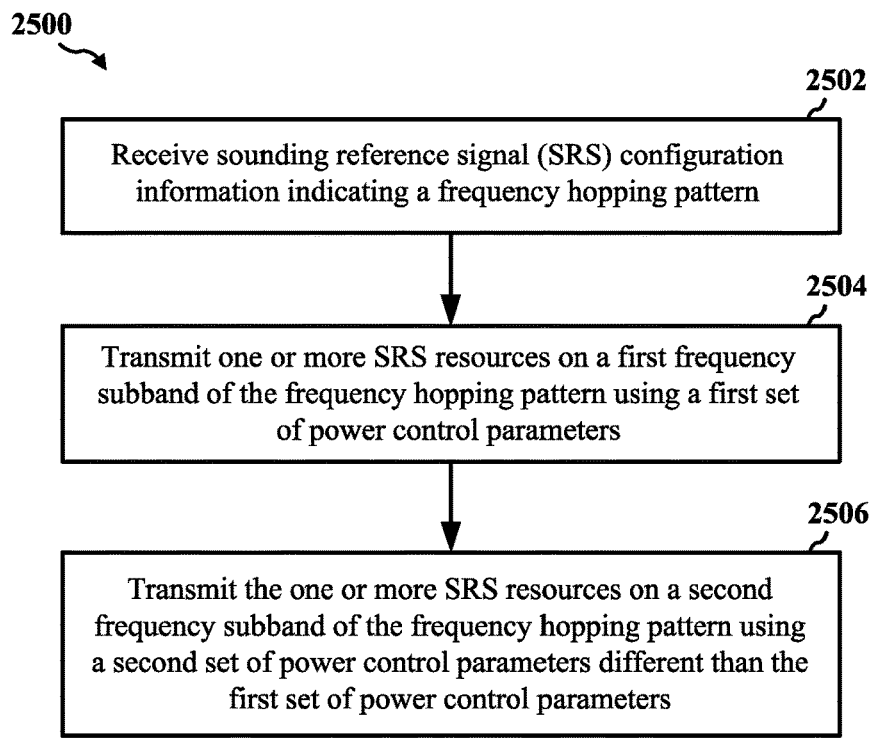
FIG. 25 shows a flowchart depicting another example operation for wireless communication that supports SRS transmissions with frequency hopping.

FIG. 25 shows a flowchart depicting an example operation 2500 for wireless communication that supports SRS transmissions with frequency hopping from a UE to a base station. The operation 2500 may be performed by a wireless communication device such as the UE 104 of FIG. 1, the UE 350 of FIG. 3, or the UE 604 of FIG. 6A.

At block 2502, the UE receives SRS configuration information indicating a frequency hopping pattern. In some instances, the SRS configuration information may be transmitted to the UE in an RRC configuration message, a MAC-CE, or in a DCI message.

At block 2504, the UE transmits one or more SRS resources on a first frequency subband of the frequency hopping pattern using a first set of power control parameters.

At block 2506, the UE transmits the one or more SRS resources on a second frequency subband of the frequency hopping pattern using a second set of power control parameters different than the first set of power control parameters. In some implementations, the first set of power control parameters may include a first default power parameter that is different than a second default power parameter of the second set of power control parameters. The first default power parameter and the second default power parameter may include p0 parameters. In some implementations, the first set of power control parameters may include a first offset factor parameter that is different than a second offset factor parameter of the second set of power control parameters. The first offset factor parameter and the second offset factor parameter may be alpha parameters. In some instances, an indication of the number of symbols may be transmitted to the UE separately in an RRC configuration message, a MAC-CE, or in a DCI message.

Figure 26:
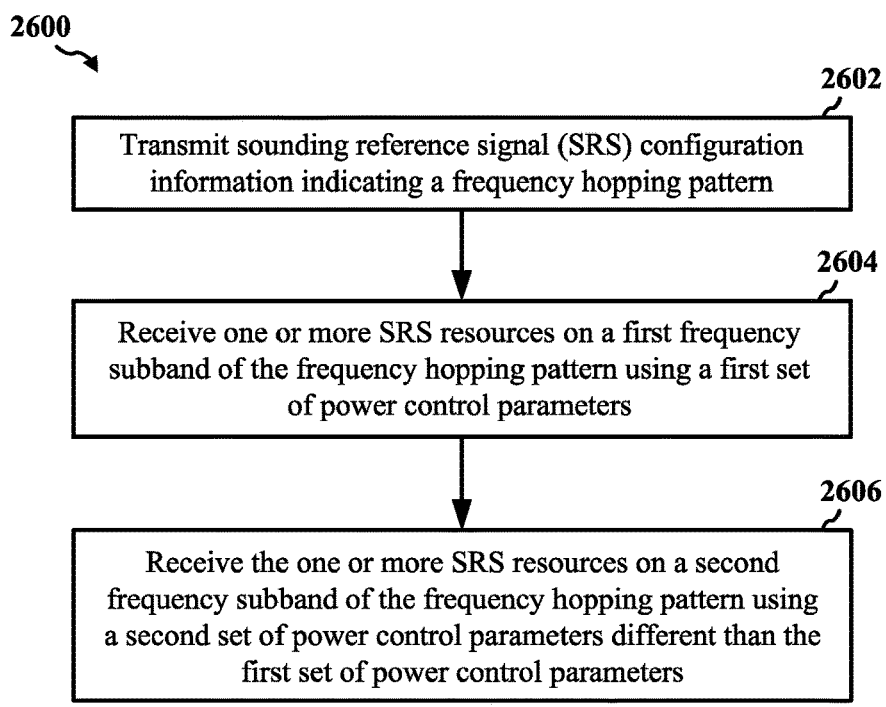
FIG. 26 shows a flowchart depicting another example operation for wireless communication that supports SRS transmissions with frequency hopping.

FIG. 26 shows a flowchart depicting an example operation 2600 for wireless communication that supports SRS transmissions with frequency hopping from a UE to a base station. The operation 2600 may be performed by a wireless communication device such as the base station 102 of FIG. 1, the base station 310 of FIG. 3, or the base station 602 of FIG. 6A.

At block 2602, the base station transmits SRS configuration information indicating a frequency hopping pattern to the UE. The SRS configuration information may be transmitted to the UE in an RRC configuration message, a MAC-CE, or in a DCI message.

At block 2604, the base station receives one or more SRS resources on a first frequency subband of the frequency hopping pattern using a first set of power control parameters.

At block 2606, the base station receives the one or more SRS resources on a second frequency subband of the frequency hopping pattern using a second set of power control parameters different than the first set of power control parameters. In some implementations, the first set of power control parameters may include a first default power parameter that is different than a second default power parameter of the second set of power control parameters. The first default power parameter and the second default power parameter may include p0 parameters. In some implementations, the first set of power control parameters may include a first offset factor parameter that is different than a second offset factor parameter of the second set of power control parameters. The first offset factor parameter and the second offset factor parameter may be alpha parameters. In some instances, an indication of the power control parameters for each frequency band may be transmitted to the UE separately in an RRC configuration message, a MAC-CE, or in a DCI message.

As used herein, a phrase referring to "at least one of" a list of items refers to any combination of those items, including single members. As an example, "at least one of: a, b, or c" is intended to cover: a, b, c, a-b, a-c, b-c, and a-b-c.

The following provides an overview of some Aspects of the present disclosure:

Aspect 1: A method of wireless communication performed by a user equipment (UE), the method comprising: receiving sounding reference signal (SRS) configuration information indicating a frequency hopping pattern; transmitting one or more SRS resources on a first frequency subband of the frequency hopping pattern using a first number of symbols; and transmitting the one or more SRS resources on a second frequency subband of the frequency hopping pattern using a second number of symbols different than the first number of symbols.

Aspect 2: The method of Aspect 1, wherein the first number of symbols is one symbol and the second number of symbols is two symbols.

Aspect 3: The method of Aspect 1 or 2, wherein the one or more SRS resources are configured as periodic SRS resources, semi-persistent SRS resources, or aperiodic SRS resources based on a radio resource control (RRC) configuration message.

Aspect 4: The method of any of Aspects 1-3, wherein the configured semi-persistent SRS resources are activated by a medium access control (MAC) control element (CE) (MAC-CE) command, and the aperiodic SRS resources are triggered by a downlink control information (DCI) message.

Aspect 5: The method of any of Aspects 1-4, wherein the SRS configuration information indicates at least one of the first number of symbols or the second number of symbols.

Aspect 6: The method of any of Aspects 1-5, further comprising receiving a message indicating at least one of the first number of symbols or the second number of symbols.

Aspect 7: The method of Aspect 6, wherein the message comprises one of a medium access control (MAC) control element (CE) (MAC-CE) command or a downlink control information (DCI) message.

Aspect 9: A method of wireless communication performed by a base station (BS), the method comprising: transmitting sounding reference signal (SRS) configuration information indicating a frequency hopping pattern; receiving one or more SRS resources on a first frequency subband of the frequency hopping pattern using a first number of symbols; and receiving the one or more SRS resources on a second frequency subband of the frequency hopping pattern from a second number of symbols different than the first number of symbols.

Aspect 10: The method of Aspect 9, wherein the first number of symbols is one symbol and the second number of symbols is two symbols.

Aspect 11: The method of Aspect 9 or 10, wherein the SRS configuration information indicates at least one of the first number of symbols or the second number of symbols.

Aspect 12: The method of any of Aspects 9-11, further comprising receiving a message indicating at least one of the first number of symbols or the second number of symbols.

Aspect 14: A method of wireless communication performed by a user equipment (UE), the method comprising: receiving sounding reference signal (SRS) configuration information indicating a frequency hopping pattern; transmitting one or more SRS resources on a first frequency subband of the frequency hopping pattern using a first set of power control parameters; and transmitting the one or more SRS resources on a second frequency subband of the frequency hopping pattern using a second set of power control parameters different than the first set of power control parameters.

Aspect 15: The method of Aspect 14, wherein the first set of power control parameters includes a first default power parameter that is different than a second default power parameter of the second set of power control parameters.

Aspect 16: The method of Aspect 15, wherein the first default power parameter and the second default power parameter are p0 parameters.

Aspect 17: The method of any of Aspects 14-16, wherein the first set of power control parameters includes a first offset factor parameter that is different than a second offset factor parameter of the second set of power control parameters.

Aspect 18: The method of Aspect 17, wherein the first offset factor parameter and the second offset factor parameter are alpha parameters.

Aspect 19: The method of any of Aspects 14-18, wherein the SRS configuration information indicates at least one of the first set of power parameters or the second set of power parameters.

Aspect 20: The method of any of Aspects 14-19, further comprising receiving a message indicating at least one of the first set of power parameters or the second set of power parameters.

Aspect 21: The method of Aspect 20, wherein the message comprises one of a medium access control (MAC) control element (CE) (MAC-CE) command or a downlink control information (DCI) message.

Aspect 23: A method of wireless communication performed by a base station (BS), the method comprising: transmitting sounding reference signal (SRS) configuration information indicating a frequency hopping pattern; receiving one or more SRS resources on a first frequency subband of the frequency hopping pattern using a first set of power control parameters; and receiving the one or more SRS resources on a second frequency subband of the frequency hopping pattern using a second set of power control parameters different than the first set of power control parameters.

Aspect 24: The method of Aspect 23, wherein the first set of power control parameters includes a first default power parameter that is different than a second default power parameter of the second set of power control parameters.

Aspect 25: The method of Aspect 24, wherein the first default power parameter and the second default power parameter are p0 parameters.

Aspect 26: The method of any of Aspects 23-25, wherein the first set of power control parameters includes a first offset factor parameter that is different than a second offset factor parameter of the second set of power control parameters.

Aspect 27: The method of Aspect 26, wherein the first offset factor parameter and the second offset factor parameter are alpha parameters.

Aspect 28: The method of any of Aspects 23-27, wherein the SRS configuration information indicates at least one of the first set of power parameters or the second set of power parameters.

Aspect 29: The method of any of Aspects 23-28, further comprising receiving a message indicating at least one of the first set of power parameters or the second set of power parameters.

Aspect 30: The method of Aspect 29, wherein the message comprises one of a medium access control (MAC) control element (CE) (MAC-CE) command or a downlink control information (DCI) message.

Aspect 31: An apparatus for wireless communication at a device, comprising a processor; memory coupled with the processor; and instructions stored in the memory and executable by the processor to cause the apparatus to perform the method of one or more Aspects of Aspects 1-30.

Aspect 32: A device for wireless communication, comprising a memory and one or more processors coupled to the memory, the memory and the one or more processors configured to perform the method of one or more Aspects of Aspects 1-30.

Aspect 33: An apparatus for wireless communication, comprising at least one means for performing the method of one or more Aspects of Aspects 1-30.

Aspect 34: A non-transitory computer-readable medium storing code for wireless communication, the code comprising instructions executable by a processor to perform the method of one or more Aspects of Aspects 1-30.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-30.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of wireless communication performed by a user equipment, the method comprising:
   receiving sounding reference signal (SRS) configuration information indicating a frequency hopping pattern;
   receiving a message indicating a first number of symbols corresponding to a first frequency subband of the frequency hopping pattern;
   transmitting one or more SRS resources on the first frequency subband of the frequency hopping pattern using the first number of symbols; and
   transmitting the one or more SRS resources on a second frequency subband of the frequency hopping pattern using a second number of symbols different than the first number of symbols.

2. The method of claim 1, wherein the first number of symbols is one symbol and the second number of symbols is two symbols.

3. The method of claim 1, wherein the one or more SRS resources are configured as periodic SRS resources, semi-persistent SRS resources, or aperiodic SRS resources based on a radio resource control (RRC) configuration message.

4. The method of claim 3, wherein the configured semi-persistent SRS resources are activated by a medium access control (MAC) control element (CE) (MAC-CE) command, and the aperiodic SRS resources are triggered by a downlink control information (DCI) message.

5. The method of claim 1, wherein the SRS configuration information indicates the second number of symbols.

6. The method of claim 1, wherein the message further indicates the second number of symbols.

7. The method of claim 1, wherein the message comprises one of a medium access control (MAC) control element (CE) (MAC-CE) command or a downlink control information (DCI) message.

8. The method of claim 1, wherein the one or more SRS resources are transmitted using a plurality of offset values.

9. A method of wireless communication performed by a base station, the method comprising:
   transmitting sounding reference signal (SRS) configuration information indicating a frequency hopping pattern;
   transmitting a message indicating a first number of symbols corresponding to a first frequency subband of the frequency hopping pattern;
   receiving one or more SRS resources on the first frequency subband of the frequency hopping pattern using the first number of symbols; and
   receiving the one or more SRS resources on a second frequency subband of the frequency hopping pattern from a second number of symbols different than the first number of symbols.

10. The method of claim 9, wherein the first number of symbols is one symbol and the second number of symbols is two symbols.

11. The method of claim 9, wherein the SRS configuration information indicates further indicates the second number of symbols.

12. The method of claim 9, wherein the message further indicates the second number of symbols.

13. A user equipment (UE) for wireless communication, comprising:
   one or more memories; and
   one or more processors, coupled to the one or more memories, configured to cause the UE to:
      receive sounding reference signal (SRS) configuration information indicating a frequency hopping pattern;
      transmit one or more SRS resources on the first frequency subband of the frequency hopping pattern using the first number of symbols; and
      transmit the one or more SRS resources on a second frequency subband of the frequency hopping pattern using a second number of symbols different than the first number of symbols.

14. The UE of claim 13, wherein the one or more SRS resources are transmitted using a plurality of offset values.

15. The UE of claim 13, wherein the first number of symbols is one symbol and the second number of symbols is two symbols.

16. The UE of claim 13, wherein the one or more SRS resources are configured as periodic SRS resources, semi-persistent SRS resources, or aperiodic SRS resources based on a radio resource control (RRC) configuration message.

17. The UE of claim 16, wherein the configured semi-persistent SRS resources are activated by a medium access control (MAC) control element (CE) (MAC-CE) command, and the aperiodic SRS resources are triggered by a downlink control information (DCI) message.

18. The UE of claim 13, wherein the SRS configuration information indicates the second number of symbols.

19. The UE of claim 13, wherein the message further indicates the second number of symbols.

20. The UE of claim 13, wherein the message comprises one of a medium access control (MAC) control element (CE)(MAC-CE) command or a downlink control information (DCI) message.

21. A base station for wireless communication, comprising:
one or more memories; and
one or more processors, coupled to the one or more memories, configured to cause the base station to:
transmit sounding reference signal (SRS) configuration information indicating a frequency hopping pattern;
transmit a message indicating a first number of symbols corresponding to a first frequency subband of the frequency hopping pattern;
receive one or more SRS resources on the first frequency subband of the frequency hopping pattern using the first number of symbols; and
receive the one or more SRS resources on a second frequency subband of the frequency hopping pattern from a second number of symbols different than the first number of symbols.

22. The base station of claim 21, wherein the one or more processors are further configured to cause the base station to:
estimate, based at least in part on the one or more SRS resources, channel conditions on the first frequency subband and the second frequency subband.

23. The base station of claim 21, wherein the one or more processors are further configured to cause the base station to:
configure, based at least in part on the one or more SRS resources, a number of SRS resource sets for channel sounding.

24. The base station of claim 21, wherein the one or more processors are further configured to cause the base station to:
identify, based at least in part on the one or more SRS resources, a channel quality indicator, a rank indicator, or a precoding matrix indicator.

25. The base station of claim 21, wherein the first number of symbols is one symbol and the second number of symbols is two symbols.

26. The base station of claim 21, wherein the SRS configuration information indicates the second number of symbols.

27. The base station of claim 21, wherein the message further indicates the second number of symbols.

* * * * *